United States Patent
Yasukawa et al.

(10) Patent No.: US 7,136,391 B1
(45) Date of Patent: Nov. 14, 2006

(54) ATM SWITCH

(75) Inventors: Seisho Yasukawa, Suginami-ku (JP);
Naoki Takaya, Kunitachi (JP);
Masayoshi Nabeshima, Tokorozawa (JP); Eiji Oki, Kodaira (JP); Naoaki Yamanaka, Kokubunji (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/376,904

(22) Filed: Aug. 18, 1999

(30) Foreign Application Priority Data

Aug. 21, 1998 (JP) .................................. 10-235957
Sep. 21, 1998 (JP) .................................. 10-266802
Sep. 21, 1998 (JP) .................................. 10-266930

(51) Int. Cl.
 *H04L 12/56* (2006.01)
(52) U.S. Cl. ........................................ 370/416; 370/471
(58) Field of Classification Search ................ 370/350,
370/357, 367, 369–372, 375, 387, 388, 389, 370/392, 394, 395.1, 396, 395.4, 395.71, 370/395.7, 412, 416, 417, 418
See application file for complete search history.

(56) References Cited

U.S. PATENT DOCUMENTS

| | | | | |
|---|---|---|---|---|
| 5,127,000 | A * | 6/1992 | Henrion | 370/394 |
| 5,337,308 | A | 8/1994 | Fan | |
| 5,355,372 | A | 10/1994 | Sengupta et al. | |
| 5,486,457 | A * | 1/1996 | Aramaki | 370/238 |
| 5,953,341 | A * | 9/1999 | Yamanaka et al. | 370/416 |
| 6,128,278 | A * | 10/2000 | Joffe et al. | 370/229 |
| 6,134,217 | A * | 10/2000 | Stiliadis et al. | 370/232 |
| 6,160,805 | A * | 12/2000 | Averbuch et al. | 370/350 |
| 6,335,930 | B1 * | 1/2002 | Lee | 370/387 |
| 6,647,017 | B1 * | 11/2003 | Heiman | 370/412 |

FOREIGN PATENT DOCUMENTS

| | | |
|---|---|---|
| EP | 0 471 380 | 2/1992 |
| EP | 0 553 798 A | 8/1993 |
| EP | 0 833 480 A | 4/1998 |
| JP | 2-195758 | 8/1990 |
| JP | 4-252632 | 9/1992 |
| JP | 5-207062 | 8/1993 |
| JP | 6-77984 | 3/1994 |

(Continued)

OTHER PUBLICATIONS

Oki, et al, "A Scalable Distributed Arbitration in High-Speed ATM Switches", IEICE General Confernce, B-6-41, 1997.**

(Continued)

*Primary Examiner*—Seema S. Rao
*Assistant Examiner*—Donald L Mills
(74) *Attorney, Agent, or Firm*—Kenyon & Kenyon LLP

(57) ABSTRACT

An ATM switch includes a first stage, a second stage and a third stage each of which stages includes at least one basic switch, wherein the first stage, the second stage and the third stage are connected. The basic switch includes a part which refers to time information written in a header of an input cell and switches cells to an output port in an ascending order of the time information. In addition, the ATM switch includes a cell distribution part in the basic switch of the first stage. The cell distribution part determines a routes of a cell to be transferred such that loads of routes within the ATM switch are balanced. The ATM switch further includes an adding part which adds arriving time information to an arriving cell as the time information.

13 Claims, 71 Drawing Sheets

FOREIGN PATENT DOCUMENTS

JP    6-252948    9/1994

OTHER PUBLICATIONS

Yasukawa, et al., "Multi-Route ATM Switch Which Conserve Cell Sequence in Tournament Manner"; IEICE General Conference, B-6-19 1998.**

Tom Chaney, J. Andrew Fingerhut, Margaret Flucke, Jonathan S. Turner, "Design of a Gigabit ATM Switch," IEEE INFOCOM'97, 1997.

Jonathan S. Turner, N.Yamanaka, "Architectural Choices in Large Scale ATM Switches," IEICE Trans. Commun., vol. E81-B. No. 2 Feb. 1998.

M. Collivignarelli, A.Daniele, G. Gallassi, F. Rossi, G. Valsecchi, L. Verri, "System and Performance Design of the ATM Node UT-XC," Supercomm/ICC'94.

G. Balboni, M. Collivignarelli, L. Licciardi, A. Paglialunga, G. Rigolio, F. Zizza, "From Transport backbone to service platform: facing the broadband switch evolution;" ISS'95.

M.A. Henrion, G.J. Eilenberger, G.H. Petit, P. Parmentier, "Technology, Distributed Control and Performance of a Multipath Self-Routing Switch," ISS'92.

Akihiko Takase et al. "Datapath architecture and technology for large scale ATM switching systems" Global Telecommunications Conference, 1996. Globecom '96. Communications: The Key to Global Prosperity London, UK Nov. 18-22, 1996, New York, NY, USA, IEEE, US, Nov. 18, 1996, pp. 1395-1399.

Ryozo Kishimoto et al. "Self-Routing Benes Network Distributively Controlled by Dynamic Load Balance" Electronics & Communications in Japan, Part I—Communications, Scripta Technica. New York, US, vol. 73, No. 9 Part 1, Sep. 1, 1990, pp. 1-11.

Hitoshi Obara "Design of a Multistage Self-Routing Switch with a Distributed Cell Sequence Control" Electronics & Communications in Japan, Part I—Communications, Scripta Technica. New York, US, vol. 73, No. 10, Oct. 1, 1990, pp. 14-27.

P.C. Wong et al. "Pipeline banyan—a parallel fast packet switch architecture" Discovering a New World of Communications. Chicago, Jun. 14-18, 1992. Bound Together With B0190700, vol. 3, Proceedings of the International Conference on Communications, New York, IEEE, US, vol. 4, Jun. 14, 1992, pp. 882-887.

Sying-Jyan Wang "Load-Balancing in Multistage Interconnection Networks under Multiple-Pass Routing" Journal of Parallel and Distributed Computing, Academic Press, Duluth, MN, US, vol. 36, No. 2, Aug. 1, 1996, pp. 189-194.

European Search Report, issued Jan. 13, 2005.

* cited by examiner

FIG.28

|   | T1 | T2 | T3 | T4 |
|---|----|----|----|----|
| SA1 | S1 | S2 | S3 | S4 |
| SA2 | S2 | S3 | S4 | S1 |
| SA3 | S3 | S4 | S1 | S2 |
| SA4 | S4 | S1 | S2 | S3 |

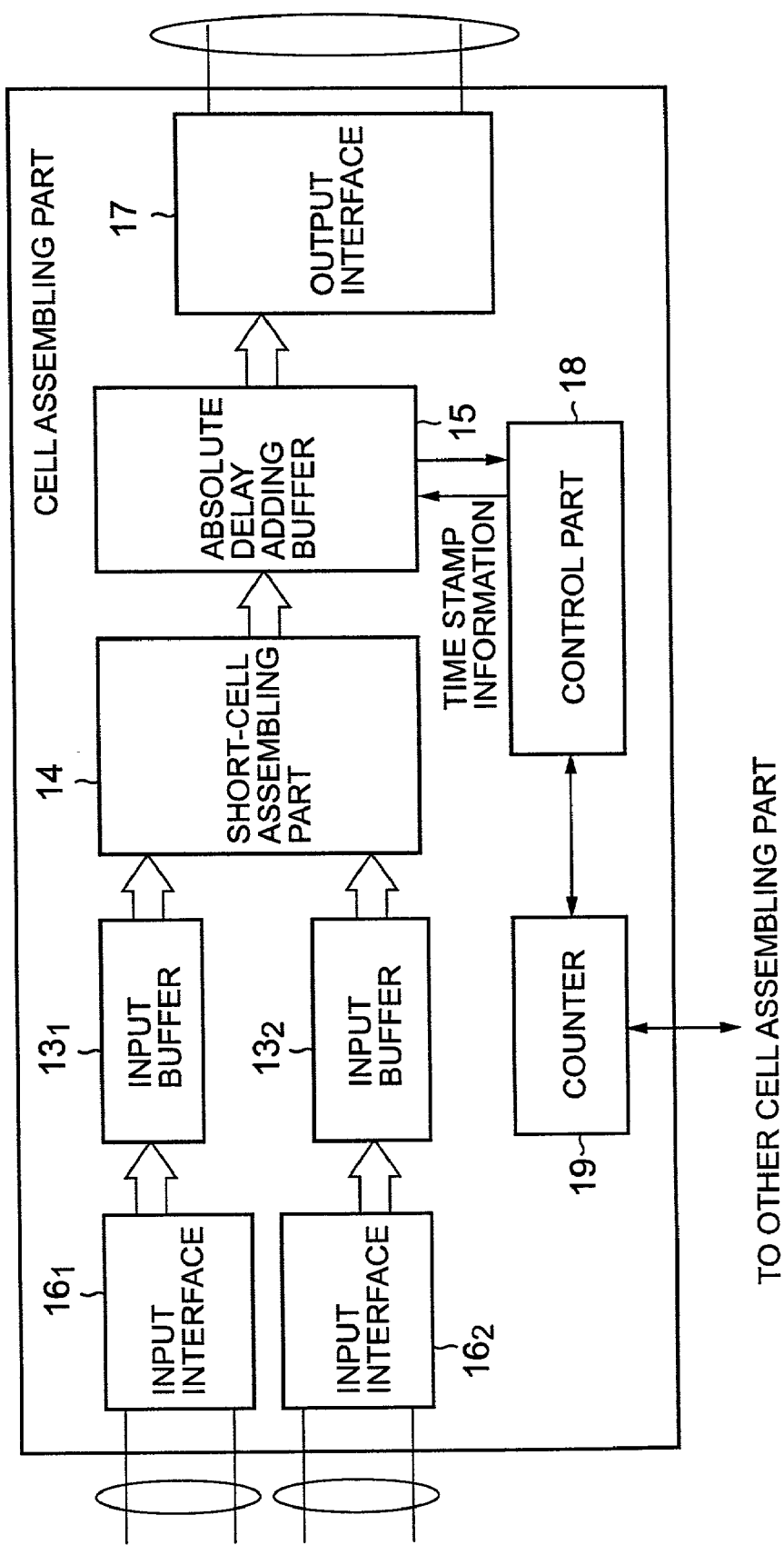

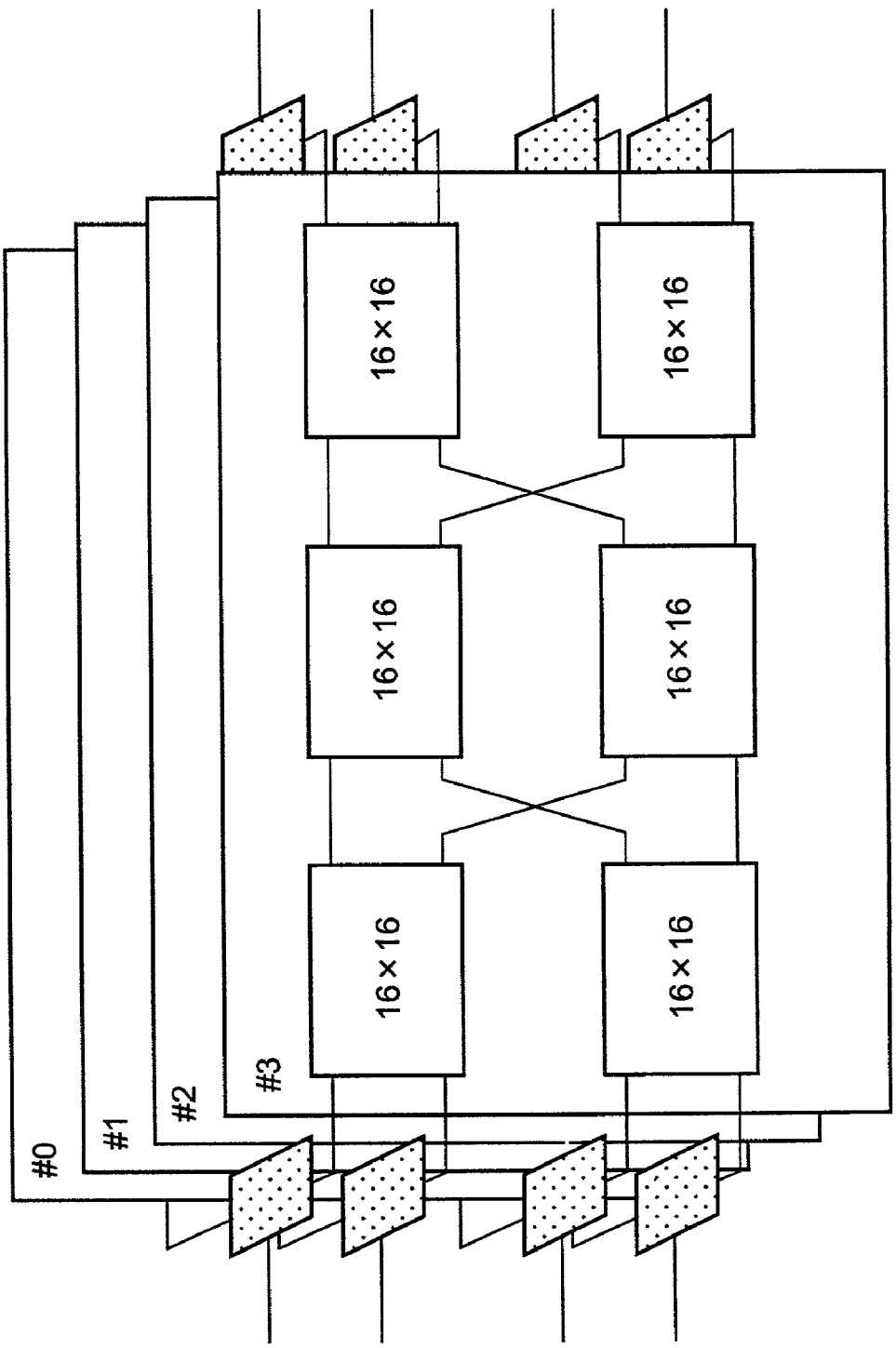

FIG.58

|     | R1 | R2 | ... | Rn | ΔF |
|-----|----|----|-----|----|----|
| G1  | 1  | 0  | ... | 2  | 2  |
| G2  | 1  | 0  | ... | 1  | 1  |
| :   | :  | :  | ... | :  | :  |
| Gn  |    |    | ... |    |    | n:SWITCH SIZE

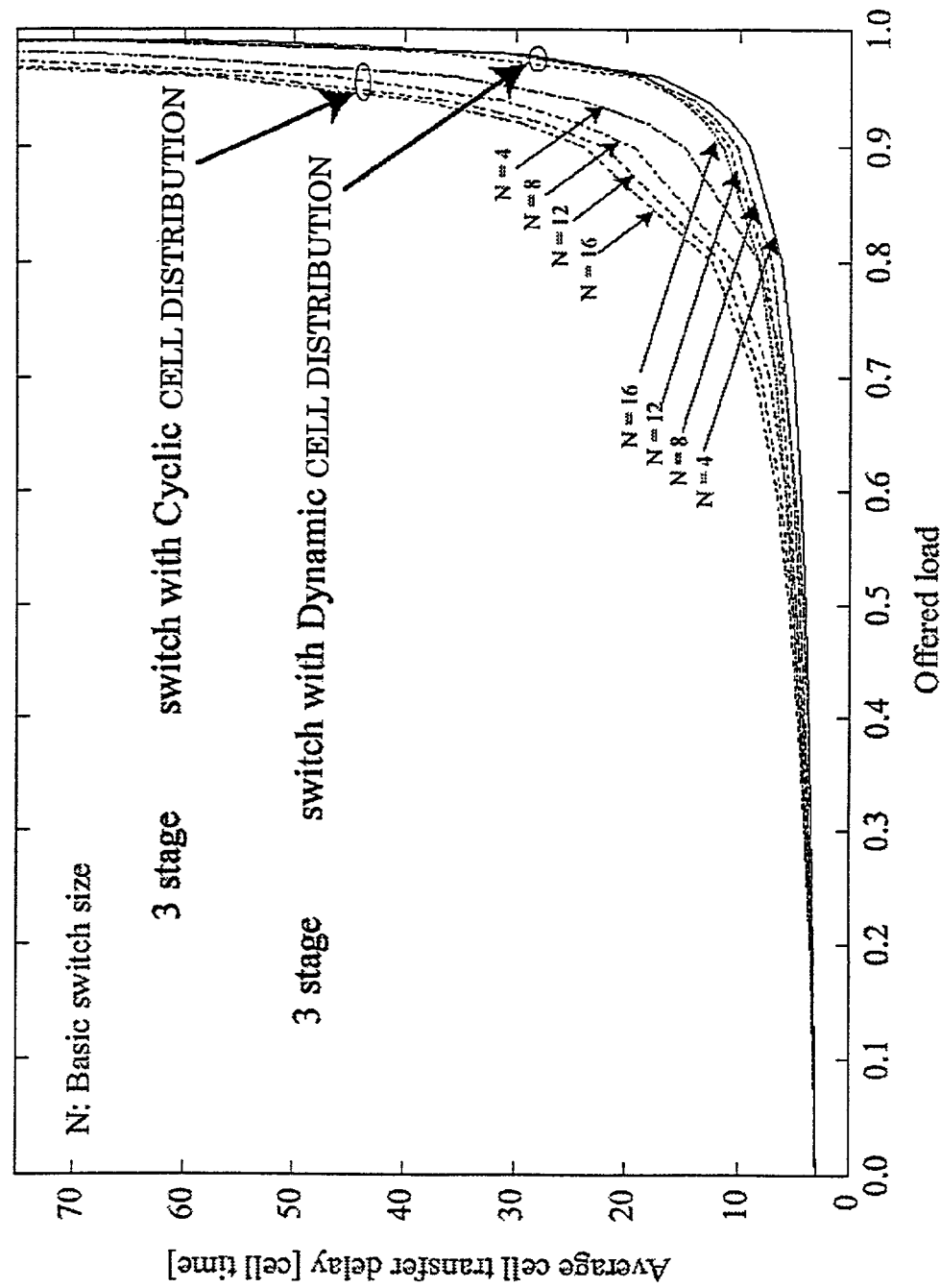

UNABLE TO DISTINGUISH

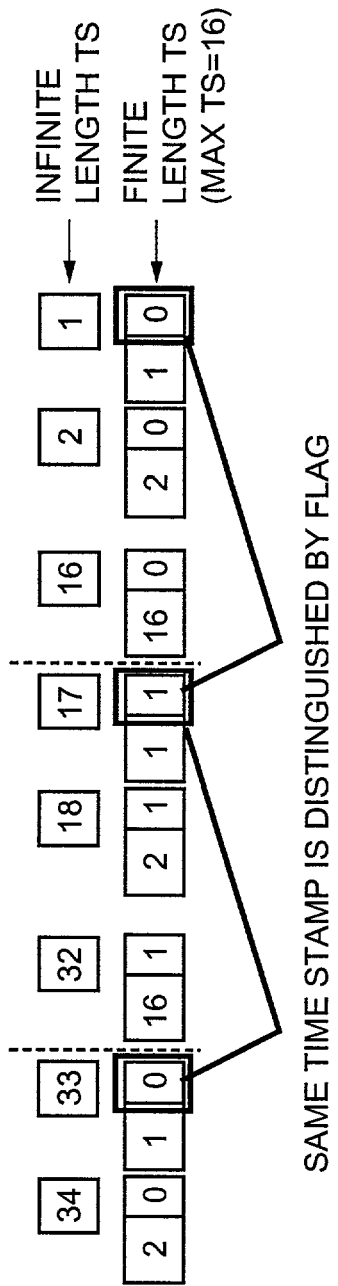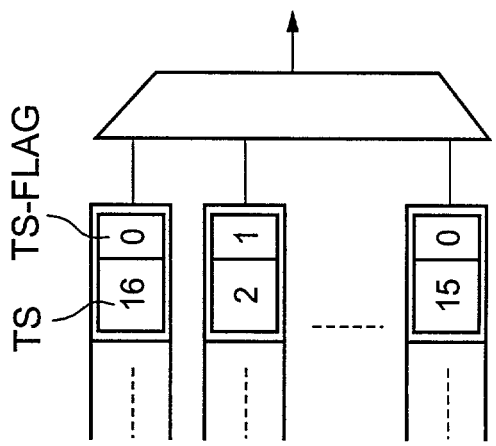

TIME STAMP BIT LENGTH = k k-1 bit  1 bit

ATM SWITCH

BACKGROUND OF THE INVENTION

1. Field of the Invention

The present invention generally relates to a technique for switching a cell, which is a fixed length packet, represented by an ATM cell. Particularly, the present invention relates to a technique incorporated in a large-sized ATM switch which is used for an ATM exchange and which demands high throughput. More particularly, the present invention relates to a technique of cell switching using cell-based routing while preserving cell sequence, and to a technique of distributing cell traffic effectively.

Further, the present invention relates to a technique of forming ATM switch hardware improving the efficiency of LSI circuits in the ATM switch so as to reduce to a minimum the number of the LSI circuits necessary for the ATM switch.

In the specification, a basic switch is used as a component of the ATM switch. In addition, a cell which is generated by dividing a cell will be called a short cell.

2. Description of the Related Art

In terms of ATM (asynchronous transfer mode), fixed-length cells are switched at high speed using a simplified protocol by hardware rather than by software. Thus, high-speed controllability and high-speed switching capability are required for the ATM switch in the ATM exchange. Thus, it is not enough to expand the switch size by expanding each basic switch for realizing a required switch size which increases. The required switch size increases as the number of lines to be accommodated increases. Therefore, a multi stage switch configuration in which the basic switches are connected to each other in a multi stage manner is necessary.

A conventional multi stage switch will be described with reference to FIG. 1. FIG. 1 is a block diagram showing the conventional multi stage ATM switch. The first stage has n n×m switches, the second stage has m n×n switches, and the third stage has n m×n switches. Conventionally, it has been known that a cross architecture in which three stages of basic switches are connected is effective for expanding the switch size.

The routing algorithm in the cross architecture can be classified as a connection-based routing or a cell-based routing. In terms of the connection-based routing, cells which constitute a same VC (Virtual Connection) are routed through the same route in a switch. On the other hand, in terms of the cell-based routing, cells which constitute the same VC are routed through different routes in the switch.

Cell routing examples are shown in FIG. 2 and FIG. 3 showing the case of the connection-based routing and the cell-based routing respectively. In the following, problems in using the routing algorithms will be described with reference to FIG. 2 and FIG. 3.

As shown in FIG. 2, in the case of the connection-based routing, cells constituting the same VC which are input in the ATM switch are switched through the same switching route. In the cross architecture having three-stages, traffic distribution is carried out by basic switches in the first stage and the second stage, and switching is carried out by the basic switches in the second stage and the third stage.

Thus, it is necessary to distribute traffic on a connection level in the ATM switch in order to distribute the load of the basic switches equally in the second stage. For this purpose, resource management of the basic switches in the second stage is necessary. In the resource management, for example, a basic switch in the second stage is determined for connections to route through. The connections go to the same switch in the third stage.

If the resource management is not carried out effectively, the load of the basic switches in the second stage gets out of balance resulting in generating some basic switches of a high-load condition. As a result of this, a link block occurs continually in the high-loaded switches and a state in which QOS (quality of service) is not satisfied occurs in the ATM.

FIG. 2 shows an example of the above-mentioned state. In FIG. 2, the load of the basic switch in the second stage gets out of balance in a connection route going to a basic switch OSW#1 so that the load of the basic switch TSW#1 becomes low and the load of the basic switch TSW#n becomes high resulting in cell discarding at the output link. In order to prevent such a load unbalance, intelligent resource management needs to be carried out. In the resource management, a statistical characteristic of link-level multiplexed VCs is predicted in consideration of temporal variation of the VCs, then the load balance is ensured probabilistically. There are various methods for the resource management. One such method is to monitor the load state of each link and determining a connection route on the basis of the load state. Another such method is to obtaining the load state of a link by calculating a characteristic of multiplexed data of each output link of the basic switch in the second stage on the basis of a reported parameter of a connection, and determine a route of the VC on the basis of the load state information.

However, in terms of the large-sized ATM switch, which is the target of the present invention, which switch has many high-speed links exceeding several tens of gigabits per second, the above-mentioned methods are not effective because the cost for the resource management increases in the ATM switch as a whole. Specifically, since the large-sized ATM switch has a large number of connections, the algorithm for calculating routes for cell transmission becomes very complicated. Therefore, the hardware for the route calculation increases and it becomes difficult to realize the large-sized ATM switch.

In addition, it may be considered that the ATM switch allows load unbalance by speeding up the inside of the ATM switch in order to avoid the complicated resource management. However, it is necessary to speed up the link speed of the ATM switch to a speed 3 times the input/output line speed. This is not a cost effective method because it is very difficult to form such a high-speed link between the basic switches.

As shown in FIG. 3, as for the cell-based routing, since it is possible for the cells to take different routes, the load distribution in the ATM switch can be realized without concern regarding the characteristic of multiplexed data. That is, as shown in FIG. 3, the internal block can be prevented in the routing network if the cells which are input to the ATM switch are distributed to each input port of the routing network with equal probability. In this case, a distribution network in the ATM switch is used.

However, since cells which form the same VC are switched through multiple routes in the ATM switch according to the cell-based routing, cells which have routed through different routes may have different delays depending on the load applied to each buffer on the route. Thus, the time of the cell transfer delay may vary from route to route, thereby a cell-sequence disorder may occur at the output of the ATM switch. Therefore, cell-resequencing is necessary for ensuring the cell sequence order.

For example, Gigabit switch carries out the cell resequencing in the output port (Turner: DESIGN OF A GIGA- BIT ATM SWITCH, IEEE INFOCOM'77). FIG. 4 shows the configuration. As shown in FIG. 4, a time stamp is added to an incoming cell by a time stamp part. Then, the cells are switched, and the cell waits in a buffer of the output port. The cell resequencing is carried out by sorting cells in the buffer. FIG. 5 shows cells waiting in the buffer as cells in a sorting range.

However, in order to carrying out the above-mentioned sorting, it is necessary to provide a large-scale sorting circuit at each output port of the ATM switch for sorting switched cells based on the time information. Since the ATM switch which has high-speed links needs to carry out the sorting on many routes, the size of the ATM switch should be limited, thereby scalability of the ATM switch can not be obtained. In addition, as for system construction, the ATM switch is not economical since it is necessary to provide a high-speed switching function in a switch function part and a sorting function on every output port separately.

Further, the above-mentioned cell sequence ensuring method has a disadvantage as mentioned below. FIG. 6 shows load dependence of a cell transfer delay distribution. In FIG. 6, the horizontal axis shows the delay time, and the vertical axis shows probability of the cell frequency corresponding to the delay time. As shown in the figure, as the load in the ATM switch increases, the distribution shifts to the direction of increasing delay time. The figure shows that a cell which is transferred with an infinite delay time exists in a finite probability. However, it is physically impossible to provide a sorter with an infinite window size, resulting in carrying out the cell sequence sorting by a sorter with a finite window size in consideration of economy. Thus, the window size $\Delta T$, which defines a sorting range of the sorter, is determined probabilistically, giving up cell resequencing for cells with delay below a probability. Therefore, the sorter in the sorting part carries out cell resequencing with the window size $\Delta T$.

However, an old cell out of the finite window may arrive depending on a load state in the ATM switch. In such a case, the sorter can not ensure the cell sequence. The reason for this is that the cell resequencing is carried out after switching, that is, after the cell sequence disorder occurs. That is to say, the cell resequencing method which uses the sorter at the output of the switch has a disadvantage that the cell sequence can not be ensured 100%.

Moreover, another method for preventing the cell sequence disorder is proposed in M. Collivignarelli et al., "System and Performance Design of the ATM Node UT-XC," IEEE ISS'94, pp. 613–618, in which maximum delay time is added.

According to the method, the cell delay time is equalized for each cell by adding a predefined maximum delay time D to every cell input in the switch, thereby ensuring the cell sequence. Specifically, according to the method, when assuming D1 as the switching delay of a cell at the output of the switch, an additional delay time D2=D–D1 is added to the cell at the output. Thus, the cell sequence is ensured.

However, according to the above-mentioned method of adding maximum delay time, since the predefined worst delay time D is added to every input cell, a good delay characteristic can not be obtained even if an input load of the ATM switch is low. In addition, it is necessary to set the absolute delay time to the ATM switch in the order of several hundreds when an allowed input load is 0.9. Therefore, the hardware block for adding the maximum delay time becomes complicated so that it becomes difficult to realize the hardware. Further, it is necessary to measure the switching delay time of each cell at the input/output part with precision in order to add the delay time to a transferred cell accurately, resulting in complicating a cell delay time measuring circuit and a delay time adding circuit which are provided in the input/output part. The complexity is a disadvantage for realizing the hardware.

Moreover, it is a problem to accommodate a large number of input/output lines in such a high-speed ATM switch. FIG. 7 shows an example of an ATM switch of a 16×16 switch size. For example, when realizing the ATM switch which has the 16×16 switch size and 160-Gbit/s switching throughput (the highway speed is 10-Gbit/s which is 622 Mbit/s×20) and the number of high-speed input/output lines of an LSI chip for the ATM switch is limited to 300 pins at the maximum, an LSI chip of a 4×2 ((4+2)×2×20=240, with 50 control lines) can be realized when inputting high speed signal in parallel to the ATM switch. Therefor, 32 chips are necessary in order to realize a 160-G bit/s cross-point switch.

FIG. 8 shows an LSI chip configuration when transferring cells by splitting cells spatially. As shown in FIG. 8, when cells are split spatially by using a bit slicing technique, 160G/3 throughput can be realized by one chip (16×2×(20/3)≈230, with 50 control lines). Therefore, a 160-G bits/s throughput can be realized with 3 chips at the minimum. In addition, hardware logic in the chip is used effectively since high speed lines for interconnecting between chips can be eliminated.

FIG. 9 shows an example of a cross-point switch using parallel inputs and FIG. 10 shows an example of a cross-point switch using the bit slicing. In the case of the cross-point switch using parallel inputs shown in FIG. 9, the LSI chip in the center of the cross-point handles relaying signals in higher proportion than switching signals. Therefore, there is a problem that an integration degree of the logic used for switching is low.

On the other hand, as for the example shown in FIG. 10 using the bit slice technique, it is possible to integrate the switching logic effectively because most hardware is used for switching.

When expanding the ATM switch size by using the bit slicing method, basic switches are connected, each basic switch having a cell splitting function and a cell synthesizing function. Therefore, the ATM switch can not make the most of the merit of the bit slicing method. In addition, since cell splitting and synthesizing are repeated in the ATM switch, the amount of overhead circuits for cell splitting and synthesizing increases, thereby control becomes complex and hardware increases. Therefore, the method is not an economical approach.

SUMMARY OF THE INVENTION

Accordingly, it is a general object of the present invention to provide an ATM switch which can carry out cell resequencing in each basic switch in a decentralized autonomous manner without sorting a large number of cells to be sent through many routes.

Another and more specific object of the present invention is to provide an ATM switch which can be expanded by interconnecting ATM switch blocks, each ATM switch block being a three-stage ATM switch.

Another object of the present invention is to provide an ATM switch which can be economically expanded when the number of input/output signals of an LSI chip is limited in the case of high-speed data transmission.

Another object of the present invention is to provide an ATM switch which can reduce cell transfer delay and cell loss.

Another object of the present invention is to provide an ATM switch which can distribute cell traffic effectively in the ATM switch.

The present invention can achieve the above-mentioned objects by the following features.

According to a first aspect of the present invention, an ATM switch which includes at least one basic switch, wherein the basic switch includes a part which refers to time information written in a header of an input cell and switches cells to an output port in an ascending order of the time information.

Accordingly, each basic switch can carry out cell resequencing in a decentralized autonomous manner. Further, an ATM switch as a whole configured by interconnecting the basic switches can ensure the cell sequence. Therefore, a larger ATM switch configured by interconnecting the ATM switches can ensure the cell sequence.

Thus, a large-sized ATM switch can be realized easily and cost-effectively without providing a device for sorting.

The above-mentioned part may include:

a cross point at which an input line and an output line are crossed;

a first buffer which stores a cell arriving from the input line;

a second buffer which stores a cell arriving from a cross point; and a part which compares time information of a head cell in the first buffer with time information of a head cell in the second buffer and sends a head cell with earlier time information to a cross-point or the output port.

Accordingly, cell resequencing can be realized.

The input lines may be classified into a plurality of groups, the first buffer storing cells arriving from the input lines of one of the groups, time information of a cell with the earliest time information among cells in the first buffer being compared with time information of the head cell in the second buffer, and a cell with earlier time information being sent to a cross-point or the output port.

Accordingly, the number of comparisons can be reduced, and thereby the cell transfer delay time can be reduced.

In the above configuration, the ATM switch may include an adding part which adds arriving time information to an arriving cell as the time information.

In addition, the basic switch may include a delay time counter, add the delay time, and use the added delay time as the time information. A cell with a longer delay time can be treates as earlier time information since it was input to the switch earlier.

To achieve the above-mentioned objects, according to a second aspect of the present invention, a large-sized ATM switch includes interconnected ATM switches each of which ATM switch includes at least one basic switch, wherein the basic switch includes a part which refers to time information written in a header of an input cell and switches cells to an output port in ascending order of the time information.

According to a third aspect of the present invention, an ATM switch includes at least one basic switch, wherein the basic switch includes:

input lines which are grouped into a plurality of groups;

a part which compares time information added to cells within the group; and a selection part which selects a cell with the earliest time information according to the comparison, wherein an input line of the selection part of an ith stage in the basic switch is an output line of the selection part of an (i−1)th stage where i is a natural number.

In the configuration, a plurality of switches may be provided in parallel, the switch including the basic switch. Further, the ATM switch may include:

a splitting part which splits a cell into a plurality of short cells;

a part which transfers the short cells to the switches;

an assembling part which assembles the short cells into the cell;

a part which adds first time information to an arriving cell;

a part which adds second time information to short cells obtained by splitting the arriving cell;

a part which ensures a sequence of the short cells in the switch according to the first time information; and a part which ensures a sequence of the short cells in the assembling part according to the second time information.

In the above configuration, the splitting part may split a payload of a cell into a plurality of payloads, and rewrite the overhead of each payload.

According to the above configuration, the size of the ATM switch can be expanded requiring the minimum number of LSI chips. Further, a scalable switch architecture can be realized.

According to a fourth aspect of the present invention, an ATM switch includes:

a splitting part which splits a cell into a plurality of short cells;

a plurality of switches which transfer the short cells in parallel;

an assembling part which assembles the short cells into the cell;

a counting part which counts the number of output short cells being output from each of the switches, and a first comparing part which compares bit information of a plurality of the output short cells which have the same value counted by the counting part, wherein the assembling part includes a part which assembles the short cells with the same bit information according to the comparison of the first comparing part.

Accordingly, it can be determined whether short cells to be assembled are a correct combination. An example of the bit information are destination bits of an input port and an output port.

In the above configuration, the ATM switch may include:

an obtaining part instead of the counting part, which obtaining part obtains an inferred delay time t; and a second comparing part which compares bit information of the short cells which are output from the switches, the short cells having a delay time of t±τ, τ being an acceptable fluctuation time.

Accordingly, candidate short cells to be assembled can be defined among short cells with the approximately same delay time.

In the above configuration, the obtaining part may include a part which obtains the inferred delay time t by comparing an input time of a short cell which is input to the switch with an output time of the short cell which is output from the switch.

According to a fifth aspect of the present invention, an ATM switch includes at least one basic switch, the basic switch including output buffer parts for each output line, wherein the output buffer part comprises output buffers for each input line and a time sorting part which is connected to the output buffers, and wherein the time sorting part outputs a head cell with the earliest time information among head cells stored in each output buffer.

According to the above configuration, the cell sequence is ensured in each basic switch.

According to a sixth aspect of the present invention, an ATM switch includes a plurality of stages, the stages being connected and each of the stages including a plurality of basic switches, wherein the ATM switch includes:

a cell distribution part in the basic switch of a first stage, wherein the cell distribution part determines a route of a cell to be transferred such that loads of routes within the ATM switch are equalized.

Accordingly, traffic in the multi stage ATM switch can be balanced.

In the above configuration, the cell distribution part, when a cell arrives, may determine a destination group of the cell, refer to a cell distribution history table, and determine a route which has transferred a minimum number of cells within a fixed time period among routes corresponding to the destination group in the cell distribution history table.

As mentioned above, the ATM switch of the present invention, in one preferred mode, has a function for switching cells while each basic switch ensures the cell sequence in a distributed manner. Therefore, the ATM switch of the present invention does not need a large sorting circuit in the output of the ATM switch although it adopts the cell-based switching algorithm.

Further, in the ATM switch of the present invention, in one preferred mode, each basic switch provided in each stage carries out cell switching to an output port while ensuring the cell sequence hierarchically. Further, the switch size can be expanded by connecting the hierarchical cell-resequencing networks in a multi stage manner while achieving cell-resequencing. Thus, the ATM switch realizes a non-blocking switch under the multi stage environment using some switching blocks.

BRIEF DESCRIPTION OF THE DRAWINGS

Other objects, features and advantages of the present invention will become more apparent from the following detailed description when read in conjunction with the accompanying drawings, in which:

FIG. 28 shows a periodic table for allocating basic switches in the second stage;

FIG. 33 shows a block diagram of a cell assembling part;

FIG. 34 shows an example of an implementation of a 256×256 ATM switch which is configured by 4 switches which include interconnected 16×16 basic switches;

FIG. 58 is a cell distribution history table;

FIG. 66 shows an average cell transfer delay performance;

FIGS. 68A and 68B are diagrams showing a sixth embodiment of the present invention;

DETAILED DESCRIPTION OF THE PREFERRED EMBODIMENTS

Figure 1:
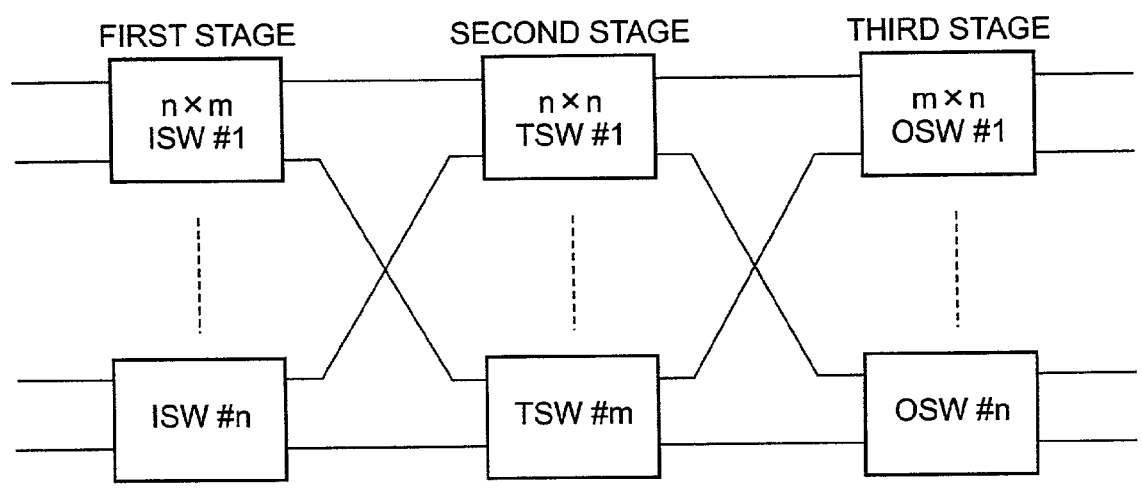
FIG. 1 is a block diagram showing a conventional multi stage ATM switch.
Figure 2:
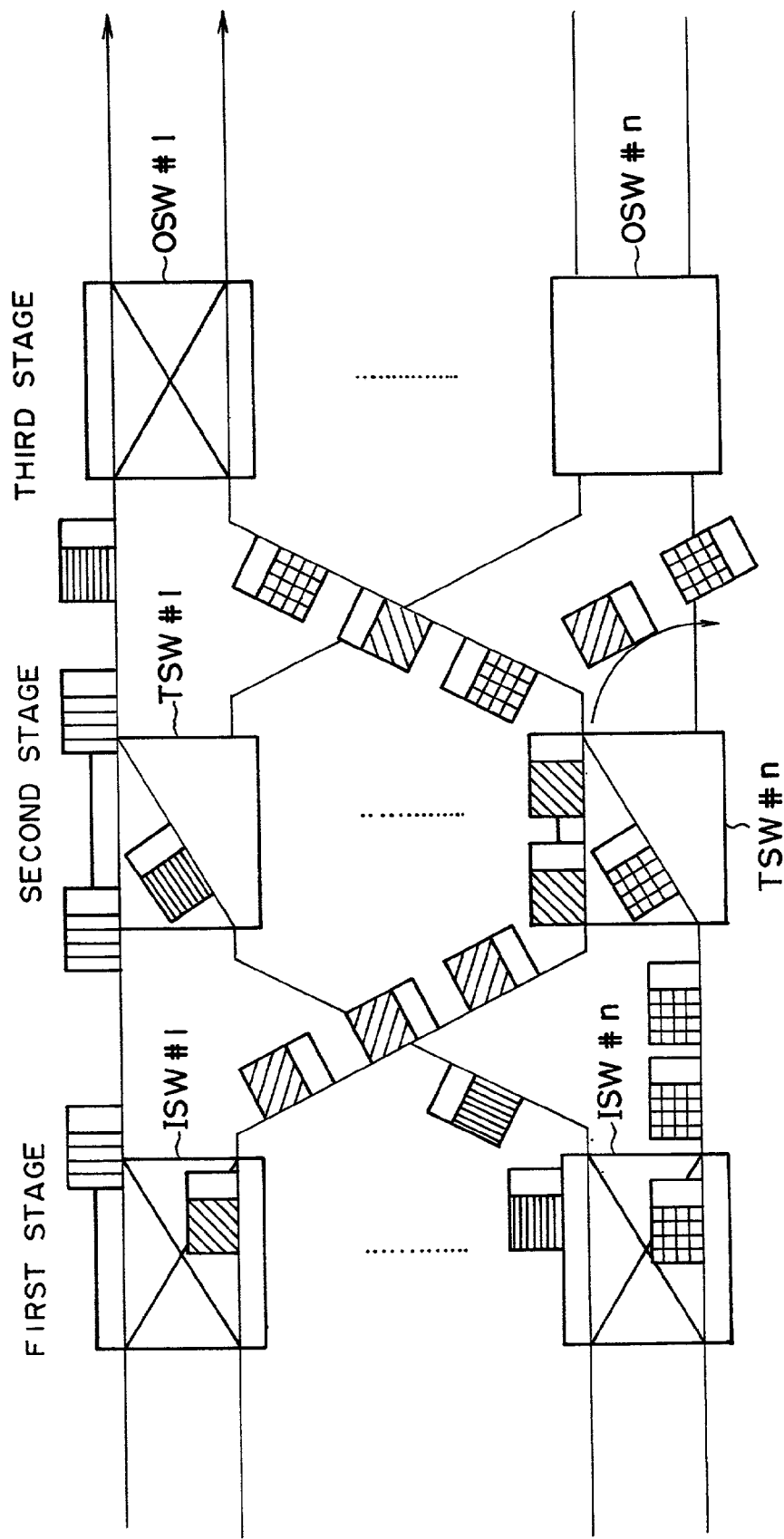
FIG. 2 shows an example of connection based routing.
Figure 3:
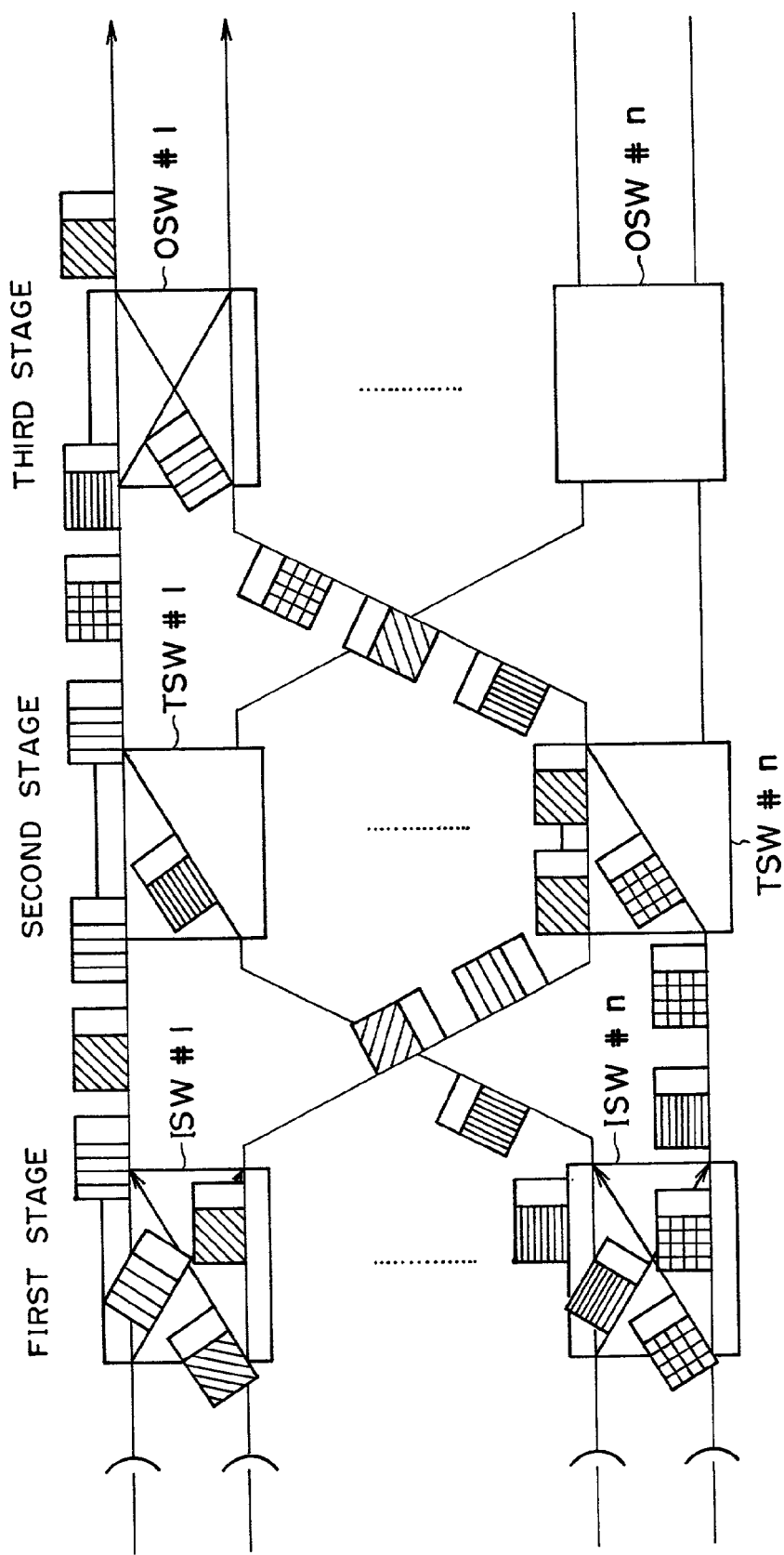
FIG. 3 shows an example of cell based routing.
Figure 4:
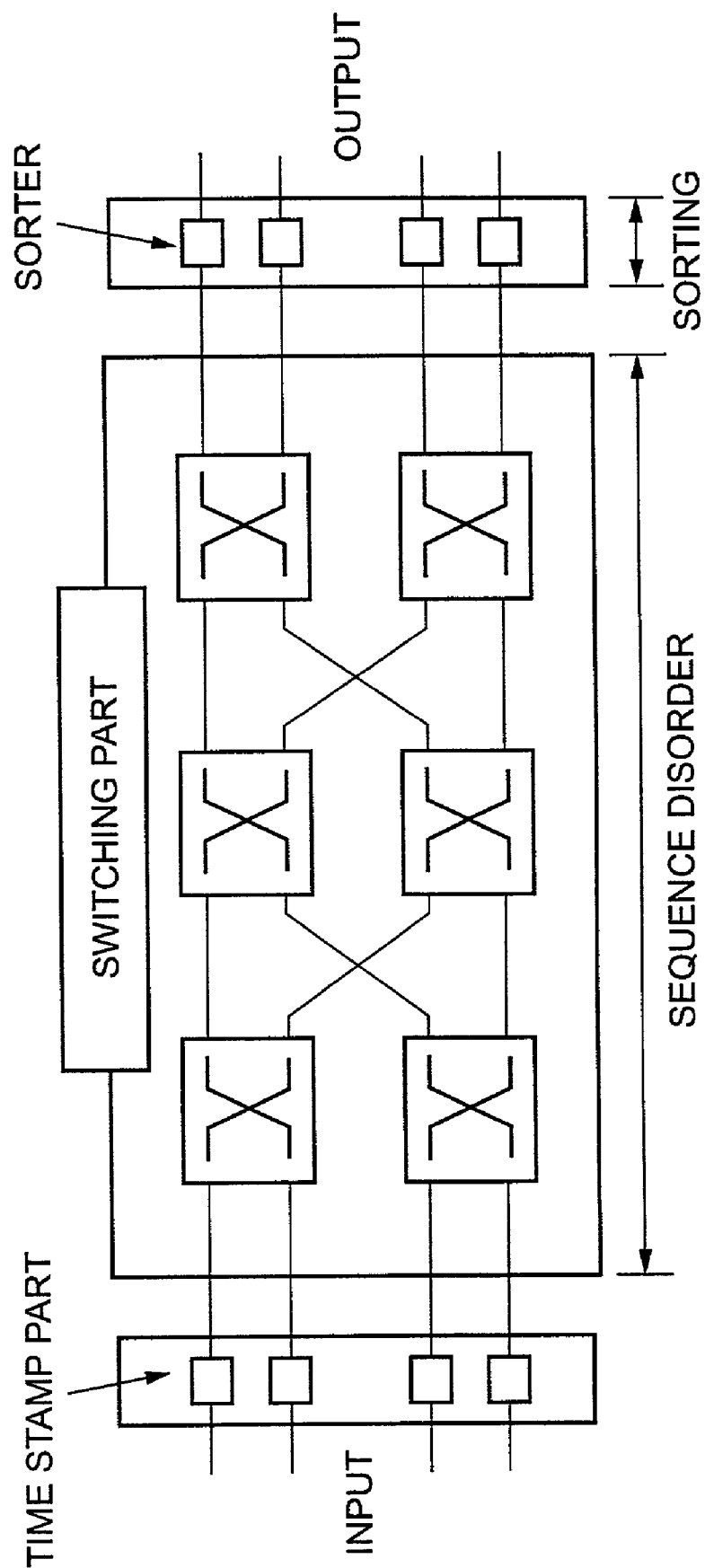
FIG. 4 shows an example of a conventional cell-resequencing method.
Figure 5:
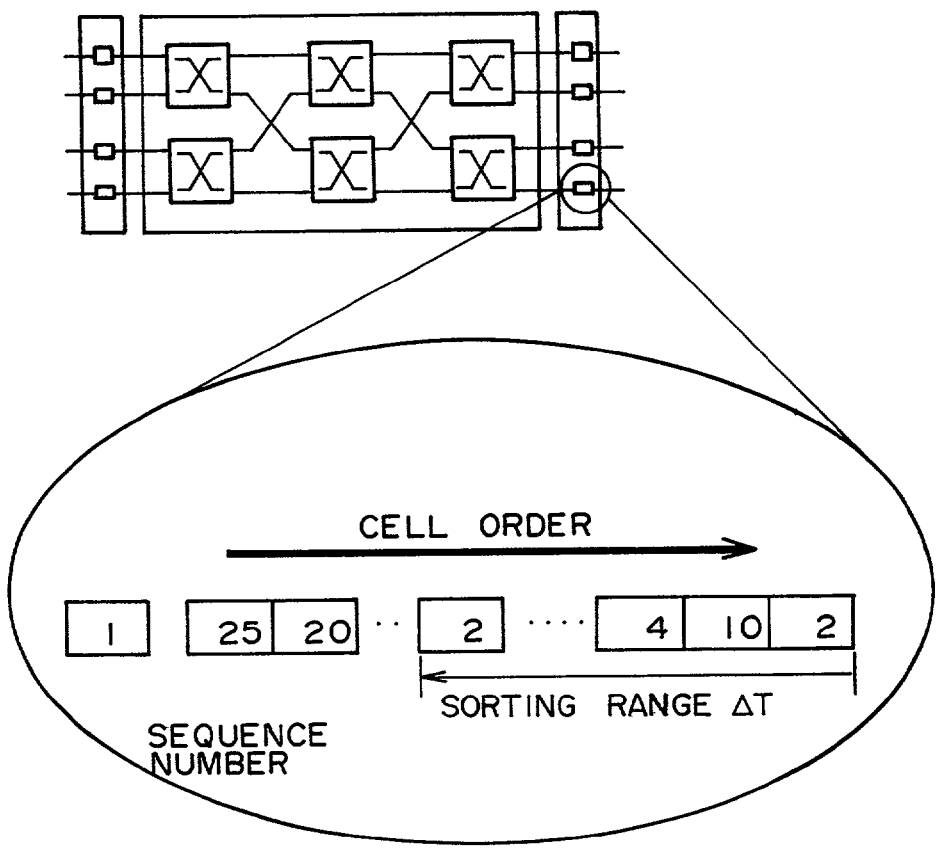
FIG. 5 shows an sorting range of cells in a configuration shown in FIG. 4.
Figure 6:
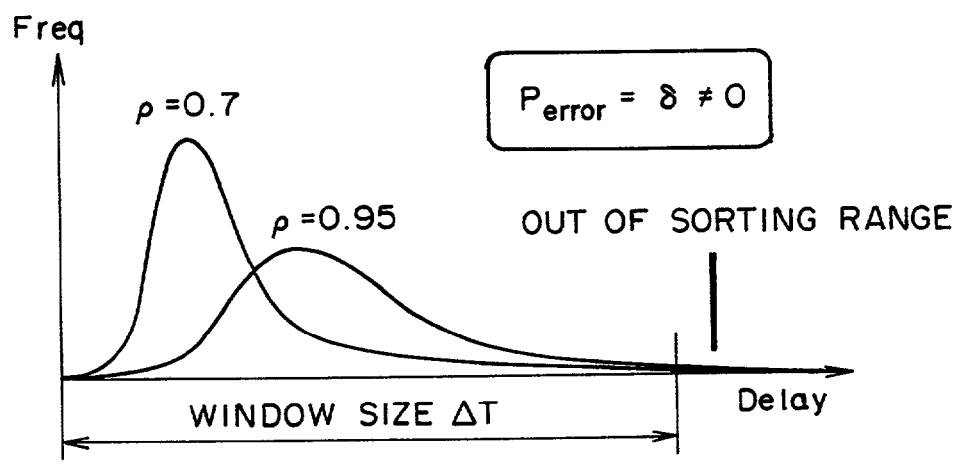
FIG. 6 shows a cell transfer delay distribution in a switch.
Figure 7:
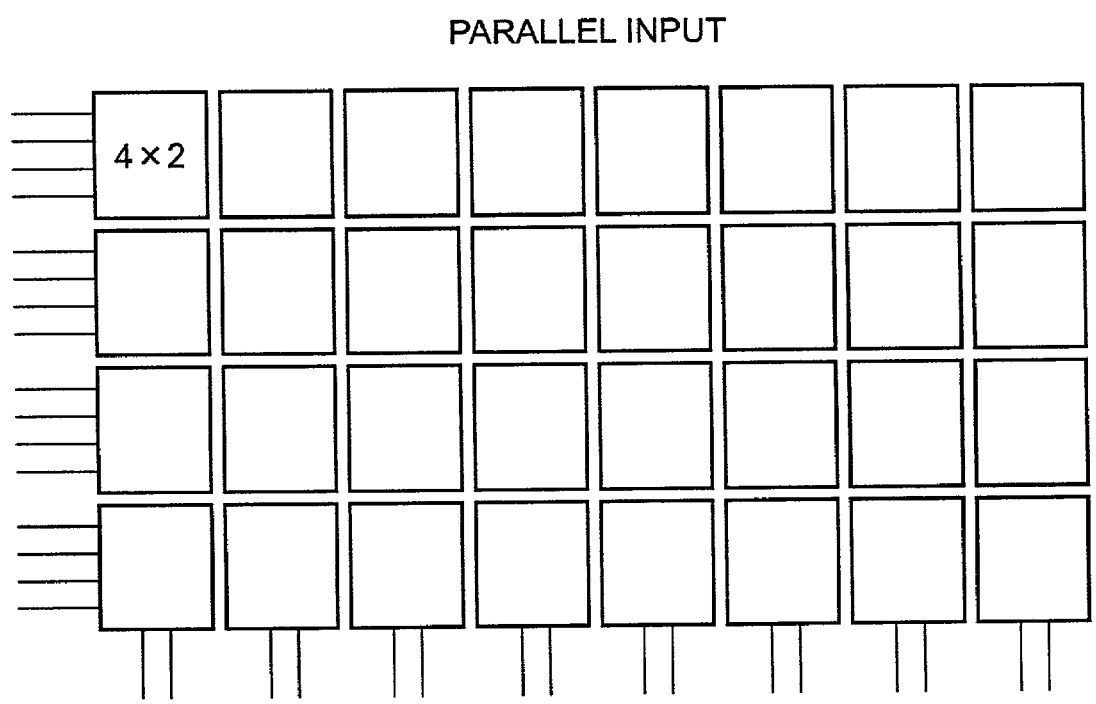
FIG. 7 shows an example of an implementation of a 16×16 ATM switch.
Figure 8:
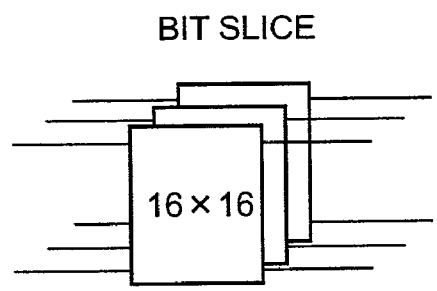
FIG. 8 shows an LSI chip configuration when transferring cells by splitting the cells spatially.
Figure 9:
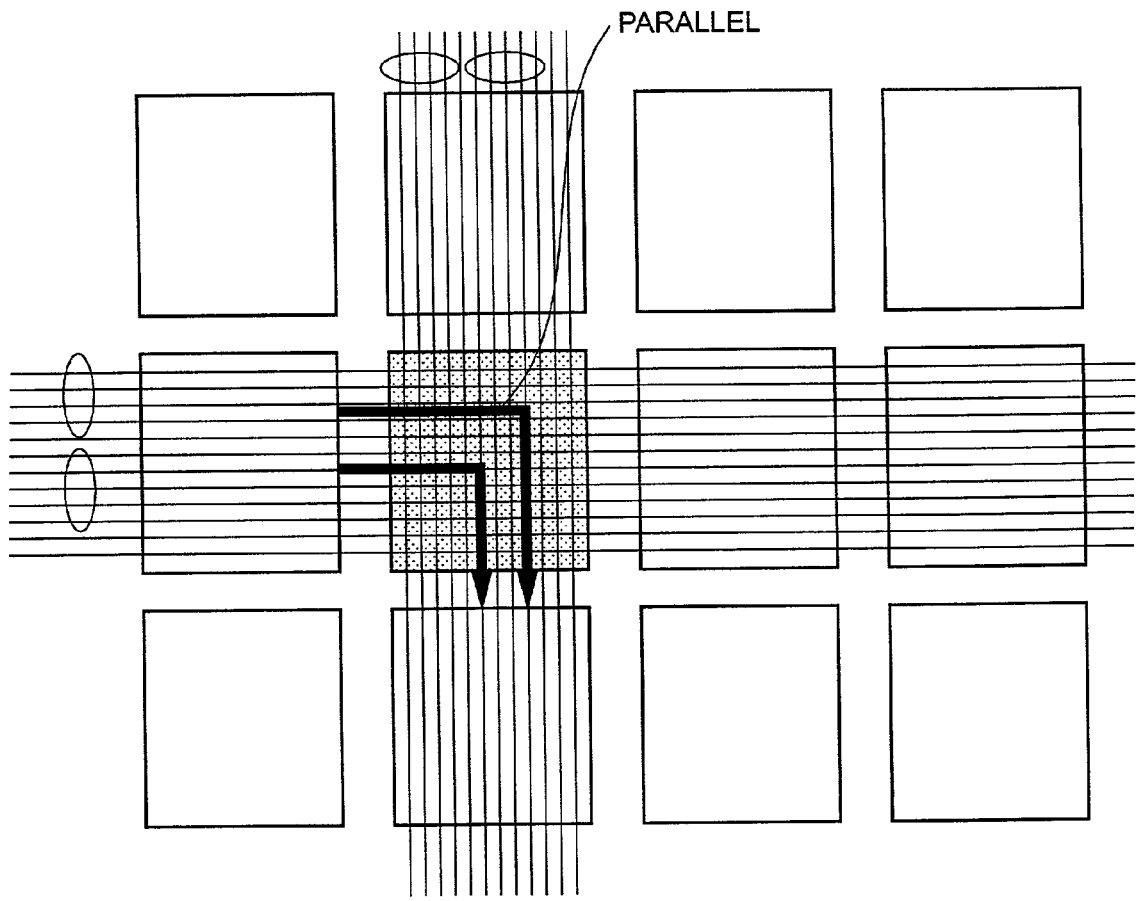
FIG. 9 shows an example of a cross-point switch using parallel inputs.
Figure 10:
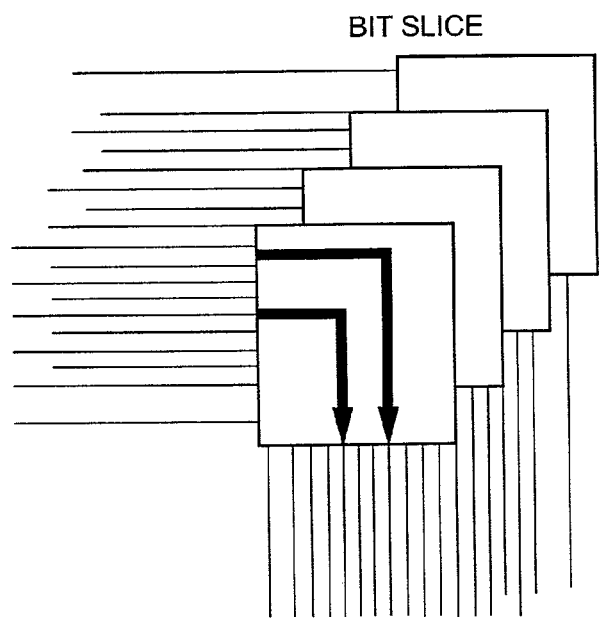
FIG. 10 shows an example of a cross-point switch using bit slicing.
Figure 11:
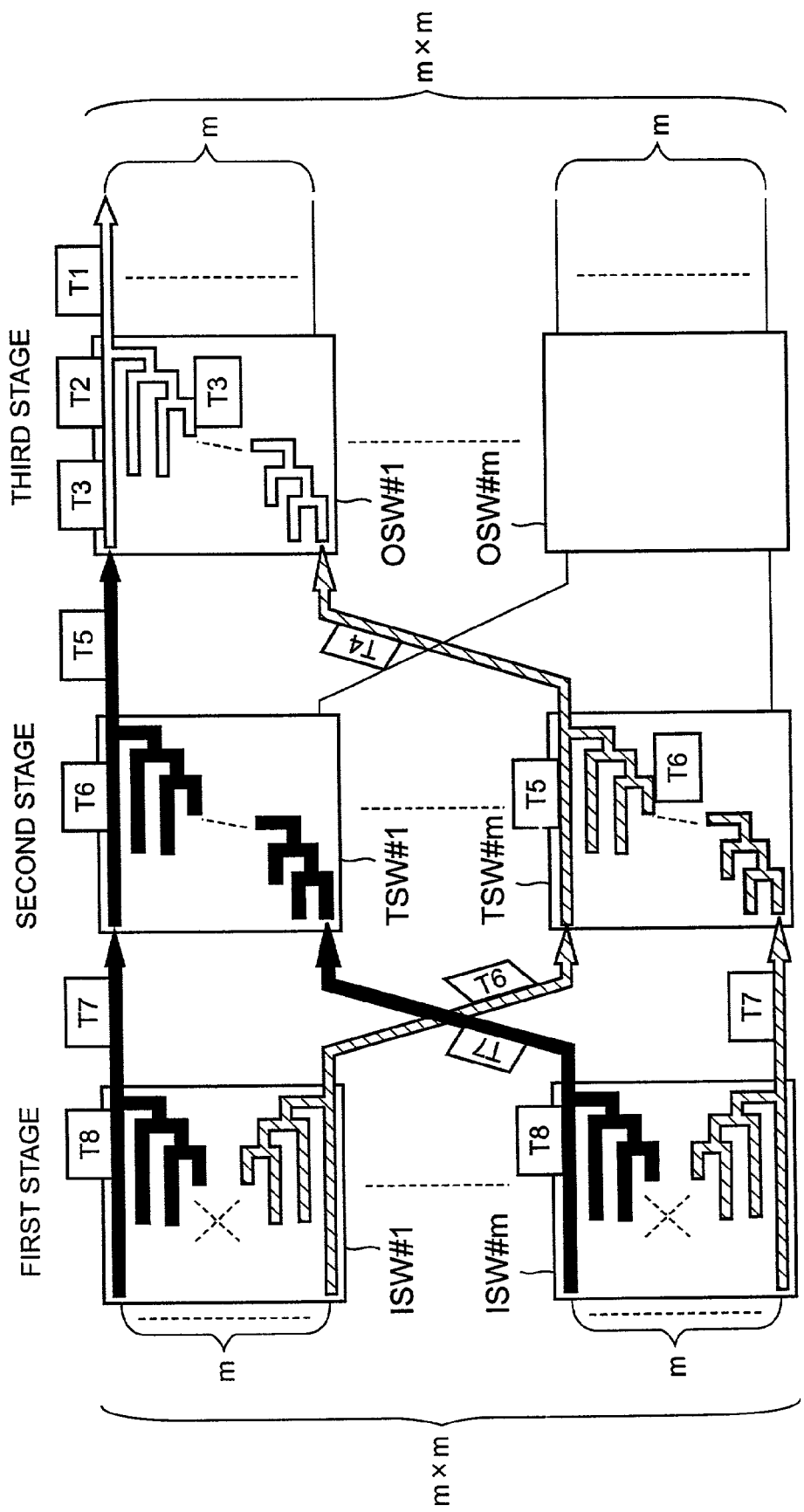
FIG. 11 is a block diagram of an ATM switch according to a first embodiment of the present invention.

First, the general outline of a first embodiment of the present invention for cell resequencing in an ATM switch will be described. FIG. 11 shows a block diagram of the ATM switch according to the first embodiment of the present invention. As shown in FIG. 11, the ATM switch includes m basic switches ISW#1–ISW#m at a first stage, m basic switches TSW#1–TSW#m at a second stage and m basic switches OSW#1–OSW#m at a third stage, each of the basic switches having m input lines and m output lines and each of the basic switches of a stage being connected to basic switches of a next stage, thereby forming an m×m input and m×m output ATM switch.

Each of the basic switches ISW#1–ISW#m, TSW#1–TSW#m and OSW#1–OSW#m refers to a time stamp written in a header of an input cell and carries out switching of the cell to an output port in ascending order of the time stamp. In the following description, it is assumed that each of the first, second and third stages has the same m basic switches. However, the ATM switch may be configured such that the first stage has m basic switches in which each basic switch has m input lines and n output lines, the second stage has n basic switches each of which basic switches has n input lines and n output lines and the third stage has m basic switches each of which basic switches has n input lines and m output lines. Each of m and n is a natural number, and m=n in the embodiment of the present invention.

Figure 14:
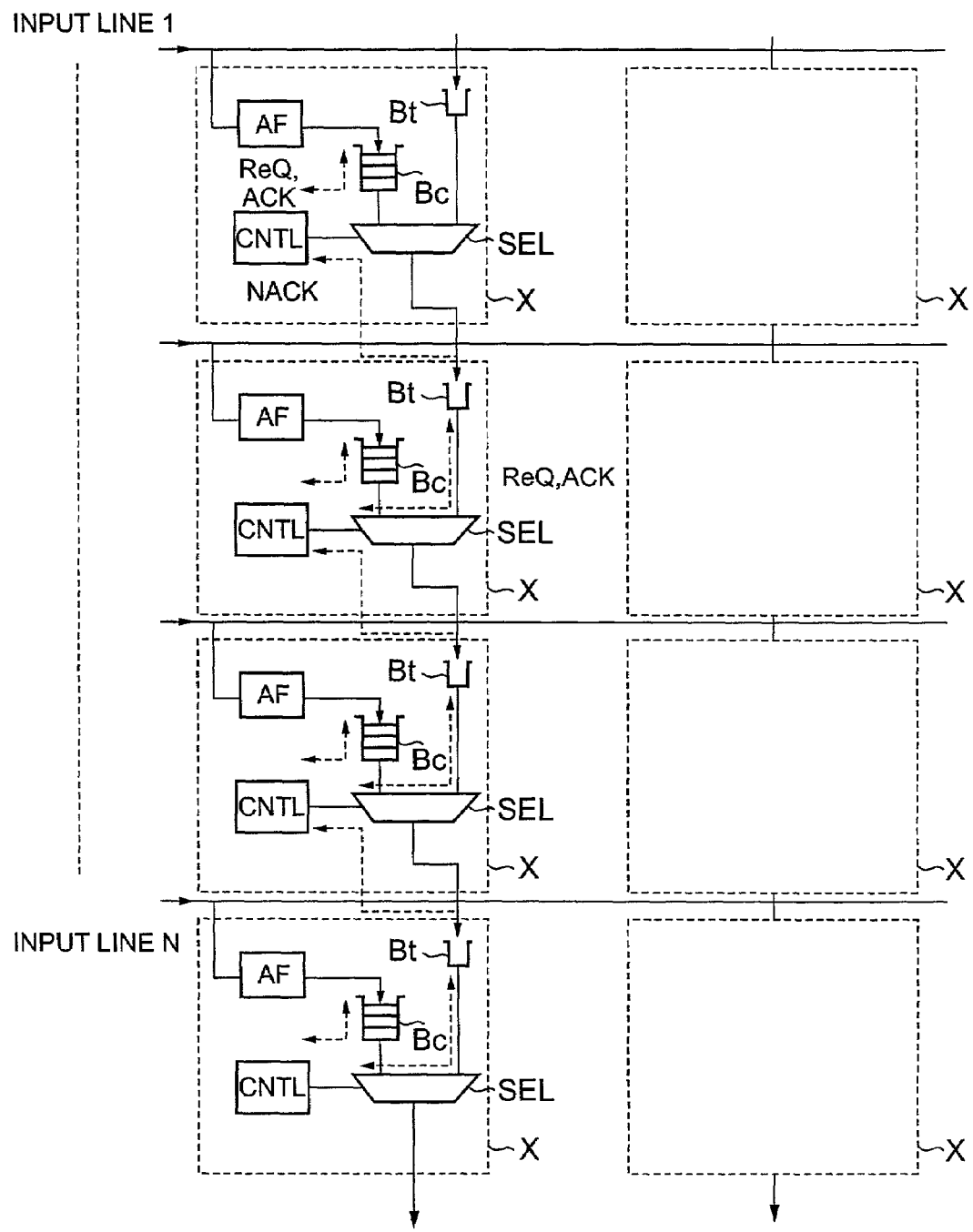
FIG. 14 is a block diagram of the basic switch according to the first embodiment of the present invention.

As will be described later with reference to FIG. 14, each of the basic switches has a cross-point X at the intersection of the input line and the output line. The cross-point X has a cross-point buffer Bc which temporarily stores cells arriving from the input line, a transit buffer Bt which temporarily stores cells arriving from an other cross-point X and an arbitration controller (CNTL) which compares a time stamp of a head cell in the transit buffer Bt with a time stamp of a head cell in the cross-point buffer Bc so as to send the cell with an earlier time stamp first to the output line.

Figure 19:
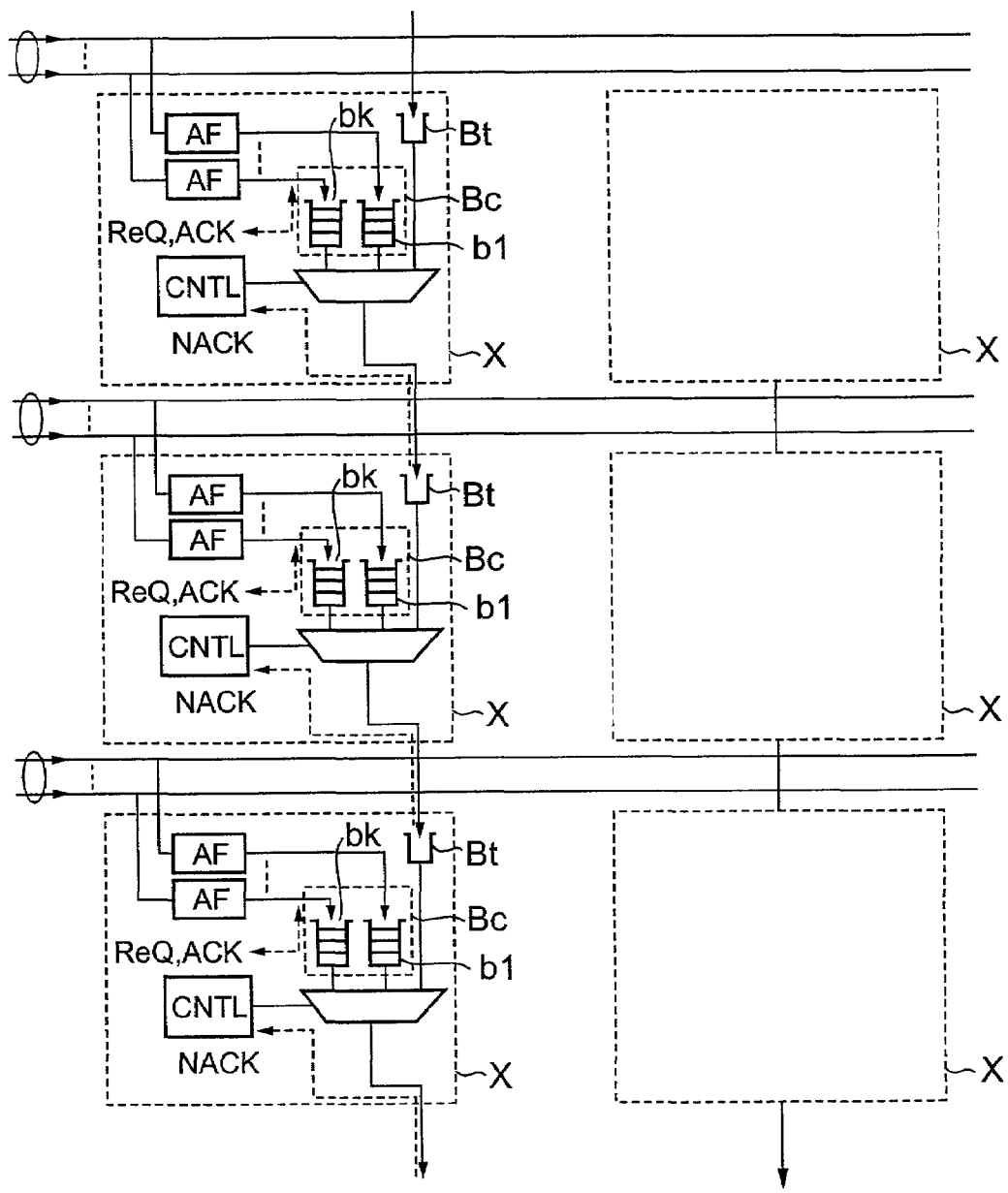
FIG. 19 is a block diagram of the basic switch according to the modification of the first embodiment of the present invention.

In addition, the basic switch can be configured as shown in FIG. 19 in which basic switch the input lines are classified into a plurality of groups. The basic switch has buffers b1–bk at the cross-point which buffers temporarily store cells arriving from the input lines of the corresponding group. Then, the earliest time stamp among time stamps of the stored cells is compared with the time stamp of a head cell in the transit buffer Bt such that a cell with an earlier time stamp is sent to the output line.

Figure 20:
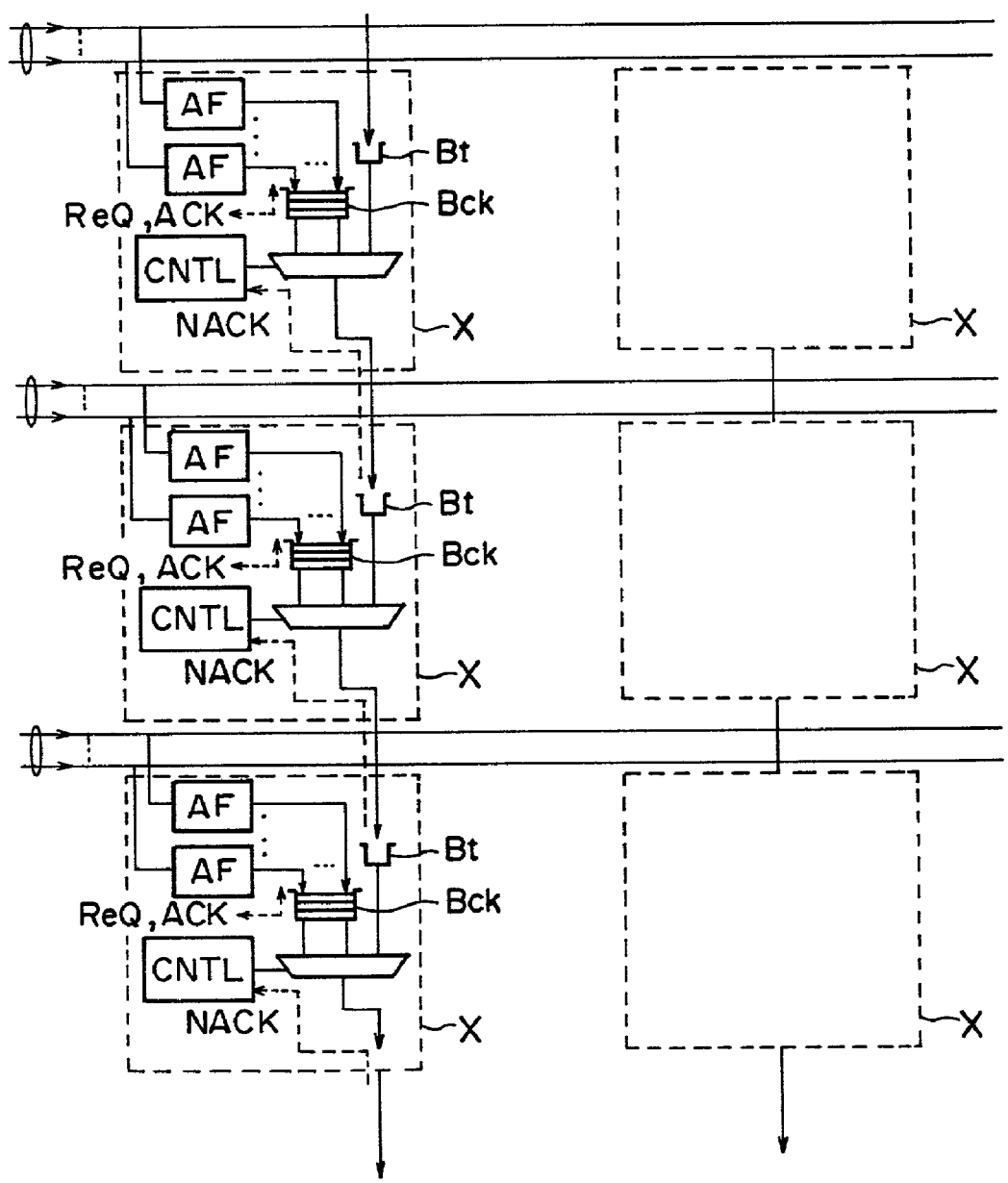
FIG. 20 is a block diagram of the basic switch when using a shared buffer.

Moreover, the basic switch can be configured as shown in FIG. 20. The basic switch shown in FIG. 20 has a shared cross-point buffer Bck instead of the buffers b1–bk shown in FIG. 19.

In the following, the first embodiment of the present invention will be described with reference to FIGS. 11–17.

Figure 12:
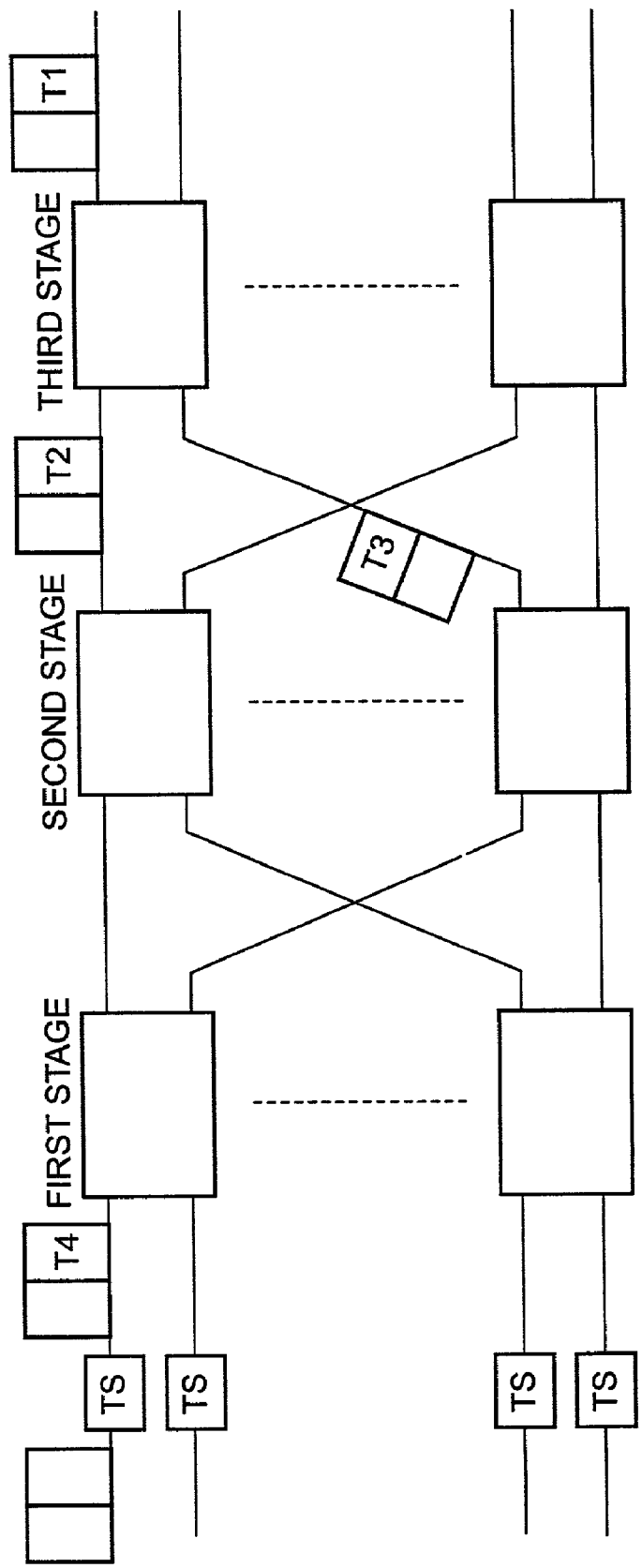
FIG. 12 shows time stamp adding parts TS.

As shown in FIG. 11, each of the basic switches ISW#1–ISW#m, TSW#1–TSW#m and OSW#1–OSW#m, has a cell-resequencing network, and refers to time stamp information which indicates an arriving time of a cell to the ATM switch and is written in the header of the cell, and concentrates cells in the ascending order of the time stamp value. The time stamp can be added to a cell in a time stamp adding part TS as shown in FIG. 12. As shown in FIG. 11, for example, in the basic switch OSW#1 of the third stage, a cell with a time stamp T1 is output first, then following cells are output in the order of time stamps T2 and T3. According to the present invention, since each of the basic switches has the cell-resequencing capability and the basic switches are connected hierarchically in the ATM switch, the cell sequence is ensured in any output line of the ATM switch, thereby the cell sequence being ensured in the multi stage environment of the ATM switch.

Since the ATM switch of the present invention carries out cell based routing, cells input in the ATM switch are distributed randomly to the basic switches TSW#1–TSW#m in the second stage regardless of VC, thereby load distribution of the basic switches in the second stage being realized. The cell distribution method will be described later.

As mentioned before, each of the basic switches has a hierarchical cell-resequencing network for switching cells to output ports in an ascending order of the time stamp by comparing the time stamps of the cells input from input ports.

In addition, in the multi stage switch in which basic switches are connected in a three-stage cross structure, the output of each basic switch is connected to the input of the next-stage basic switch, thus realizing a hierarchical structure of a larger scale cell-resequencing network.

Figure 13:
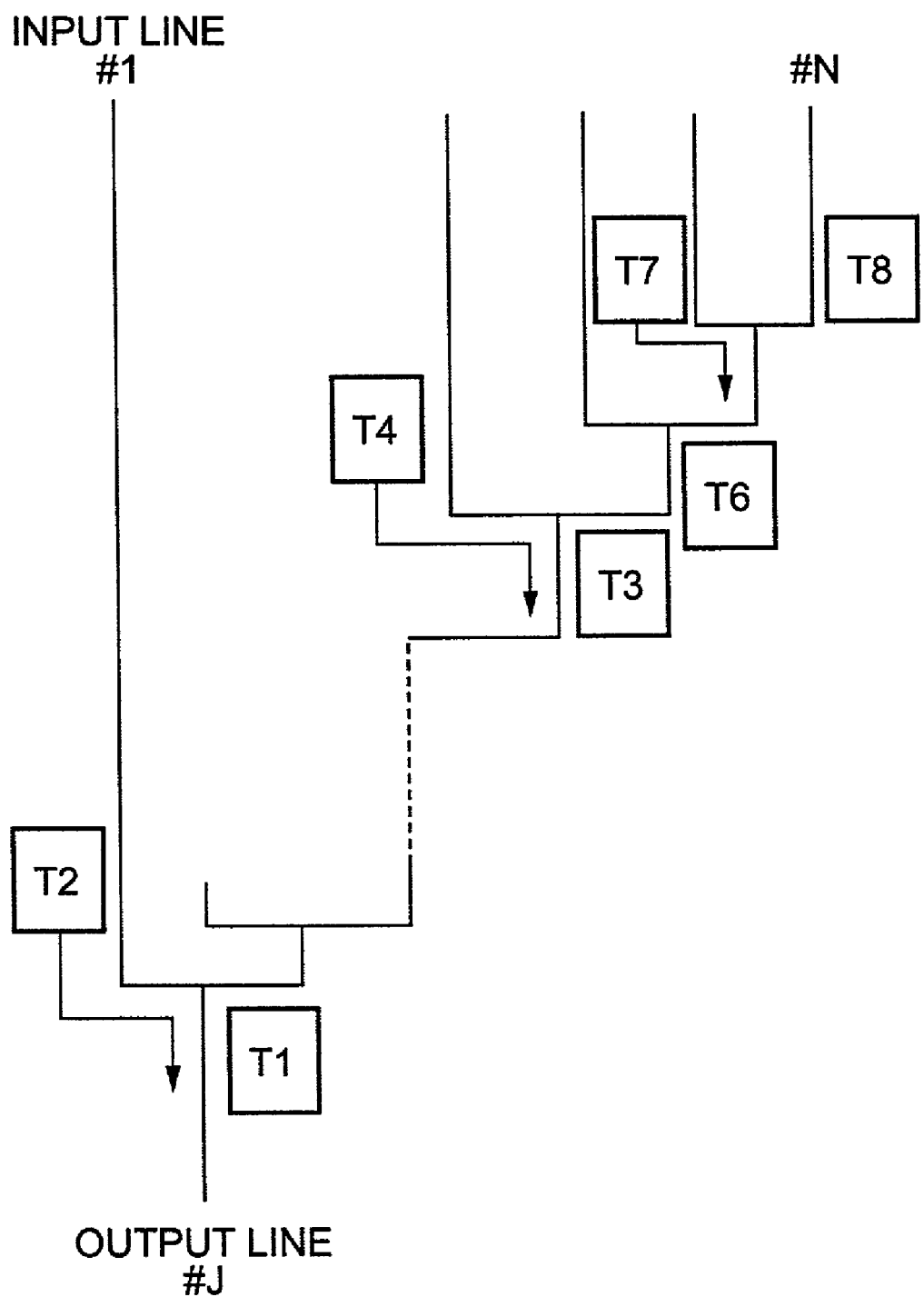
FIG. 13 is a topology of a hierarchical cell-resequencing network of a basic switch according to the first embodiment of the present invention.

FIG. 13 shows a topology of the hierarchical cell-resequencing network of the basic switch according to the first embodiment of the present invention.

In the example of this figure, it is shown that cells input to the input lines #1–#N are switched to an output line #J while ensuring the cell sequence. In this case, N−1 steps of the cell-resequencing are carried out until a cell arrives at the output line #J. The outline of the cell-resequencing will be described here, and later in detail. FIG. 14 is a block diagram of the basic switch which realizes the topology shown in FIG. 13. The basic switch shown in FIG. 14 is an example of a cross-point buffer type. Input lines #1–#N shown in FIG. 14 correspond to the input lines #1–#N shown in FIG. 14. Each of the input lines is connected to the output line #J through the cross-point of the switch. As shown in FIG. 14, the switch has an address filter AF and a cross-point buffer Bc for realizing the switching to the output line, a transit buffer Bt for storing cells from an upper cross-point, a selector and an arbitration controller CNTL at the cross-point. The selector is connected to both of the buffers and selects one of head cells in the two buffers so as to send the selected cell to a transit buffer of a lower cross-point. The arbitration controller CNTL determines which cell to send. Specifically, the arbitration controller CNTL obtains time stamp information written in the overheads of head cells in both buffers and selects a cell based on the information according to the following cell selection rule.

Selection rule 1: If both of the cross-point buffers and the transit buffer have a cell of the same type, the cell with the earliest time stamp is selected. If the time stamp of the cell in the cross-point buffer equals the time stamp of the cell in the transit buffer, the controller determines which cell to transmit by using the following rule. Consider the k-th cross-point buffer and k-th transit buffer from the top. The k-th cross-point buffer is selected with probability 1/k, while the k-th transit buffer is selected with probability (k−1)/k. The cell in the selected buffer is sent.

Selection rule 2: If the cross-point buffer and the transit buffer have head cells of different types, the cell with the earliest time stamp is selected. If the time stamp of the cell in the cross-point buffer equals the time stamp of the cell in the transit buffer, an actual cell (a non-dummy cell) is sent.

According to the above-mentioned cell selection rule, each controller selects a cell. Therefore, as shown in FIG. 13, when cells are input in the basic switch, the cells are switched to the destinations while the cell sequence is ensured by the above-mentioned control based on comparison between the time stamps. In the example shown in FIG. 13, a cell with a time stamp T2 is stored in the head of a cross-point buffer of an input line #1 and a cell with a time stamp T1 is stored in the head of a transit buffer of the input line #1. The time stamp comparison is carried out at the cross-point such that the cell with the earlier time stamp T1 in the transit buffer is selected and sent to the output line #J. In the basic switch, the same operation is carried out at each cross-point. Thus, the cell sequence is ensured 100% at the output line by the cell-resequencing network of N−1 level hierarchy in the case of N input lines.

In addition, in the configuration of the cell-resequencing network shown in FIG. 13, it is necessary to send a notification that there is no arriving cell at a cell time when a cell does not arrive at a cross-point. For this purpose, the time stamp adding part may generate a dummy cell and adds a time stamp of the corresponding time to the dummy cell when there is no input cell. Thereby, the switch can be notified of the absence of the cell at the time. In addition, the basic switch may send time stamp information of a cell to output ports which are different from the destination of the cell by generating and sending dummy cells on which the time stamp information of the cell is copied. According to the operation, all output ports can be notified of the service time of the input line. However, when it is allowed to send the dummy cells in the switch, the load in the switch may increase, and switching performances such as cell transfer delay time, cell loss, throughput and the like may deteriorate. To avoid such a deterioration, the switch allows overwriting of the dummy cell as described below.

When an actual cell newly arrives at an input line, the existing dummy cell is overwritten, and also when an dummy cell newly arrives at the input line, the existing dummy cell is overwritten. Even when carrying out such an operation, the service time of the input line will not be disturbed since the sequence of the time stamp information arrived at the input line is ensured.

Next, the configuration and the operation of the above-mentioned basic switch will be described more specifically. As mentioned above, the basic switch according to the first embodiment of the present invention has cross-points each of which cross-points X includes an address filter AF, a cross-point buffer Bc, a transit buffer Bt, an arbitration controller CNTL and a selector, in which the cross-points are connected in tandem.

A cell input to the basic switch is extracted by the address filter if the destination of the cell corresponds to the output port with reference to a routing bit in the header of the cell, and the cell is stored in the cross-point buffer Bc which corresponds to the output port. Each of the transit buffer Bt and the cross-point buffer Bc sends a transmit request (ReQ) to the arbitration controller CNTL when each of the buffers have a cell.

The arbitration controller CNTL which receives the transmit request signal (ReQ) selects a cell according to a cell transmit selection algorithm below unless the arbitration controller CNTL receives a not-acknowledgment signal (NACK) from a transit buffer Bt of a lower cross-point. Then, the arbitration controller CNTL sends an acknowledgment signal (ACK) to the cross-point buffer Bc or to the transit buffer Bt and switches the selector SEL such that the head cell in the buffer which has received the acknowledgement signal (ACK) is sent to a lower transit buffer Bt. If the lower transit buffer Bt is full, the buffer sends a non-acknowledgment signal (NACK) to the arbitration controller CNTL to stop the upper buffer from sending cells.

In addition, conventionally, the address filter AF takes a cell which has a predetermined address and discard a cell which has another address. However, according to the embodiment of the present invention, the address filter AF, when discarding the cell which has the other address, takes time stamp information of the cell and generates a dummy cell having the time information. The dummy cell is used for a sending control.

In the following, the cell transmit control algorithm in each arbitration controller will be described with reference to FIGS. 15 and 16.

The cell transmit control algorithm has two patterns depending on the position of the cross-point. One pattern is taken when the cross-point is in a most upper position and another pattern is taken when it is in other positions.

Figure 15:
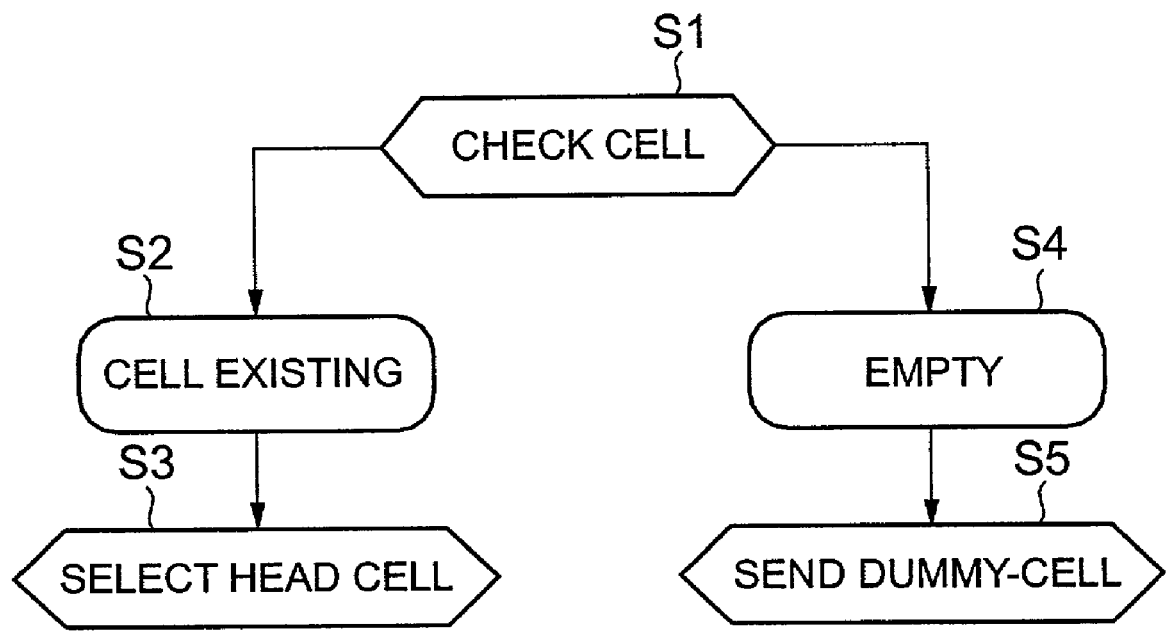
FIG. 15 is a flowchart showing a cell selection algorithm in at cross-point of the most upper position.
Figure 16:
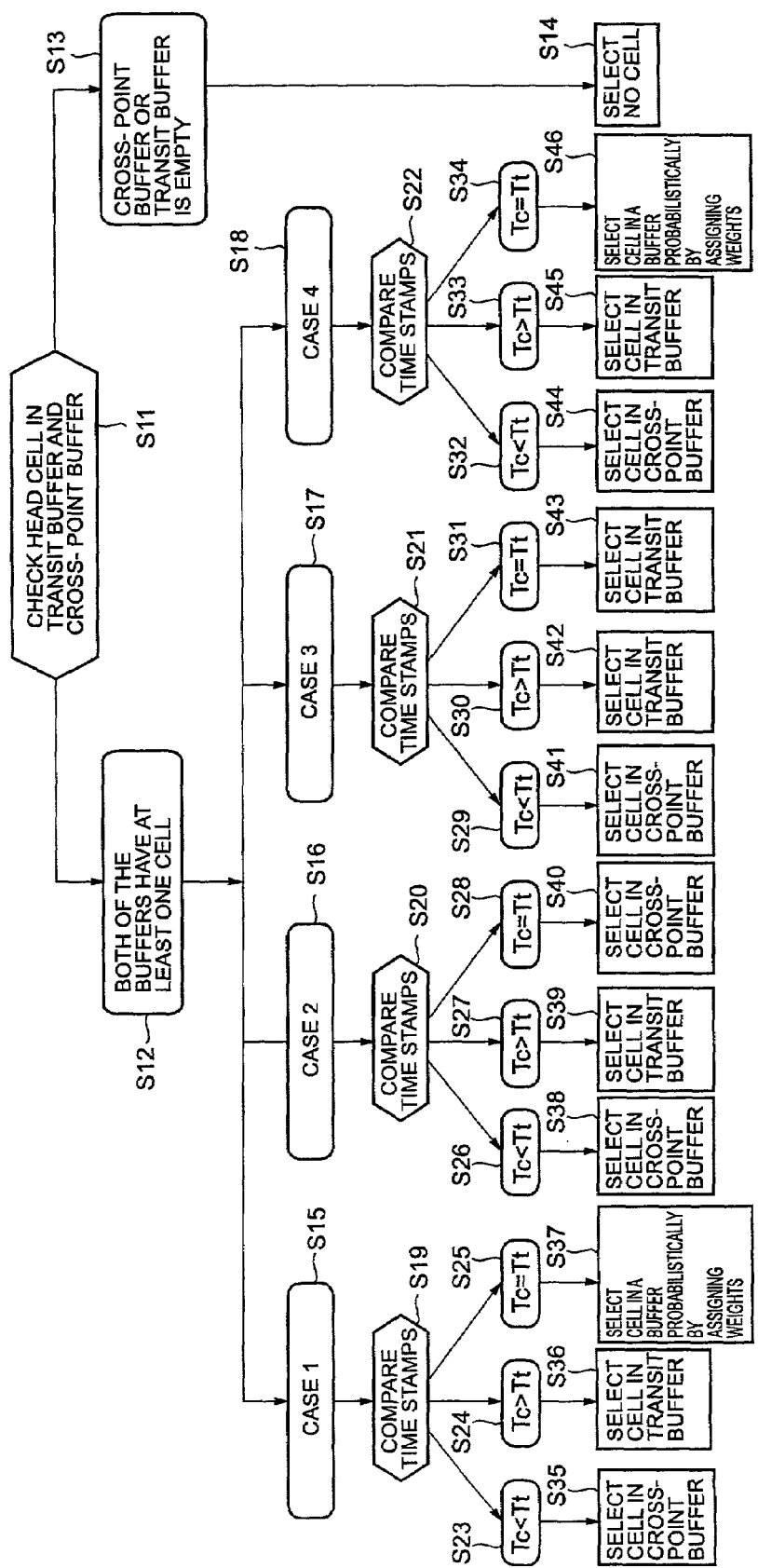
FIG. 16 is a flowchart showing a cell selection algorithm at a cross-point of a position other than the most upper position.

As shown in FIG. 15 showing the case of the most upper position, since a cell never arrives at the transit buffer Bt, the arbitration controller CNTL operates according to the state of the cell buffered in the cross-point buffer Bc. First, when a transmit request signal (ReQ) is sent from the cross-point buffer Bc, the controller CNTL checks the head cell (step 1). If there is a cell (step 2), which is an actual cell or a dummy cell, the controller controls a selector signal so as to select the head cell in the cross-point buffer Bc (step 3) and send the head cell to the lower transit buffer Bt.

As mentioned before, the dummy cell is for notifying a lower arbitration controller CNTL of the absence of an arriving cell at the time written in the dummy cell. When there is no cell buffered in the cross-point buffer Bc (step 4), which means that there is no cell arriving at the time, the controller CNTL instructs the cross-point buffer Bc to send a dummy cell which has the current cell time to the lower transit buffer Bt notifying the lower controller CNTL of the absence of a cell (step 5). According to the operation of sending the dummy cell, the lower controller CNTL can effectively carry out cell sequence comparison.

Next, the cell selection algorithm of the arbitration controller in a k-th cross-point X will be described with reference to FIG. 16, where k is not equal to 0, that is, the cross-point is not in the most upper position. First, the arbitration controller CNTL determines whether the cross-point buffer Bc and/or the transit buffer Bt has a cell by receiving a transmit request signal (ReQ) from the cross-point buffer Bc and/or the transit buffer Bt (step 11). When the cross-point buffer Bc or the transit buffer Bt does not have a cell (step 13), the arbitration controller CNTL sends a not-acknowledgment signal (NACK) to each of the buffers so as to stop the buffers from sending a cell because sending a cell without the cell sequence comparison may cause cell sequence disorder (step 14). When both of the buffers have at least one cell and send the ReQ signal to the arbitration controller CNTL (step 12), the cell selection control algorithm is as follows, being classified into 4 cases according to the type of the buffered cell.

Case 1: an actual cell is buffered in each of the cross-point buffer Bc and the transit buffer (step 15).

Case 2: an actual cell is buffered in the cross-point buffer Bc and a dummy cell is buffered in the transit buffer Bt (step 16).

Case 3: a dummy cell is buffered in the cross-point buffer Bc and an actual cell is buffered in the transit buffer Bt (step 17).

Case 4: a dummy cell is buffered in each of the cross-point buffer Bc and the transit buffer (step 18).

The arbitration controller CNTL selects a buffer for sending a cell according to the following control algorithm. In every case, in the beginning, the time stamp of the head cell in one buffer is compared with the time stamp of the head cell in another buffer (steps 19–22). In the following description, the time stamp of the cell buffered in the cross-point buffer Bc is represented as Tc and the time stamp of the cell buffered in the transit buffer Bt is represented by Tt.

In the case 1, if Tc<Tt (step 23), the cell arbitration controller returns an ACK signal to the cross-point buffer Bc and controls the selector SEL so as to select the cross-point buffer Bc (step 35). If Tc>Tt (step 24), the cell arbitration controller returns an ACK signal to the transit buffer Bt and controls the selector SEL so as to select the transit buffer Bt (step 36). When Tc=Tt (step 25), the arbitration controller selects a buffer to send a cell probabilistically by assigning weights to the cross-point buffer Bc and the transit buffer BT of 1: k−1, sends an ACK signal to the selected buffer and controls the selector SEL (step 37). The reason for assigning the weight of k−1 to the transit buffer is that the transit buffer Bt of the k-th cross-point is interconnected with k−1 upper cross-points. Accordingly, a cell is fairly selected.

In the case 2, if Tc<Tt (step 26), the cell arbitration controller CNTL returns an ACK signal to the cross-point buffer Bc and controls the selector SEL so as to select the cross-point buffer Bc (step 38). If Tc>Tt (step 27), the cell arbitration controller returns an ACK signal to the transit buffer Bt and controls the selector SEL so as to select the transit buffer Bt (step 39). If Tc=Tt (step 28), since the cross-point buffer Bc has an actual cell and the transit buffer Bt has a dummy cell, taking into account that the cross-point buffer Bc has higher priority, the arbitration controller CNTL returns an ACK signal to the cross-point buffer and controls the selector SEL so as to select the cross-point buffer Bc (step 40).

In the case 3, if Tc<Tt (step 29), the cell arbitration controller CNTL returns an ACK signal to the cross-point buffer Bc and controls the selector SEL so as to select the cross-point buffer Bc (step 41). If Tc>Tt (step 30), the cell arbitration controller returns an ACK signal to the transit buffer Bt and controls the selector SEL so as to select the transit buffer Bt (step 42). If Tc=Tt (step 31), since the cross-point buffer Bc has a dummy cell and the transit buffer Bt has an actual cell, taking into account that the transit buffer Bc has higher priority, the arbitration controller CNTL returns an ACK signal to the transit buffer Bt and controls the selector SEL so as to select the transit buffer Bt (step 43).

Finally, in the case 4, the arbitration controller operates according to the same algorithm of the case 1. That is, if Tc<Tt (step 32), the cell arbitration controller returns an ACK signal to the cross-point buffer Bc and controls the selector SEL so as to select the cross-point buffer Bc (step 44). If Tc>Tt (step 33), the cell arbitration controller returns an ACK signal to the transit buffer Bt and controls the selector SEL so as to select the transit buffer Bt (step 45). When Tc=Tt (step 34), the arbitration controller selects a buffer to send a cell probabilistically by assigning weights to the cross-point buffer Bc and the transit buffer BT of 1: k–1, sends an ACK to the selected buffer and controls the selector SEL (step 46).

Figure 17:
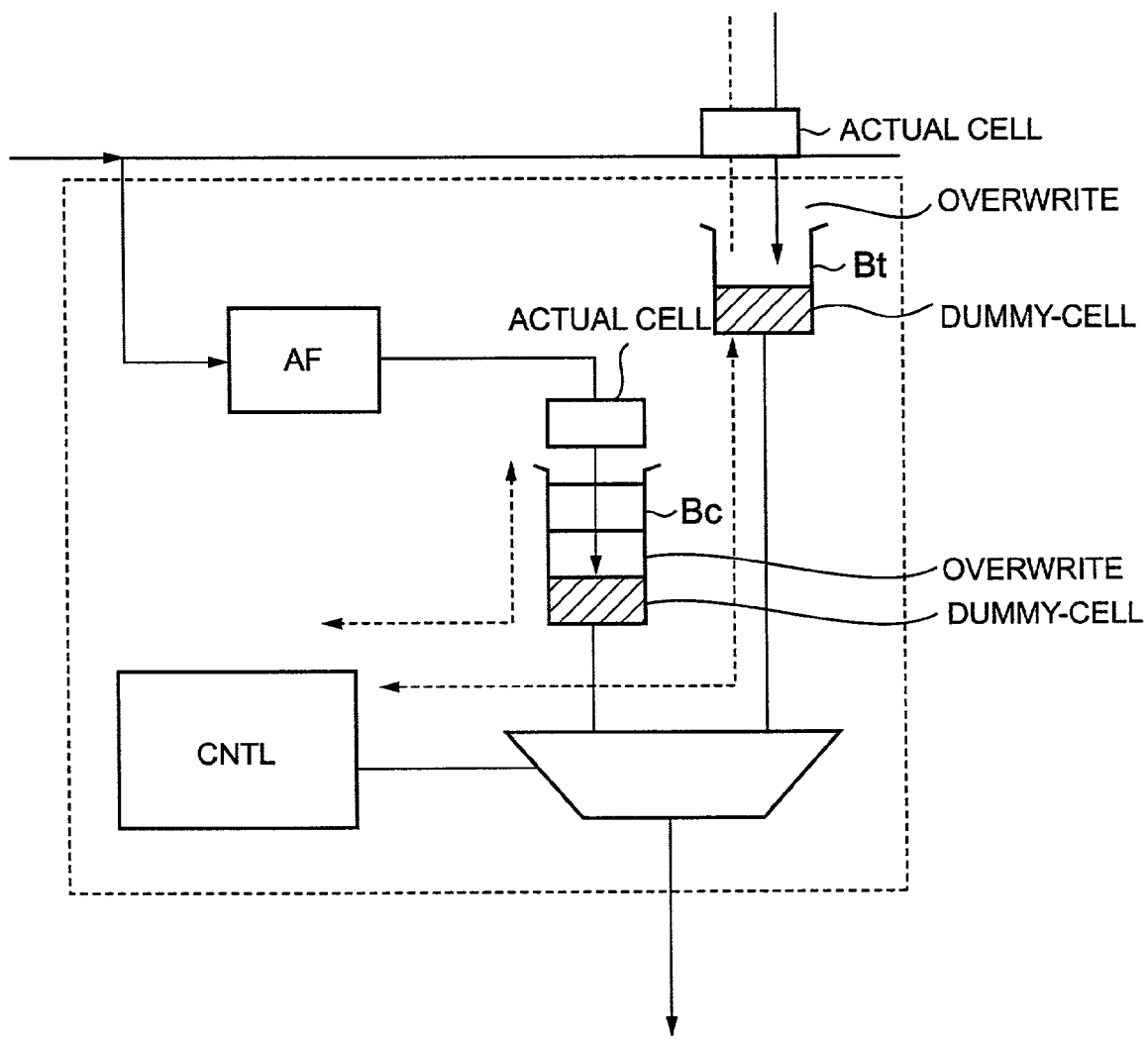
FIG. 17 is a diagram showing that a dummy cell is overwritten by an actual cell.

In the operation according to the above mentioned algorithm, when a cell is sent from an upper cross-point X to a transit buffer Bt and when a cell is sent from a basic switch of a stage to a basic switch of the next stage, the cell transfer delay time may increase because dummy cells sent for notifying time information may increase the load of the ATM switch. To prevent such a cell transfer delay, the basic switch allows a dummy cell buffered in each of the cross-point buffer Bc and the transit buffer Bt to be overwritten with an arriving cell as shown in FIG. 17, and thereby the comparison between time stamps is carried out effectively and the increase of the cell transfer delay can be kept to a minimum.

Since cells are switched according to the above mentioned control algorithm, cells which are sent to an output port in the basic switch are switched while the cell sequence is ensured as shown in FIG. 13. In addition, as shown in FIG. 11, since the multi stage ATM switch of the present invention is configured such that the basic switches are hierarchically interconnected so as to form a multi stage cell-resequencing network, and each of the basic switches has the above mentioned hierarchical cell-resequencing network, cell-resequencing in the ATM switch as a whole can be possible.

Figure 18:
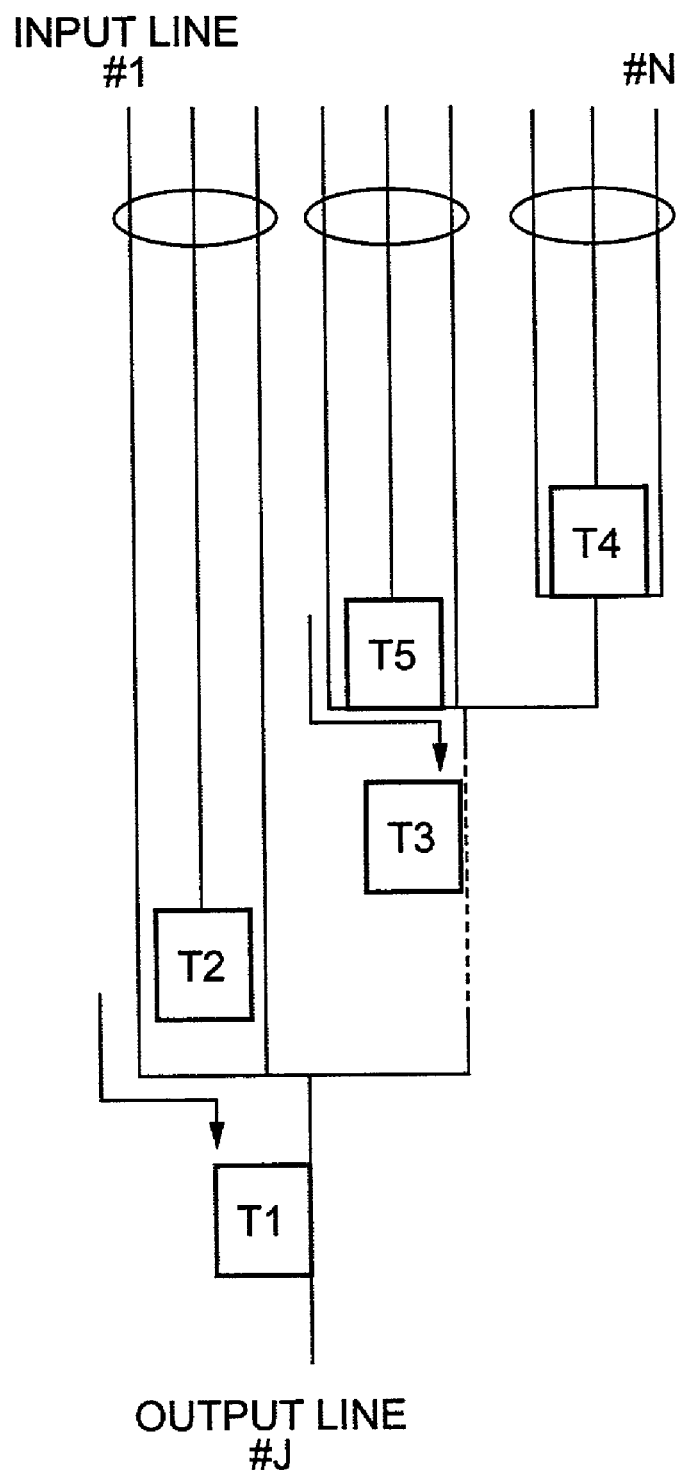
FIG. 18 is a diagram for explaining a principle of cell resequencing according to a modification of the first embodiment of the present invention.

In the following, a modification of the first embodiment will be described with reference to FIG. 18 and FIG. 19. FIG. 18 is a diagram for explaining a principle of cell resequencing according to the modification of the first embodiment of the present invention. In this modification, input lines are grouped by k. The differences between the modification and the embodiment shown in FIG. 13 are the number of the address filters and the cross-point buffers, and the selector which can selects a cell among k+1 cells.

In this example, k time stamps of the head cell of k cross-point buffers are checked first. Then, a buffer which has the cell with the minimum time stamp value becomes a representative cross-point buffer so that a cell in the representative cross-point buffer or the transit buffer is selected according to the above-mentioned cell selection algorithm. Therefore, the topology of the cell-resequencing network becomes the topology shown in FIG. 18.

According to the example, since the earliest time stamp among the time stamps of the head cells of the k buffers b1–bk is compared with the time stamp of the transit buffer Bt, the number of the hierarchies of the cell-resequencing network can be reduced to 1/k while keeping the size of the basic switch. By adopting this basic switch, an ATM switch having superior cell transfer delay characteristics can be realized due to the reduced hierarchies. In this case, other operations are the same as those of the first embodiment.

In addition, FIG. 20 shows another example in which a shared buffer is used as the cross-point buffer Bck instead of the above-mentioned k buffers b1–bk. According to this architecture, since a buffer can be shared for the grouped k input lines, the size of the cross-point buffer can be reduced. The control process of the arbitration controller CNTL is the same as mentioned above.

The cell transfer delay time performance of the hierarchical cell-resequencing ATM switch largely depends on the input load of the ATM switch, which performance is similar to that of an output buffer type switch. Therefore, if the input load is brought near to 1.0 asymptotically, the cell transfer delay time steeply increases. Therefore, to avoid the problem, it is desirable to decrease the input load apparently by a speedup of the ATM switch. A value of 1.2–1.3 is adequate for the factor of the speedup, since 0.8 is adequate for the input load to be decreased.

According to the basic switch of the first embodiment of the present invention, time stamps universal for the ATM switch are added and time information is compared. In order to add the time stamps universally, the time stamp adding part is configured as a synchronous circuit which has a synchronous counter for adding the time stamps which are completely synchronized in the input stage of the multi stage switch. The time stamp adding part writes a value of the synchronous counter in the overhead of an arriving cell as time information, and then, the cell-resequencing is realized based on the time information.

Figure 21:
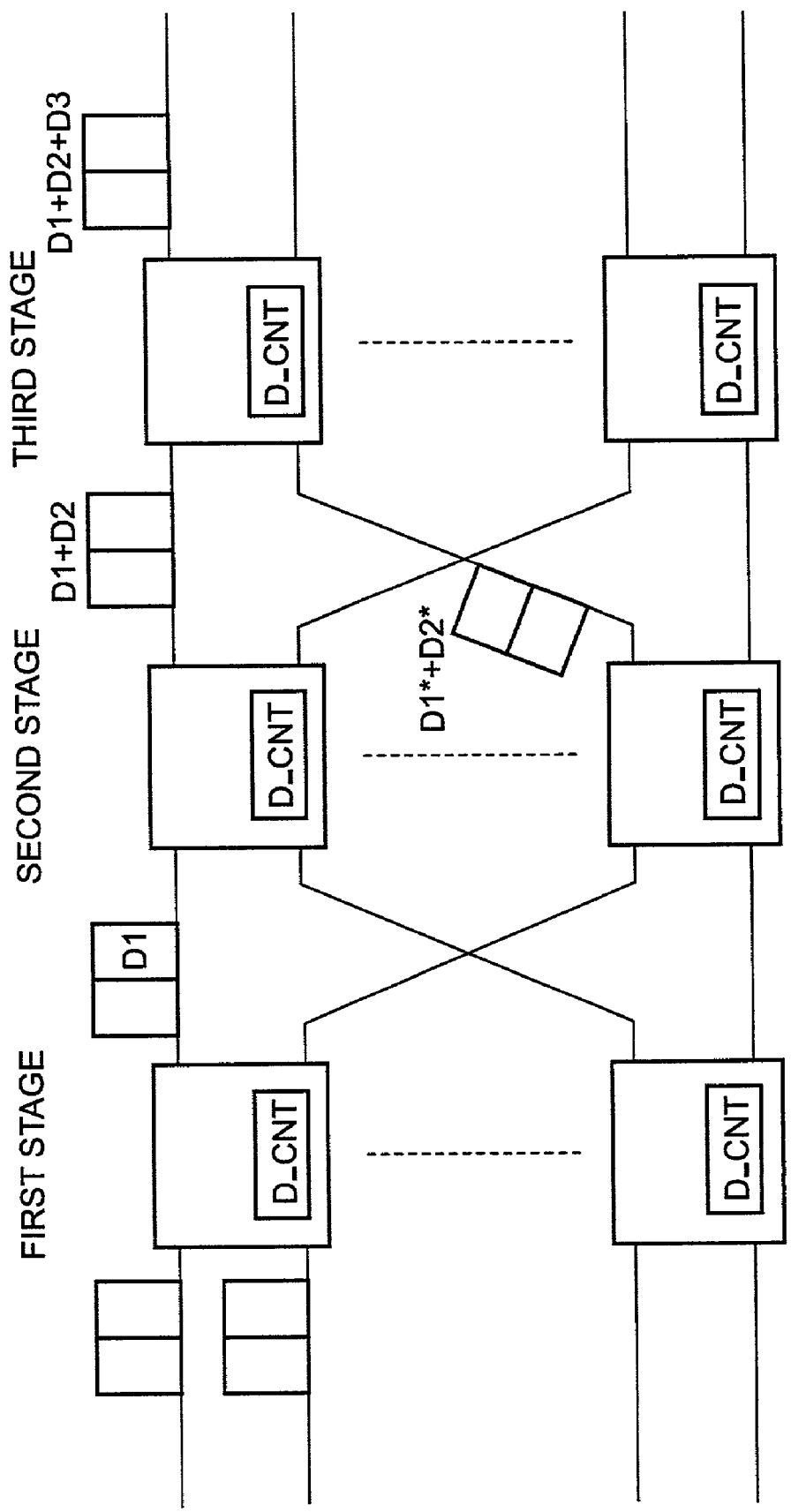
FIG. 21 shows delay time counters.

As shown in FIG. 21, the ATM switch can be configured such that a delay time counter D-CNT, which is provided in each of the basic switches, adds the delay time so as to compare the calculated time. Specifically, the delay time is accumulated starting when a cell is input in a basic switch until the time comparison is carried out by the arbitration controller, and thereby the cell resequencing is carried out based on the accumulated delay time. It is recognized that the cell with a longer delay time was input earlier than the cell with a shorter delay time. Therefore, by calculating back to the cell arriving time from the delay time, the cell resequencing can be realized as in the case of using the time stamp.

Thus, according to the first embodiment of the present invention, since input cells are routed cell by cell while ensuring the cell sequence, traffic distribution in a multi stage switch can be realized and a non-blocking switch can be realized without a speedup technique.

Figure 22:
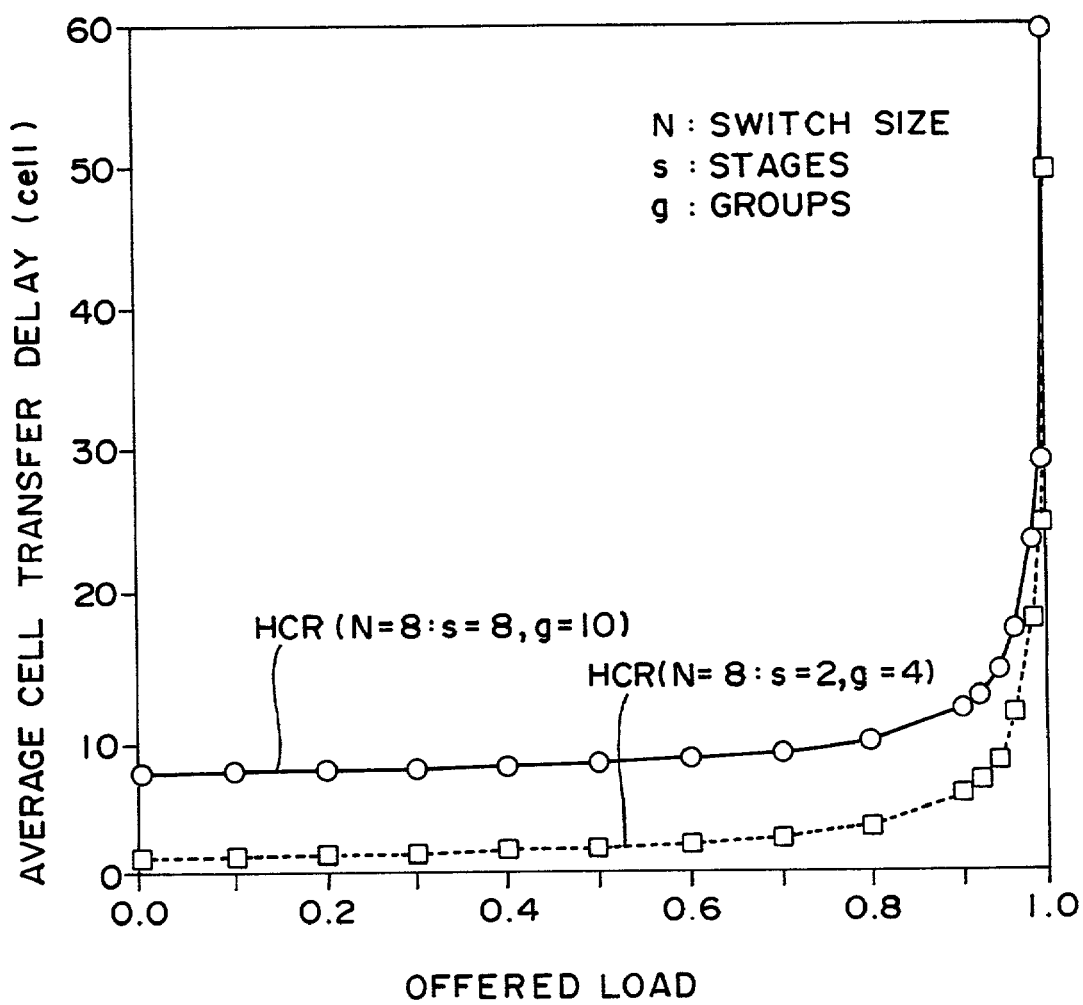
FIG. 22 is a graph showing a cell transfer delay performance of the ATM switch of the present invention evaluated by a computer simulation.

FIG. 22 is a graph showing a cell transfer delay performance of the ATM switch of the present invention evaluated by a computer simulation. The horizontal axis shows the offered load and the vertical axis shows the average cell transfer delay. As shown in the graph, the cell transfer delay time steeply increases as the offered load comes near to 1.0. This delay performance is identical to that of a conventional output buffer type switch except for the extra delay due to the cell resequencing, the extra delay depending on the number of resequencing steps. The result shows that the ATM switch of the present invention has a switch architecture realizing the throughput 1.0. Therefore, the ATM switch having the cell-resequencing capability can be realized by the present invention without a sorting circuit provided in each output port.

Further, according to the first embodiment of the present invention, a scalable and cost-effective architecture can be realized such that the input/output ports of the basic switch are interconnected to form a large-scale hierarchical cell-resequencing network. As a result, efficiency of a network can be improved by the cost-effective large scale switch.

As mentioned above, according to the present invention, the cell-resequencing of the ATM switch is performed in each basic switch in a decentralized autonomous manner without sorting a large number of cells. In addition, the ATM switch can be expanded by interconnecting an ATM switch block which is, for example, the three-stage ATM switch.

Next, a second embodiment of the present invention will be described. First, a general description will be given. The second embodiment of the present invention includes a hierarchical cell-resequencing network which is different from that of the first embodiment.

Figure 23:
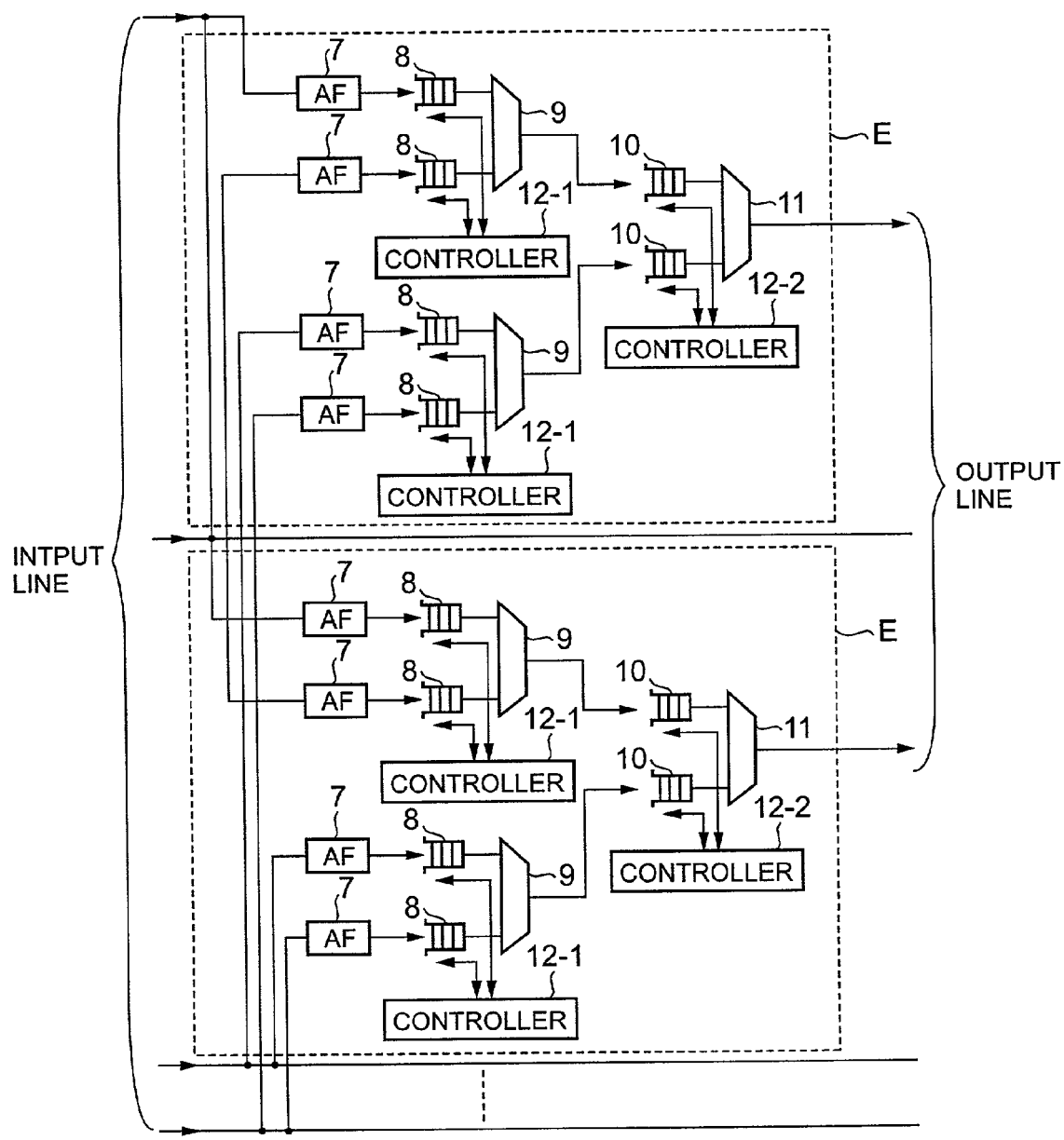
FIG. 23 is a block diagram of the basic switch according to a second embodiment of the present invention.

FIG. 23 is a block diagram of a basic switch element (E) of the second embodiment. As shown in FIG. 23, the basic switch includes a basic switch element which has controllers 12-1, 12-2 and selectors 9,11. The controller compares time stamps of cells from input lines of a group. The selector selects a cell with the earliest time stamp according to the comparison. In the basic switch element, the output line of the selector 9 is the input line of an output buffer 10.

Figure 24:
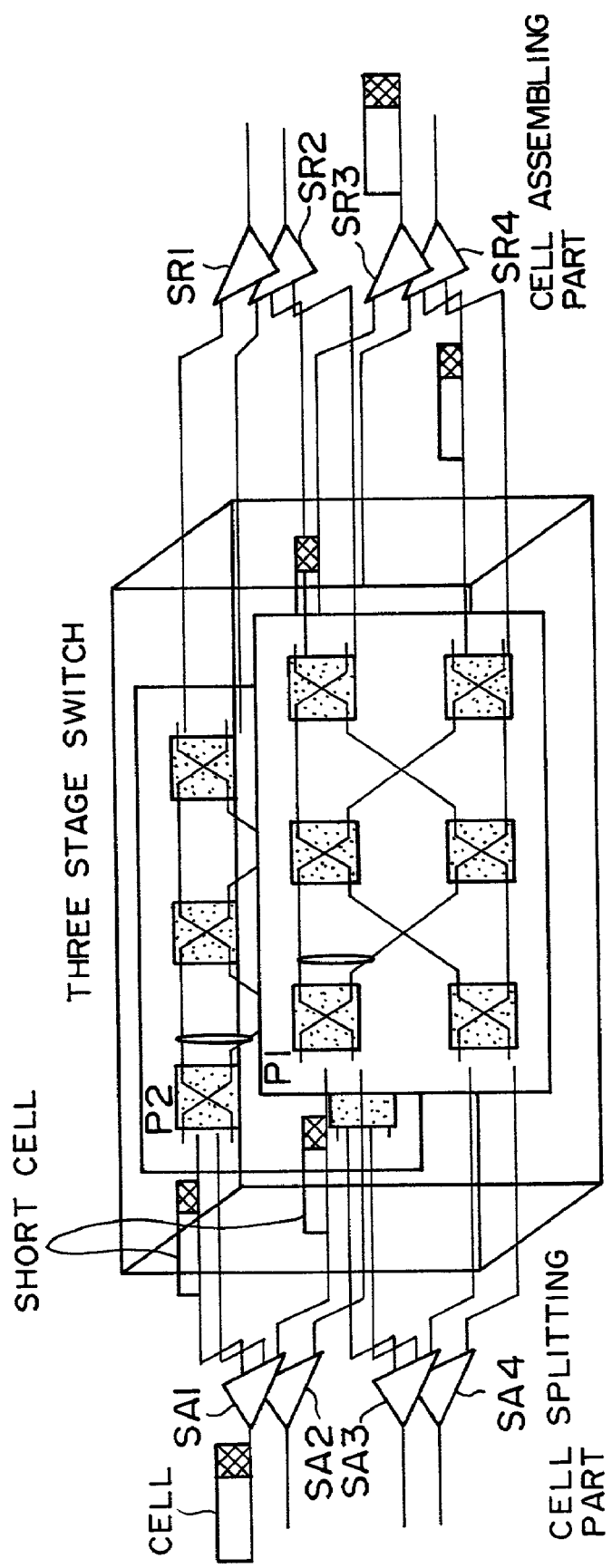
FIG. 24 is a conceptual diagram showing the ATM switch according to the second embodiment of the present invention.
Figure 26:
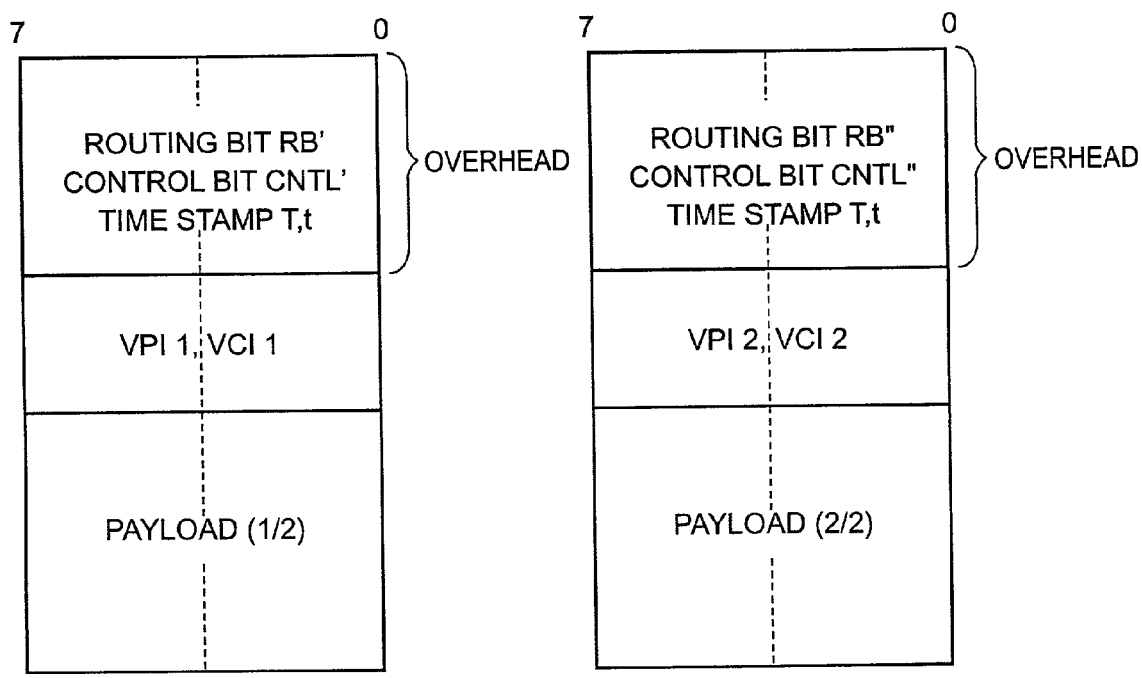
FIG. 26 shows an example of short cells.

As shown in FIG. 24, the ATM switch of the embodiment of the present invention has switches P1 and P2 in parallel, each of the switches including the basic switch shown in FIG. 23. In addition, the ATM switch includes cell splitting parts SA1–SA4 and cell assembling parts SR1–SR4. The cell splitting part splits a cell into a plurality of short cells and sends the short cells to the basic switches. Specifically, the cell splitting part splits the payload of the cell and rewrites the overhead of each split payload as shown in FIG. 26. Additionally, the cell splitting part adds a first time stamp to an arriving cell and adds a second time stamp to the split short cell. The cell assembling part assembles the short cells which are sent through the switches.

The switches P1 and P2 carry out short cell resequencing in the basic switch according to the first time stamp. The cell assembling part SR1–SR4 carry out cell resequencing according to the second time stamp.

In the description of the second embodiment of the present invention, the ATM switch having the two switches P1 and P2 is taken as an example. But, the description can be applied to an ATM switch having n switches P1–Pn (n is a natural number) in parallel. Also, the description can be applied to m cell splitting parts SA1–SAm and m cell assembling parts SR1–SRm (m is a natural number). In other words, a scalable switch architecture can be realized by the ATM switch of the present invention. In addition, the configuration of the switch is not limited to the three-stage type.

In the following, the second embodiment of the present invention will be described in detail.

As shown in FIG. 24, as mentioned before, the ATM switch of the present invention includes the cell splitting parts SA1–SA4, the switches P1 and P2, and the cell assembling part SR1–SR4. The cell splitting parts SA1–SA4 split a cell into short cells, distribute the short cells and add time stamps. The switches P1 and P2 carry out cell-resequencing based on cell based routing and time stamp information.

In the embodiment, a cell is split into two short cells each of which short cell is switched in the switch P1 or P2.

Each of the switches includes basic switches connected in a three-stage manner.

Figure 25:
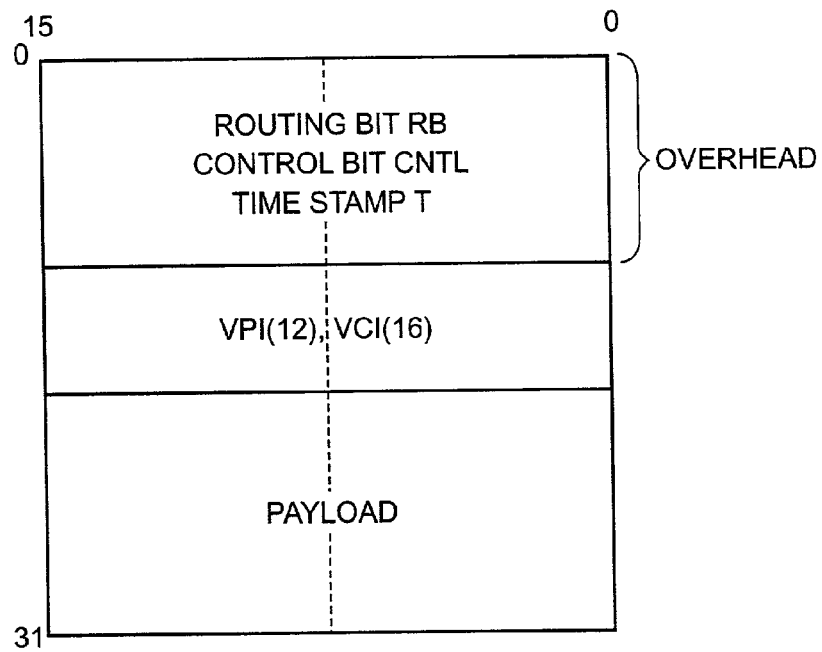
FIG. 25 shows an example of a cell format of a 64-byte length on the assumption that the cells are transmitted in parallel using 16 highways.

Next, a switching process of a cell input to the ATM switch will be described in chronological order. First, the cell which is input to the ATM switch is input to one of the cell splitting parts SA1–SA4. The cell splitting part splits the input cell spatially, generating short cells which can be sent with a low number of parallel signals for transmission. FIG. 25 shows an example of a cell format of 64-byte length on the assumption that the cells are transmitted in parallel on 16 highways. FIG. 26 shows an example of the short cell. In this example, as shown in the FIGS. 25 and 26, a cell of 16 bits×32 words is split into a short cell of 8 bits×32 words.

Since the two split switches are used adopting the short cell format, the number of high speed signals input to the switches P1 and P2 can be reduced. Therefore, it is possible to minimize the number of LSI chips necessary for the switches P1 and P2.

Each of the cell splitting parts SA1–SA4 distributes the short cells to the switches P1 and P2 when splitting a cell. For this purpose, routing bits RB' and RB" for distribution are added cyclically in the cell splitting parts SA1–SA4. The information of the routing bit RB is written with RB' and RB", the routing bit RB being used for switching within the switch.

Figure 27:
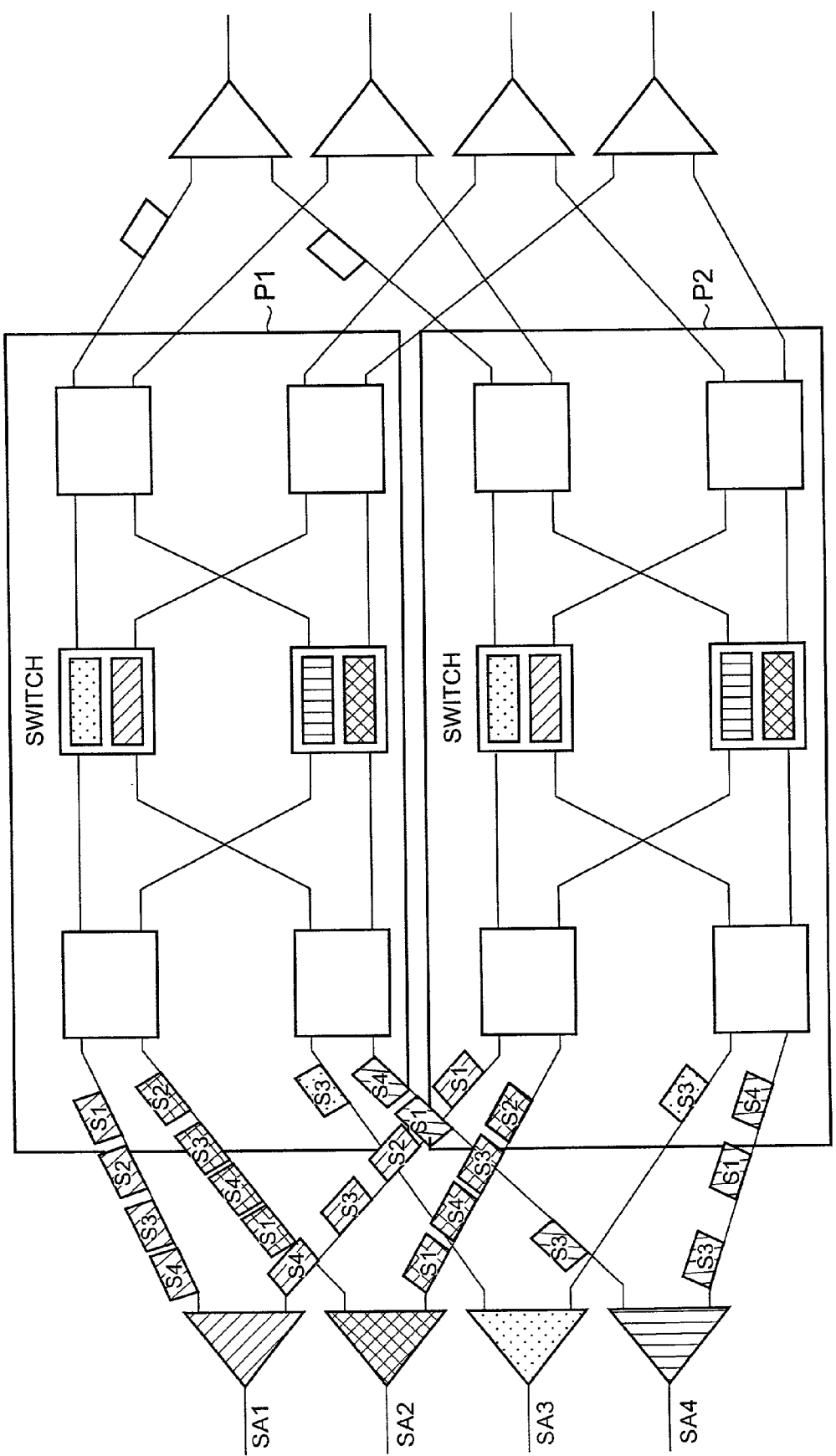
FIG. 27 shows a case in which each of input cells are split and the split short cells are distributed to basic switches of second stages in each of the two switches P1 and P2.

FIG. 27 shows a case in which each of input cells are split and the split short cells are distributed to basic switches of the second stage in each of the two switches P1 and P2. FIG. 28 shows a periodic table for allocating the second stage. In this example, the cell splitting part SA1 adds routing bits to the short cells cyclically in the order of S1→S2→S3→S4 at the times of T1–T4.

In addition, the cell splitting part SA2 cyclically adds routing bits of S2→S3→S4→S1, the cell splitting part SA3 adds routing bits of S3→S4→S1→S2 and the cell splitting part SA4 adds routing bits of S4→S1→S2→S3. Therefore, the cell traffic can be distributed between the switches P1 and P2 such that the basic switches of the second switch have the same load performance. Thus, two split short cells are switched in the two switches P1 and P2 in the same manner and the same cell transfer delay is added to the short cells before the short cells arrive at the outputs. Another cell distribution method will be described later.

In the embodiment, the distributed short cells need to be switched while ensuring the cell sequence for preventing cell sequence disorder. Therefore, each of the cell splitting parts SA1–SA4 adds a time stamp T to a short cell for identifying the cell sequence.

Figure 29:
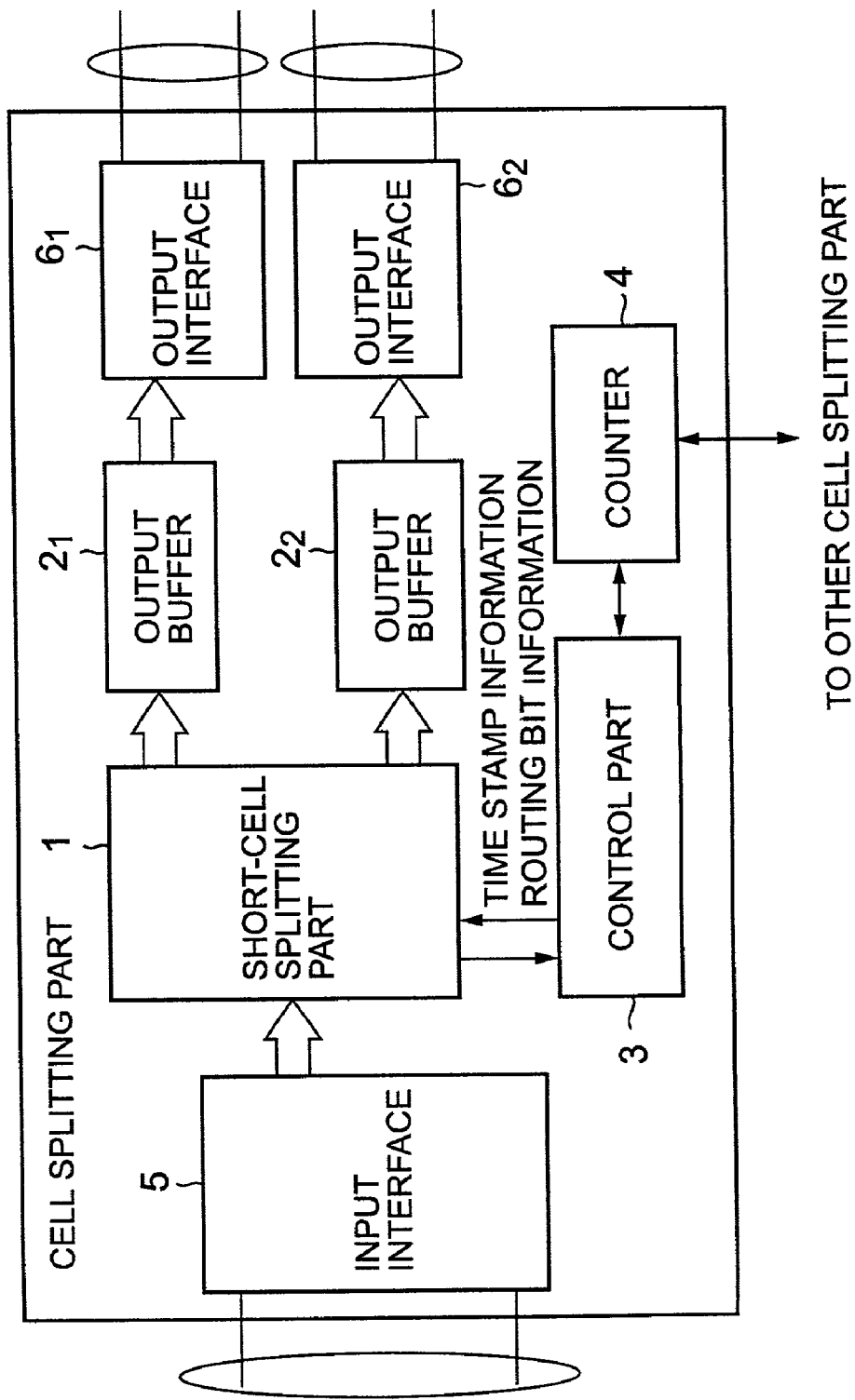
FIG. 29 shows a block diagram of a cell splitting part of the second embodiment of the present invention.

FIG. 29 shows a block diagram of the cell splitting part of the embodiment. In the cell splitting part, an input cell is input through an input interface 5 for phase adjustment and sent to a short cell splitting part 1. The short cell splitting part 1 adds the routing bits RB' and RB" for cell distribution with reference to the intra-switch routing bit RB, the routing bits RB' and RB" being used for identifying which basic switch the short cell enters. At the same time, the time stamp T is added for identifying the cell sequence of the input short cell.

After that, the short cells are stored in the output buffers 21 and 22, and output to the switches P1 and P2 after adjusting the phase of the short cells. Information on the time stamp and the routing bits RB', RB" is supplied to the cell splitting part 1 from a control part 3. A counter 4 is provided for synchronization with other cell splitting parts.

Figure 30:
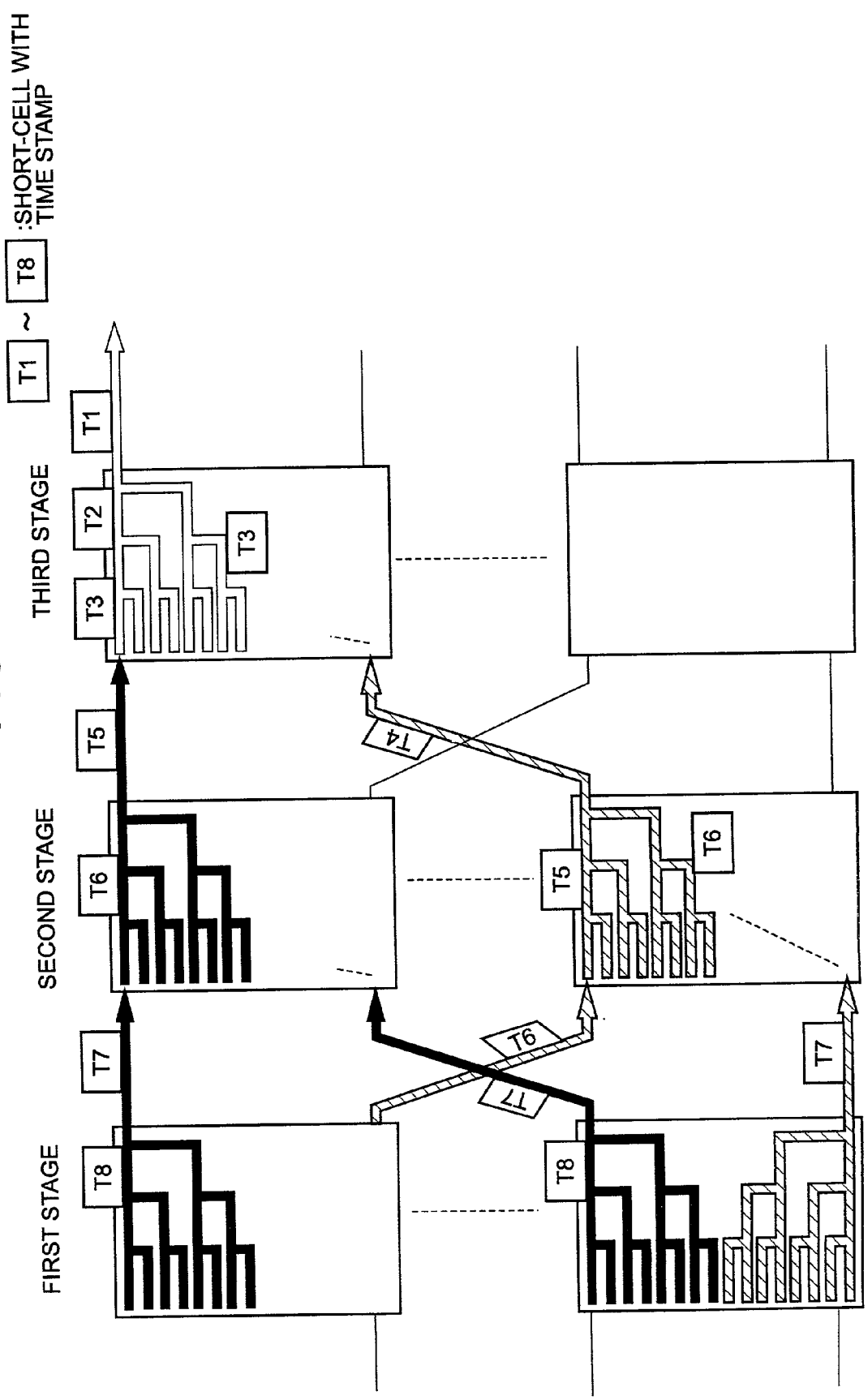
FIG. 30 shows a configuration of a cell-resequencing network in each basic switch of the ATM switch according to the second embodiment of the present invention.

In the following, an example of the switching operation of short cells input into the switches P1 and P2 will be described. FIG. 30 shows a configuration of a cell-resequencing network in the switch. As shown in FIG. 30, the switch is configured as a hierarchical cell-resequencing network.

Each of the cell-resequencing networks in the basic switches of the second embodiment switches cells while ensuring cell sequence between input ports in a tournament manner. Thus, the switch can ensure the cell sequence as a whole.

Figure 31:
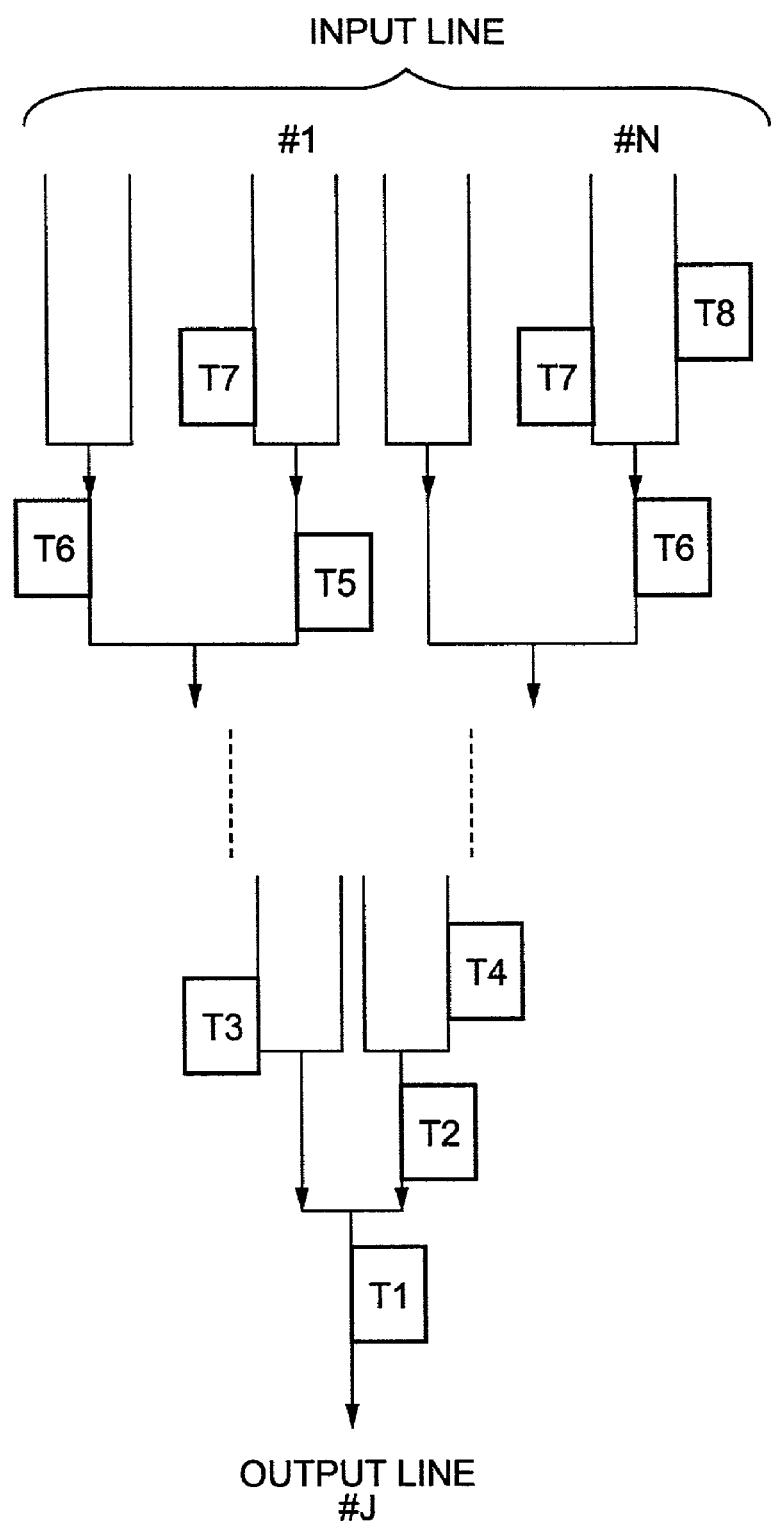
FIG. 31 shows a topology of the cell-resequencing network according to the second embodiment of the present invention.

FIG. 31 shows a topology of the cell-resequencing network of a basic switch. As shown in FIG. 31, the basic switch of the present invention switches cells to an output port on the basis of the time stamp T written in the cells. FIG. 31 shows an example in which cells are switched to an output line #J while ensuring cell sequence.

The configuration of a basic switch corresponding to the topology shown in FIG. 31 is shown in FIG. 23. As shown in FIG. 23, each of the basic switch elements includes address filters 7, output buffers 8, 10, selectors 9, 11 for concentrating the output buffers 8, 10, and controllers 12-1, 12-2 for controlling the selectors 9, 11. An input cell is switched according to the destination information and output to an output port while being buffered in the cell-resequencing network.

Next, the operation will be described. An input cell is captured by the address filter 7 corresponding to the output destination of the cell, and buffered by the output buffer 8. A group of the output buffers 8 is connected to the selector 9. A cell in one of the output buffers in the group is selected according to the following algorithm.

If there is a cell to be sent in both of the output buffers 8, each of the output buffers sends a cell sending request and a time stamp written in the overhead of the cell to the controller 12-1 which is connected to the selector 9. The controller 12-1 which receives the requests selects an output buffer which stores a cell with the earliest time stamp from the output buffers. Then, the selected cell is sent to the next stage.

By repeating the operation hierarchically, cell resequencing is carried out in the basic switch. Since the basic switches are interconnected hierarchically, cells are switched while ensuring the cell sequence totally in the ATM switch.

In order to carry out the cell resequencing, it is desirable that the switches P1 and P2 are completely cell-synchronized. However, in a large scale switch where the logical channel speed is high, one cell time is short. Therefore, it is difficult to obtain cell-synchronization between the switches P1 and P2 from a viewpoint of realizing hardware.

Figure 32A:
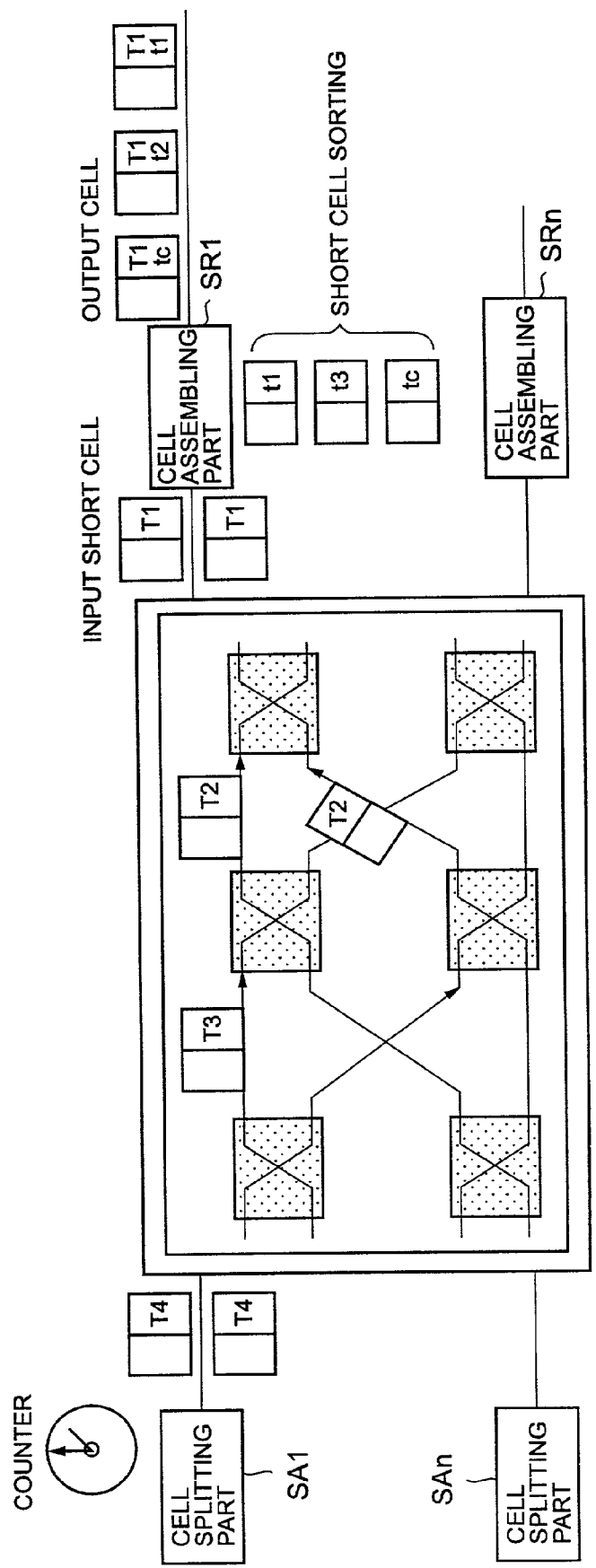
FIGS. 32A, 32B are diagrams for explaining cell resequencing by using double time stamps.
Figure 32B:
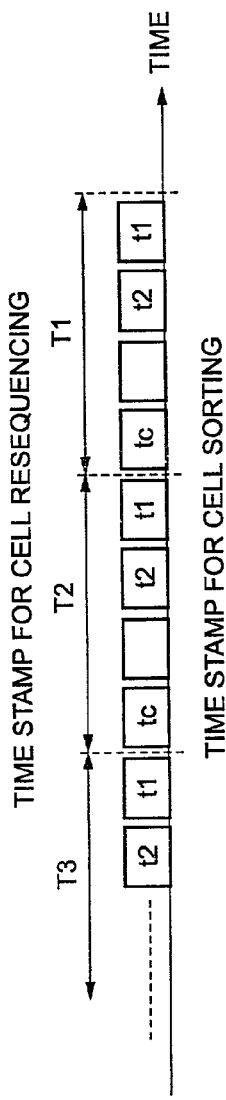

For solving such a problem, two time stamps T and t are provided according to the embodiment as shown in FIGS. 32A and 32B. The time stamp T is used for the switches P1 and P2, and the time stamp t is used for the cell assembling part. Specifically, the cell resequencing is carried out by using the time stamp T for switching short cells, and the time stamp t is used when the short cells are assembled in order to avoid the short cells being incorrectly assembled.

In the example, c short cells are grouped and a time stamp T is provided to the grouped c short cells. By carrying out such a grouping, counter synchronization between the switches P1 and P2 is simplified so that hardware for the cell resequencing can be eliminated.

In the cell assembling part, there may be cell sequence disorder among the short cells which have the same time stamp T. Thus, for correcting the cell sequence disorder, the time stamp t is used for sorting the short cells. In the example, short cell sorting is carried out in a shorter cell time by using the time stamps t1–tc. The ATM switch of the present invention realizes complete cell resequencing by using the two functions.

In the following, the cell assembling part will be described. In the ATM switch of the present invention, since the switches P1 and P2 carry out the same operation for cell distribution and cell resequencing, each of the short cells distributed to the switches P1 and P2 arrives at the output of each switch with the same cell transfer delay. Therefore, the cell assembling part can assemble the short cells by only correcting jitter.

FIG. 33 shows a block diagram of the cell assembling part. The phase of the short cells input to the cell assembling part is adjusted so as to absorb jitter in input interfaces $16_1$ and $16_2$. In addition, the short cell sorting by the time stamp t is carried out in the input interfaces. After that, the short cells are stored temporarily in input buffers $13_1$ and $13_2$, assembled in a short cell assembling part 14, and buffered in an absolute delay adding buffer 15. The cell sequence is corrected between the buffered cells by sorting the cells of a window size by using the time stamp T. Then, the cells are output to output ports through an output interface 17. The sorting by the absolute delay adding buffer 15 is carried out by the maximum delay time adding method which was described before.

According to the second embodiment of the present invention, since the ATM switch adopts such a cell-resequencing method using the two types of the time stamp and the multi stage switch configuration using the short cell, a non-block multi stage ATM switch can be realized based on the cell-resequencing operation which is independent of a switch size and the hardware minimum architecture.

FIG. 34 shows an example of a 256×256 ATM switch which is configured by 4 switches which include interconnected 16×16 basic switches. The ATM switch switches 4 split short cells. It can be recognized from the example that the switch scale can be expanded by a simple configuration.

In addition, by using the ATM switch of the second embodiment as a basic switch, a hierarchical ATM switch can be configured. In this case, several types of the time stamp are added corresponding to the hierarchies.

As mentioned above, according to the second embodiment of the present invention, cell-resequencing can be realized without being limited by the switch size. In addition, a switch architecture having scalability for the switch size can be realized. Further, the ATM switch can be economically expanded when the number of input/output signals of an LSI chip is limited in the case of high-speed data transmission.

In the ATM switch of the second embodiment, phase adjustment is carried out in the input interfaces $16_1$ and $16_2$ to absorb jitter between the switches P1 and P2. In the following, another configuration for avoiding the effect of the jitter will be described as a third embodiment.

Theoretically, a delay equalization method (ROXANNE exchange, Martin de Prycker: Asynchronous Transfer Mode Solution for Broadband ISDN, Ellis Horwood) can be adopted as-is to the switches. However, adopting the method is difficult because accumulated delay time enormously increases in the ATM switch if each of many switches outputs short cells after having wait them for the maximum delay time period.

Figure 35:
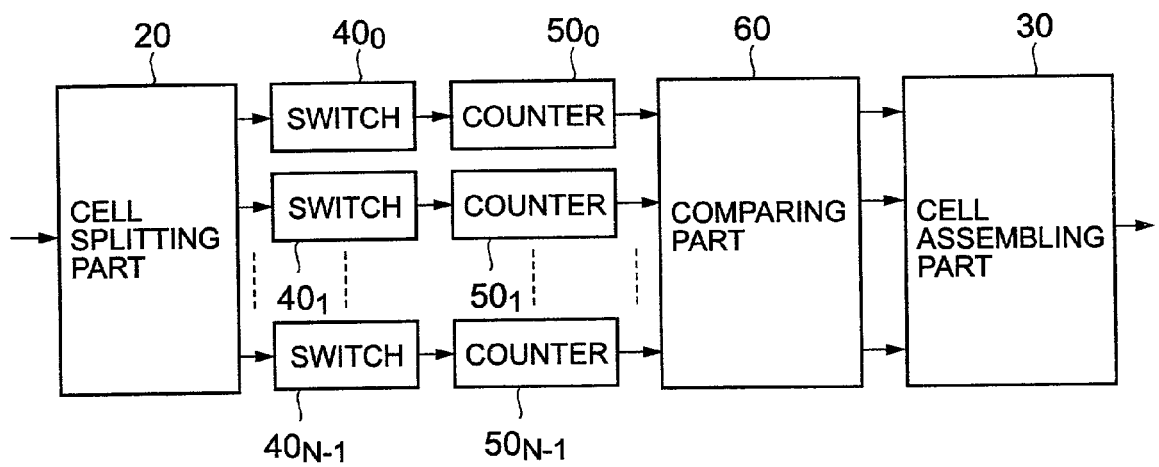
FIG. 35 is a block diagram of an ATM switch according to a third embodiment of the present invention.

In the following, a general outline of the third embodiment will be described. FIG. 35 is a block diagram of an ATM switch of the third embodiment. As shown in FIG. 35, the ATM switch includes a cell splitting part 20, a plurality of switches $40_0$–$40_{N-1}$, a cell assembling part 30, counters $50_0$–$50_{N-1}$ and a comparing part 60. The cell splitting part 20 splits a cell into several short cells, the switches $40_0$–$40_{N-1}$ transfer the several short cells in parallel and the cell assembling part 30 assembles the transferred short cells. The counters $50_0$–$50_{N-1}$ count the number of short cells and the comparing part 60 compares bit information of short cells which have the same counter value. The cell assembling part 30 assembles short cells into a cell when the short cells have the same bit information according to the comparison by the comparing part 60.

Figure 44:
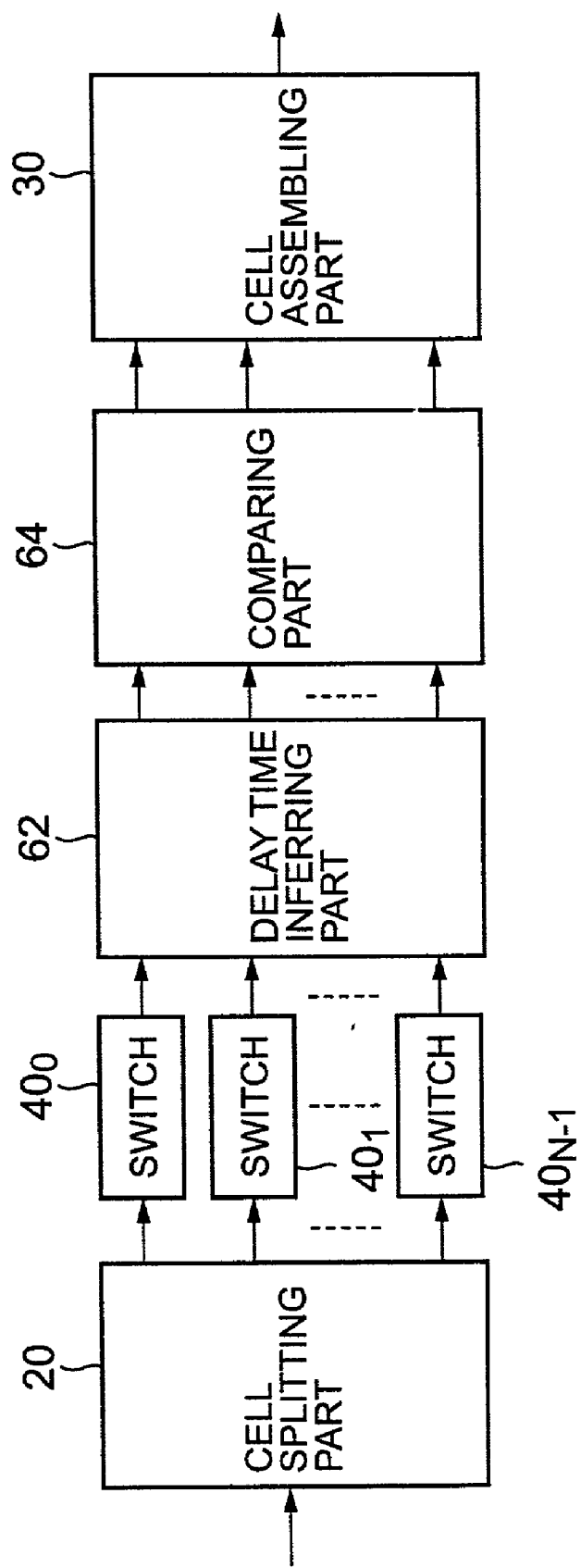
FIG. 44 is a block diagram of the ATM switch according to another example of the third embodiment of the present invention.

FIG. 44 shows a modification of the third embodiment of the present invention. As shown in the figure, the ATM switch has a delay time inferring part 62 instead of the counter $50_0$–$50_{N-1}$, and a comparing part 64 instead of the comparing part 60. The delay time inferring part 62 obtains an inferred delay time t of the switches $40_0$–$40_{N-1}$, and the comparing part 64 compares bit information of short cells output from the switches $40_0$–$40_{N-1}$ within a delay time t±τ. In addition, the delay time inferring part 62 compares between an input time of a timing cell which is a specific cell input to the switches and an output time of the timing cell output from the switches so as to obtain the inferred delay time t. In addition, the delay time inferring part 62 sends the timing cell periodically.

Figure 36:
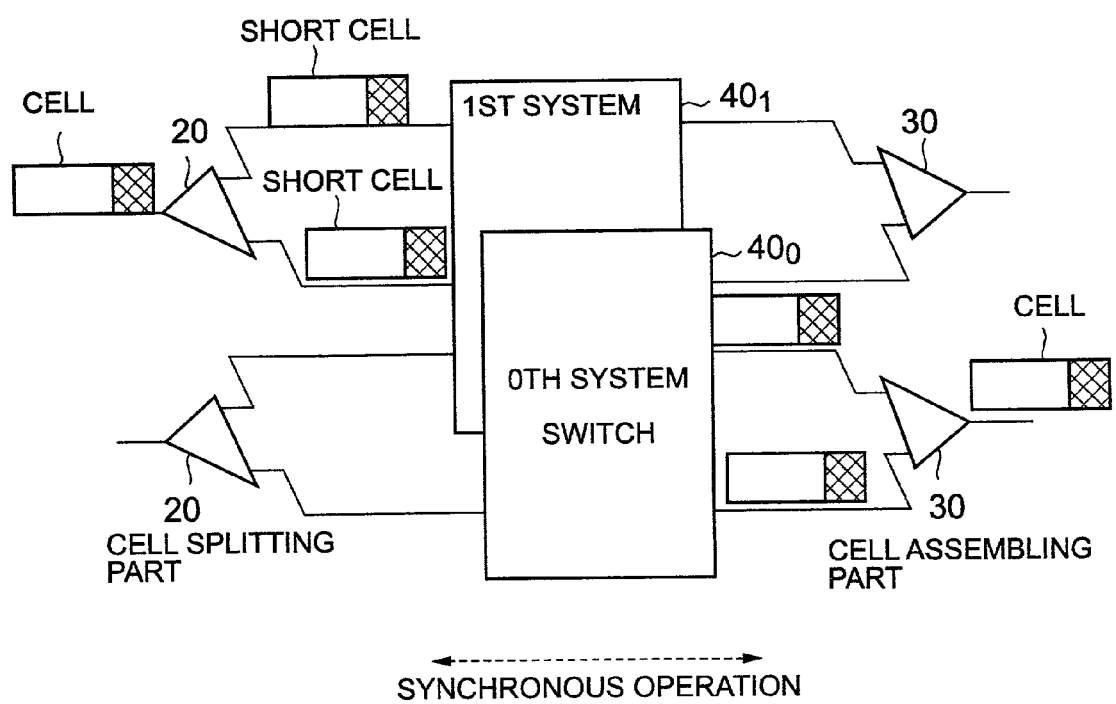
FIG. 36 shows an ATM switch with two switches for transferring short cells.

FIG. 36 shows an ATM switch with the switches for transferring short cells. The ATM switch includes two switches $40_0$ and $40_1$, the cell splitting parts 20 and the cell assembling part 30, the switch $40_0$ being a 0th system and the switch $40_1$ being a 1st system. The cell splitting parts 20 and the cell assembling parts 30 are synchronized, thus assuming that they have an absolute time.

Figure 38:
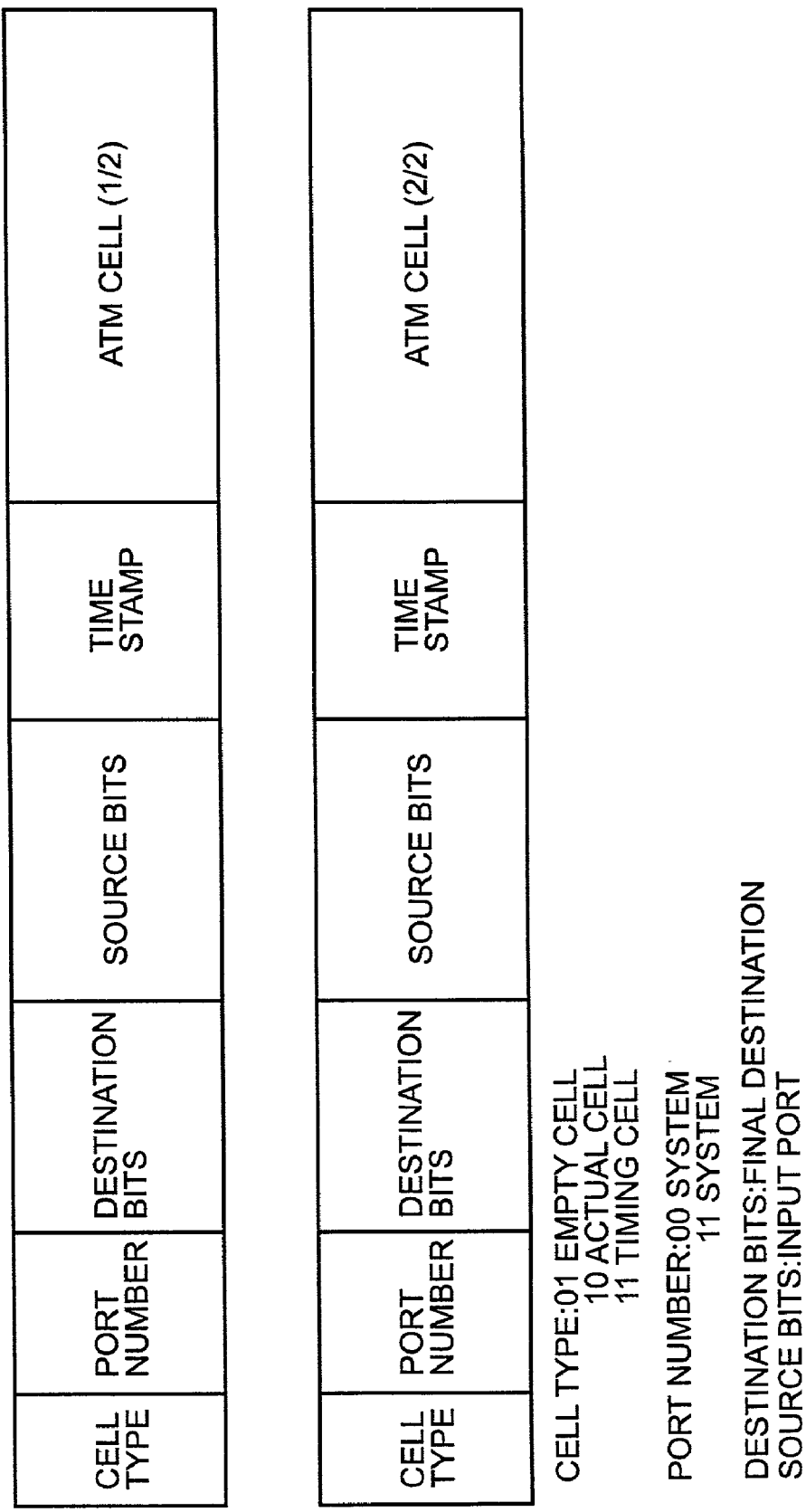
FIG. 38 shows an example of a short cell format when transferring short cells through two switches.

When a cell arrives at a cell splitting part 20, the time stamp is added to the cell first. FIG. 38 shows an example of the split short cell format according to the third embodiment. The format of the short cell has bits for identifying an empty cell, an actual cell and a timing cell, bits for representing a destination output port number, bits for representing an input port number which bits are called source bits, bits for the time stamp which bits are written in the short cell at a time when the split short cells are sent to the switches simultaneously, and bits for the split payload. In the case shown in FIG. 38, since the number of the switches is two, the bits for the split payload has a half area of the payload area of an original cell. The short cells are sent to the switches $40_0$ and $40_1$, and assembled in the cell assembling part 30 after being output from the switches $40_0$ and $40_1$.

Figure 37:
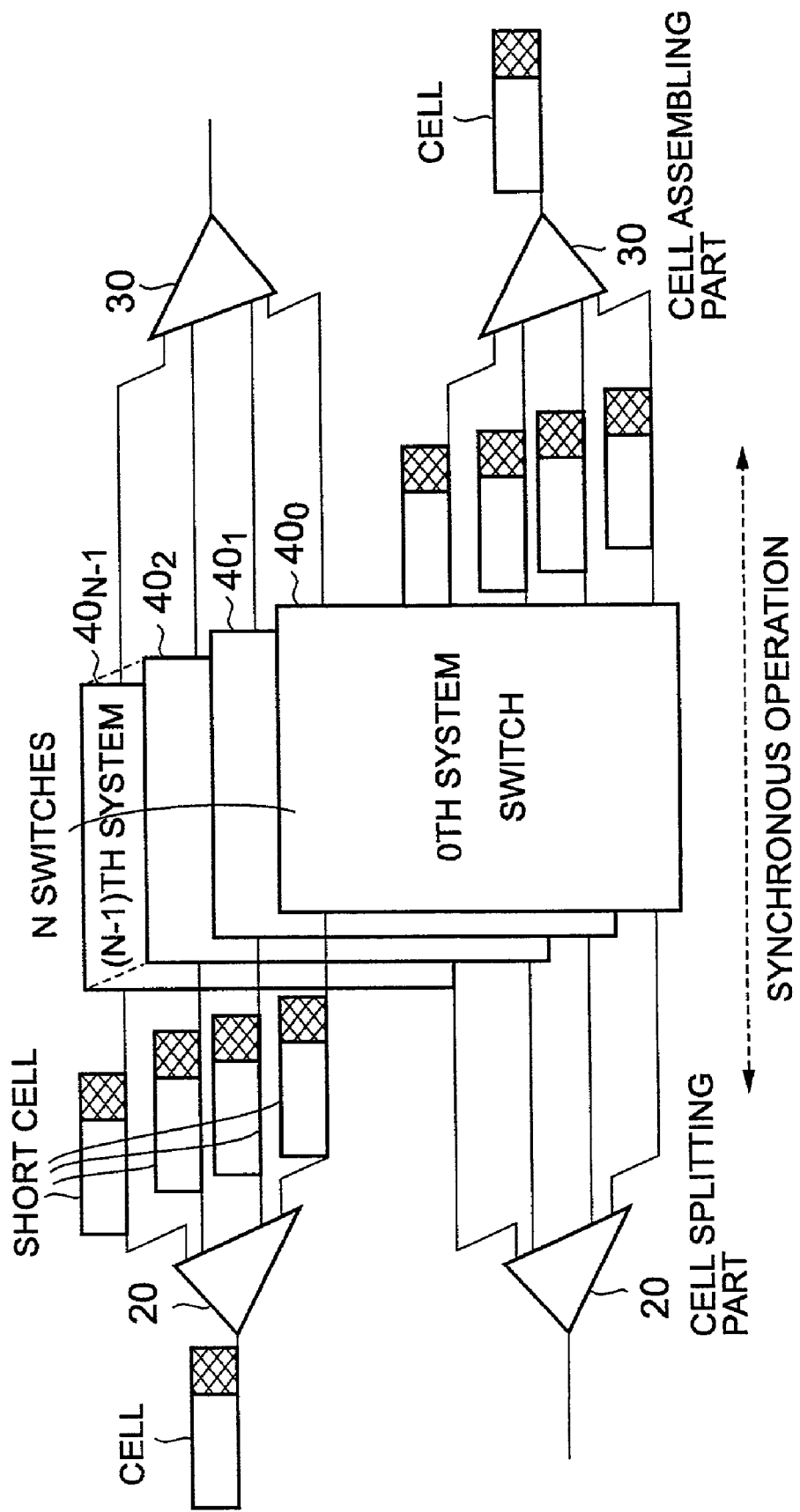
FIG. 37 shows an ATM switch with N switches for transferring short cells.

FIG. 37 shows an ATM switch having N switches. The ATM switch has N switches $40_0$ and $40_{N-1}$, a 0th system, 1st system, . . . , and an (N−1)th system (N is a natural number).

Figure 39:
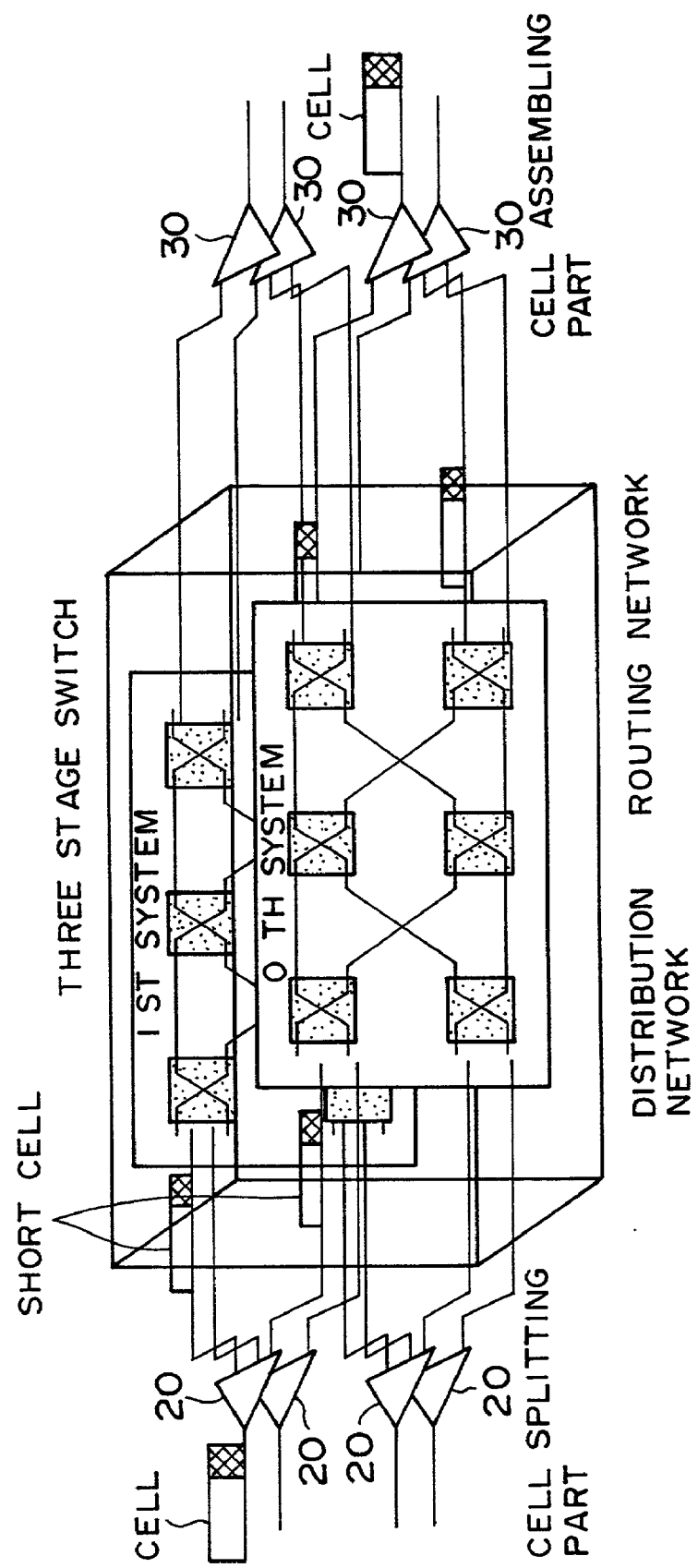
FIG. 39 shows an ATM switch configured such that short cells are transferred through two switches having interconnected basic switches in a multi stage manner.

In addition, as shown in FIG. 39, each switch can be configured by basic switches which are connected in a multi stage manner. In the ATM switch, short cells split in the cell splitting part are input into a distribution network which is shown in the figure. In the distribution network, the short cells are distributed in equal probability for each port so as to be input to a routing network randomly. Therefore, short cells of the same VPI, VCI are transferred by different routes. In this case, various cell-resequencing methods can be used including methods described before.

Figure 40:
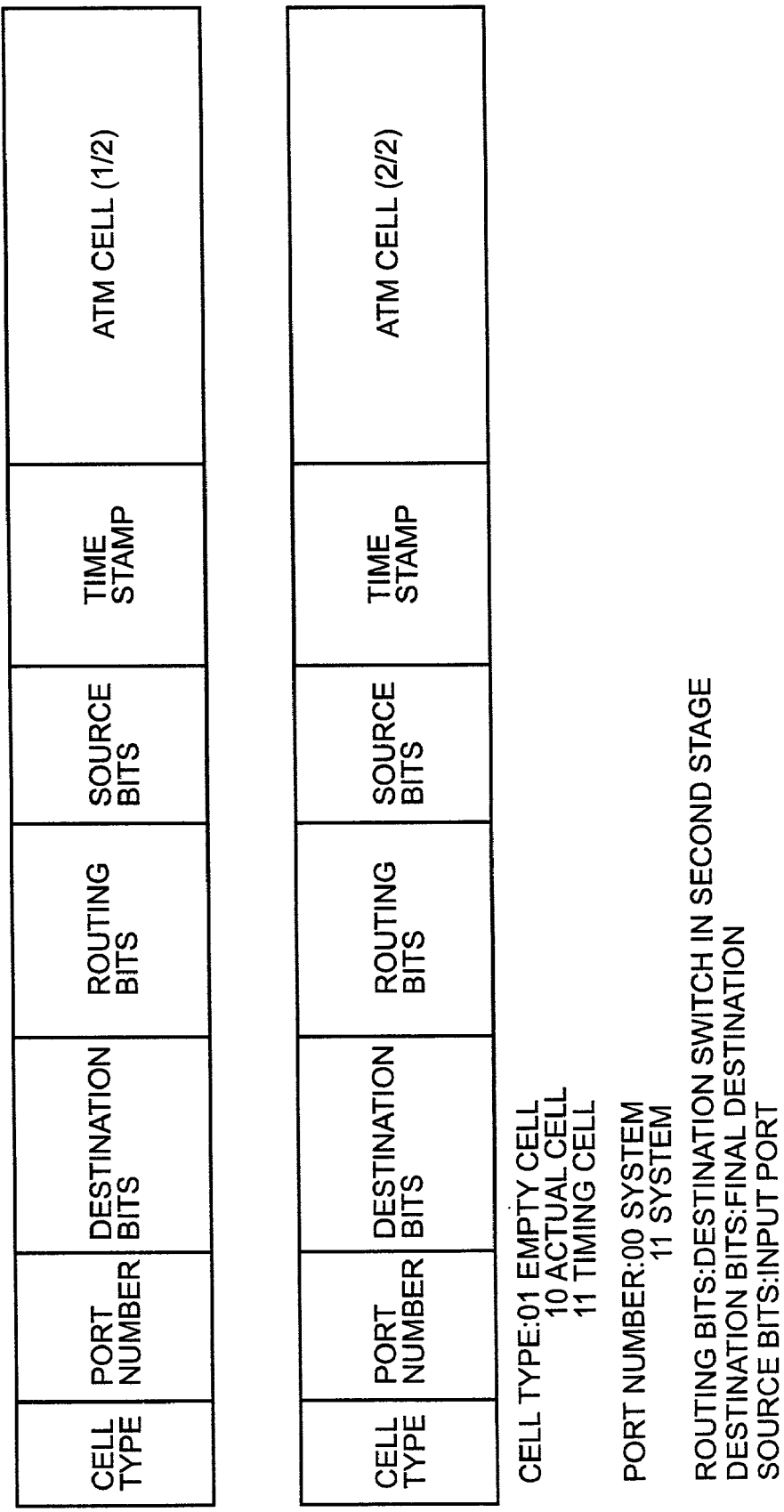
FIG. 40 shows an example of a cell format in a case that short cells are transferred through two switches having interconnected basic switches in a multi stage manner.
Figure 41:
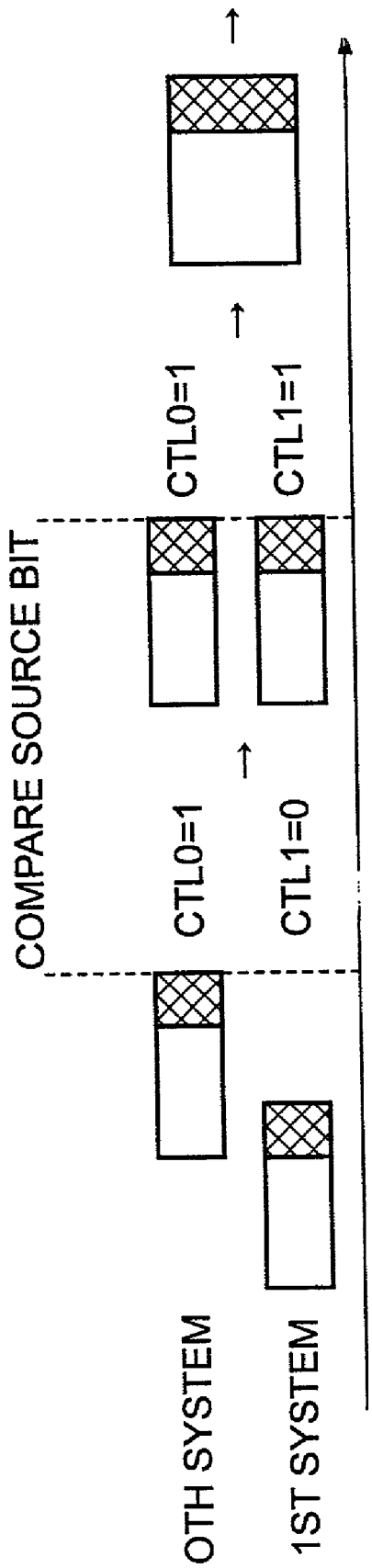
FIG. 41 is a diagram for explaining jitter correction according to the third embodiment of the present invention.

Next, the split short cells are transferred to the routing network. The short cells output from the routing network are assembled into a cell by the cell assembling part. An example of the format of the short cell of this case is shown in FIG. 40. Compared with the format shown in FIG. 38, it is recognized that routing bits are added.

When the switch is configured by basic switches which are connected in a multi stage manner in tandem, the cell assembling part 30 may assemble the short cells into an original cell when the routing bits of the short cells to be assembled are the same.

In the following, the third embodiment will be described in detail.

In the embodiment shown in FIG. 36, when a cell arrives at a cell splitting part 20, the time stamp is added. In addition, a destination bit is added. The format of the split cell is shown in FIG. 38 which was described before.

Next, the split short cells are sent to the two switches $40_0$ and $40_1$. The two switches $40_0$ and $40_1$ are non-blocking switches and the operations of the split short cells in the switches are the same. However, the arriving time at the cell assembling part 30 may fluctuate. For suppressing the cell arriving time fluctuation, an algorithm shown in FIG. 42 can be used. In the following, the algorithm will be described with reference to the flowchart of FIG. 42.

In step 1, when a split short cell arrives at the counters $50_0$ which means that the short cell arrives from the 0th system, the value CLT0 of the counter $50_0$ is incremented by 1. Therefore CTL0=1, since the initial value of the counter is 0. When the short cell arrives from the 1st system, the value of the counter $50_1$ is incremented. Therefore CTL1=1, since the initial value of the counter is 0.

If the value CTL0 and the value CTL 1 are the same (CTL0=CTL1) in step 2, the source bits of the split short cells are compared in step 3. When the source bits are the same between the short cells (step 4), the short cells are assembled into an original cell in step 5 because the short cells are originated from a cell.

When CTL0=CTL1 and the source bits are different, the short cells of each system are sorted based on the time stamp in step 6, 7. After that, the source bits are compared. If the source bits of the short cells are the same, the short cells are assembled. If not the same, a short cell is read.

If the cell is not assembled after sorting the short cells several times, the short cells are determined to be abnormal in step 8. According to the algorithm shown in FIG. 42, the difference of the arrival time of the short cells can be absorbed when assembling the short cells so as to eliminate jitter from output cells of the ATM switch.

If the values CTL0 and CTL1 are not equal in step 2, the absolute value of the difference between CTL0 and CTL1 is compared with a threshold in step 9. If the absolute value exceeds the threshold, the counter which has the larger value between CTL0 and CTL1 stops counting in step 10. A newly arrived short cell from a system corresponding to the stopped counter waits as a waiting short cell. A newly arrived short cell from another system is counted in step 11. At this time, if there is a waiting short cell which has not been counted, the waiting short cell is counted first in step 1. Thus, if the sequence disorder occurs in the arriving short cells, it is corrected.

Next, the modification of the third embodiment shown in FIG. 37 will be described with reference to FIG. 43. As mentioned before, there exists jitter of arriving short cells in switches $40_0$ and $40_1$.

Figure 42:
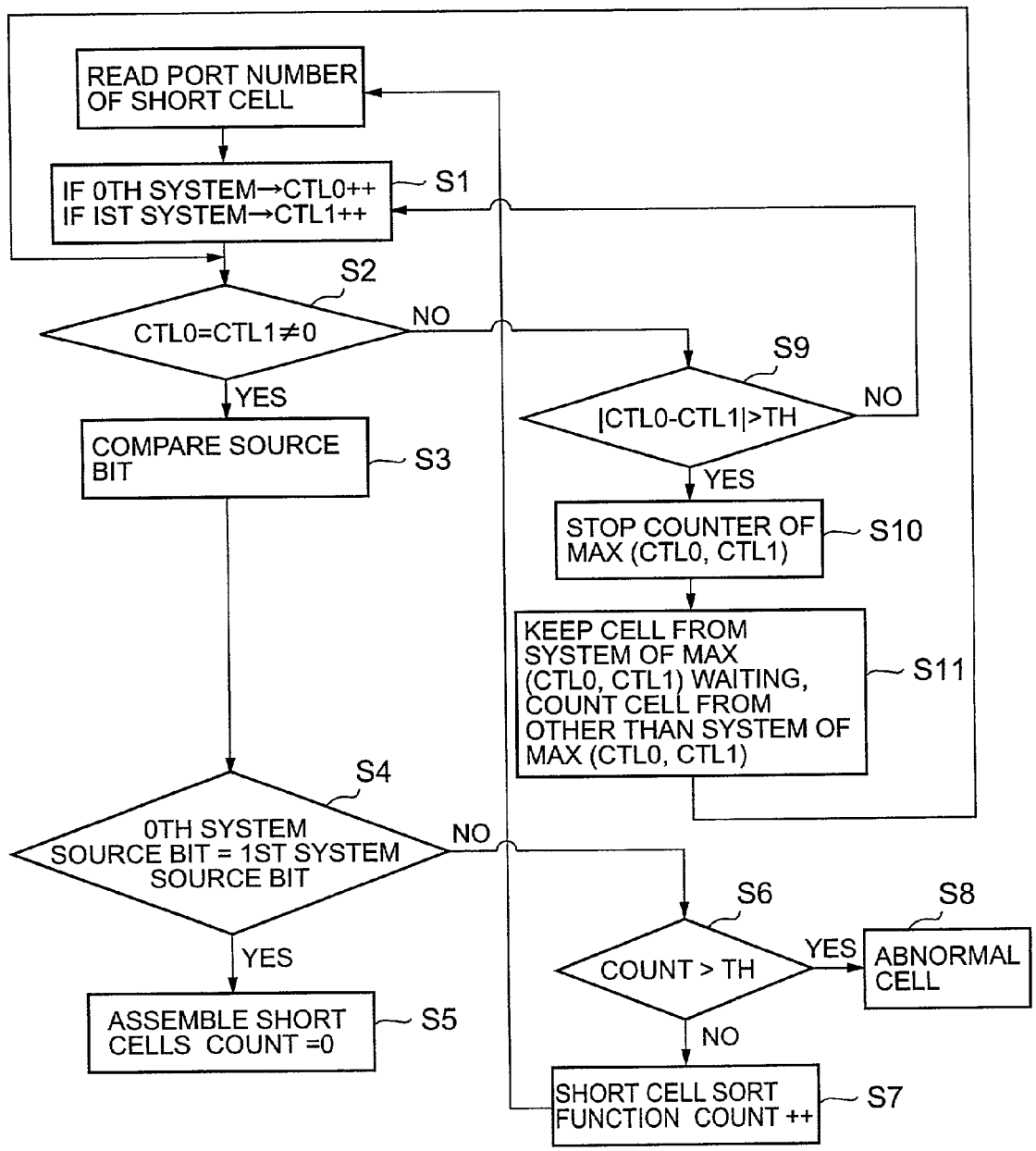
FIG. 42 is a flowchart showing an operation of the third embodiment of the present invention.
Figure 43:
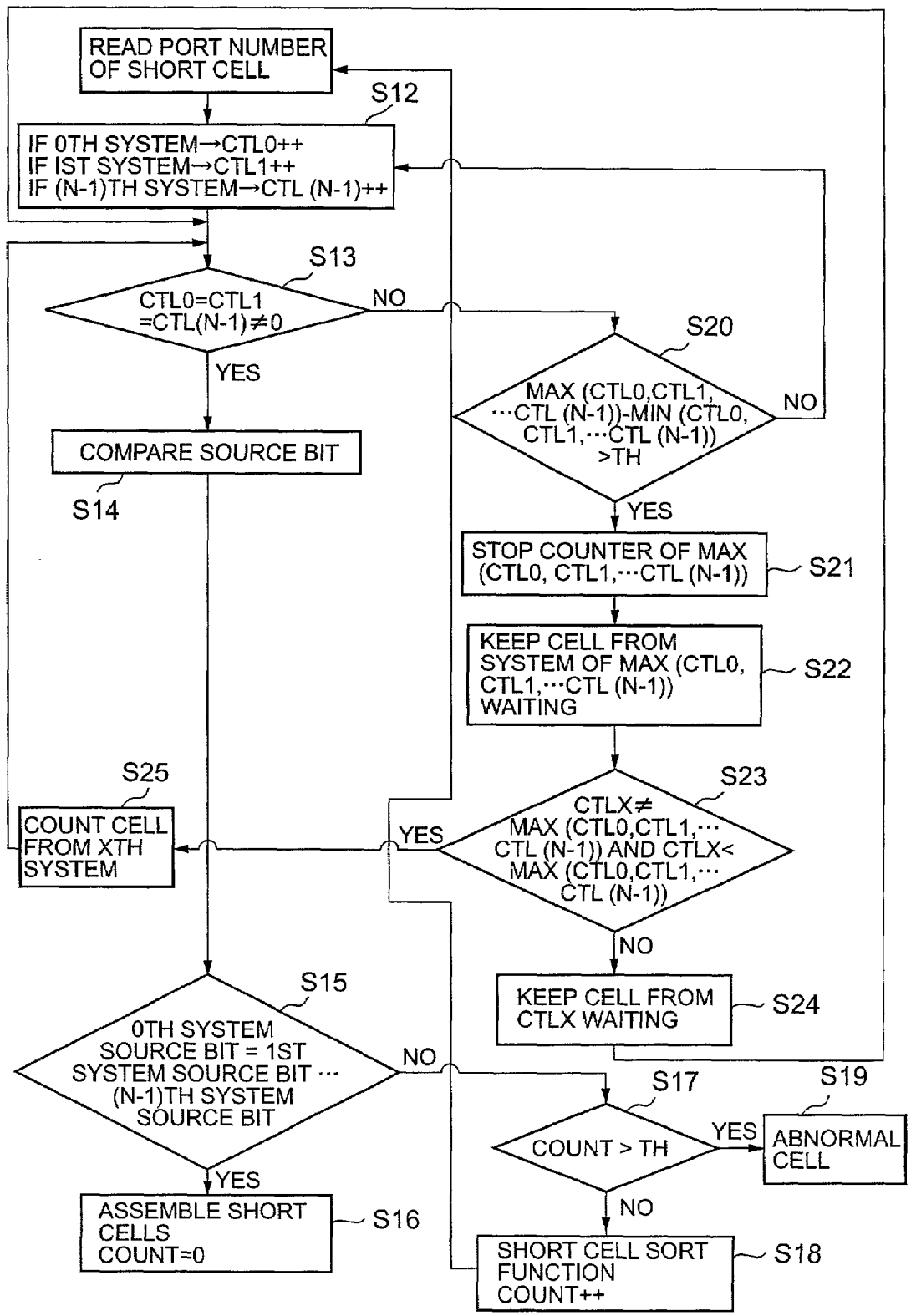
FIG. 43 is a flowchart showing an operation of a modification of the third embodiment of the present invention.

FIG. 43 shows an algorithm for correcting the jitter of the modification shown in FIG. 37. The difference from the algorithm shown in FIG. 42 is that the algorithm of FIG. 43 corresponds to the number N−1 of switches of the modification.

Accordingly, also in the case that the ATM switch has N−1 switches, the difference of the arrival time of the short cells can be absorbed when assembling the short cells so as to eliminate jitter from output cells of the ATM switch.

As for the example shown in FIG. 39, since the traffic input into the routing network is distributed randomly in the distribution network, heavy congestion may not occur in the routing network. However, because light congestion may occur, the short cells of the same VPI and VCI may have different delays according to the routes. Therefore, cell sequence disorder may occur in the routing network and the arrival time of short cells may fluctuate. In this case, the jitter can be absorbed by the method as mentioned above. At this time, two types of bits, source bits and routing bits, can be used. The format is the same as the format shown in FIG. 40.

Figure 45:
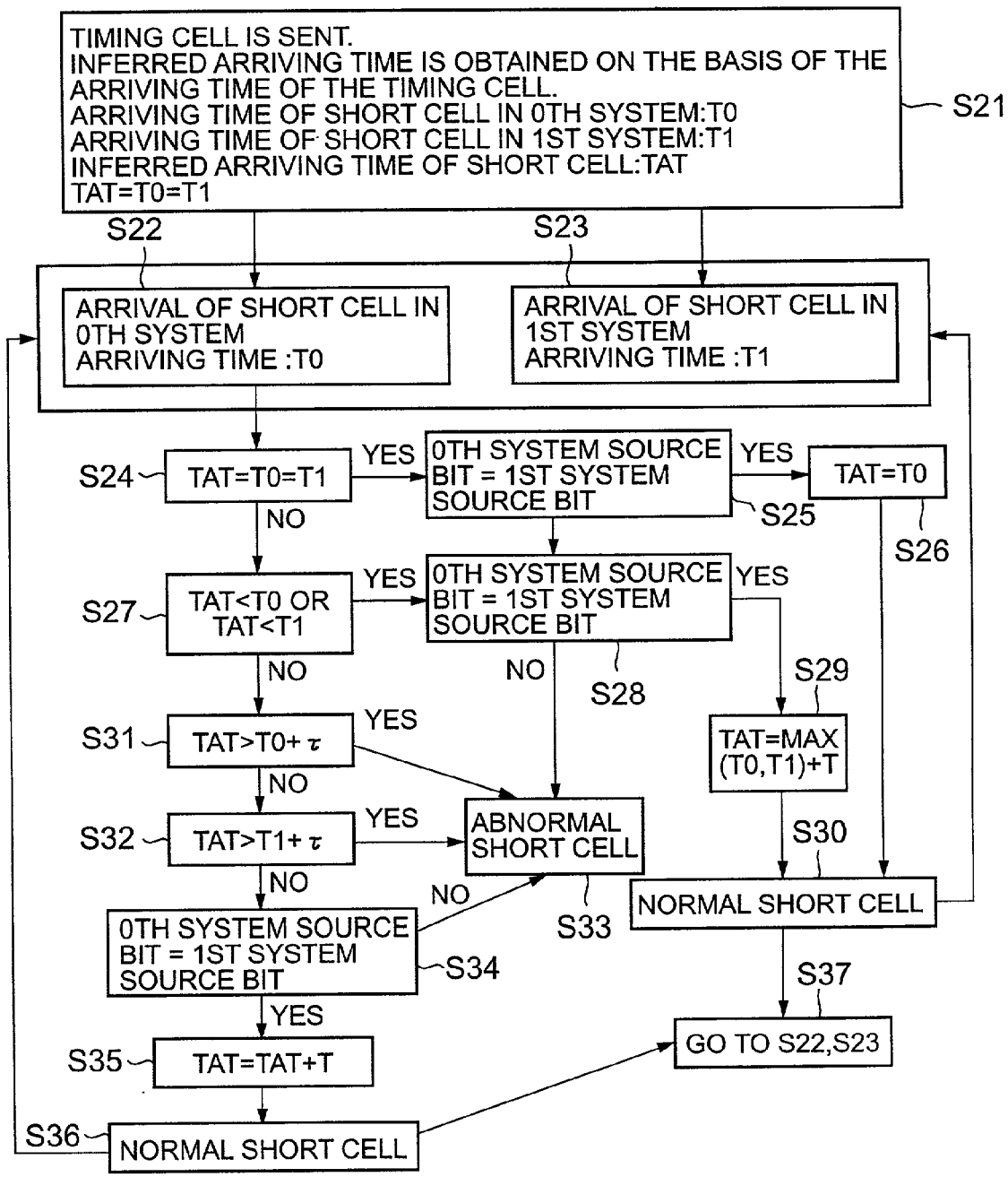
FIG. 45 is a flowchart of an operation of the configuration shown in FIG. 44.
Figure 46:
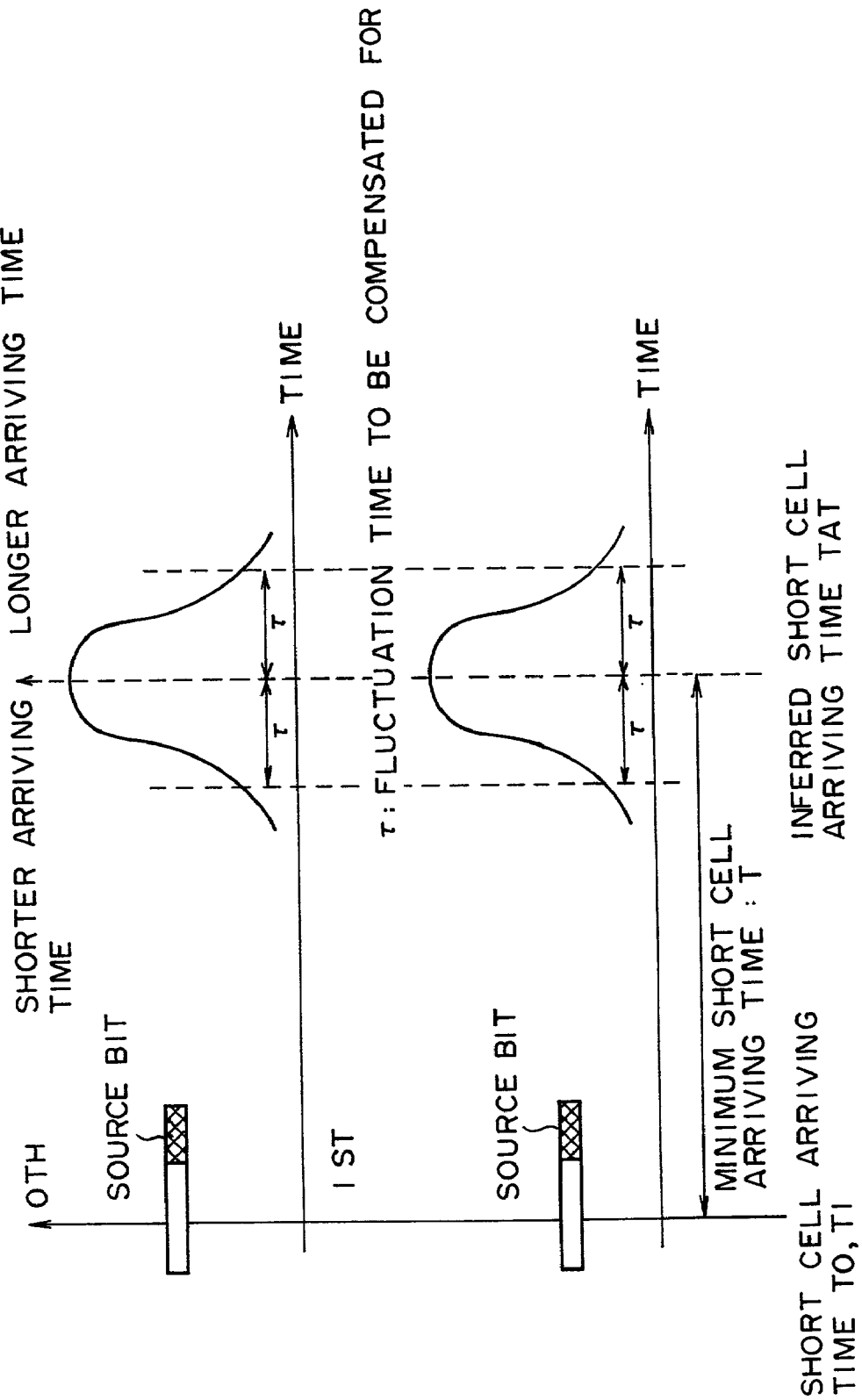
FIG. 46 is a diagram for explaining an acceptable fluctuation of short cells.
Figure 47A:
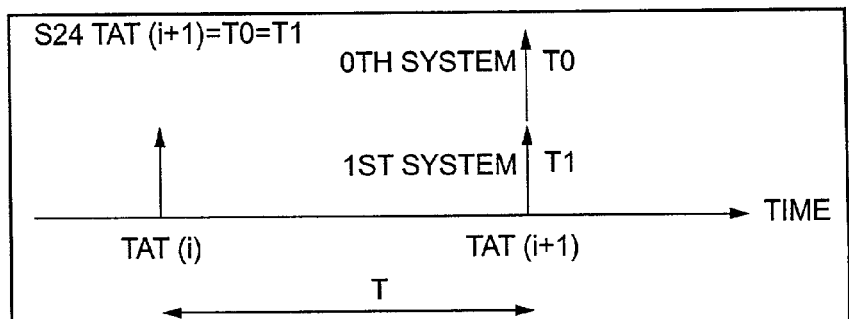
FIGS. 47A–47D are diagrams for explaining the acceptable fluctuation of short cells in detail.
Figure 47B:
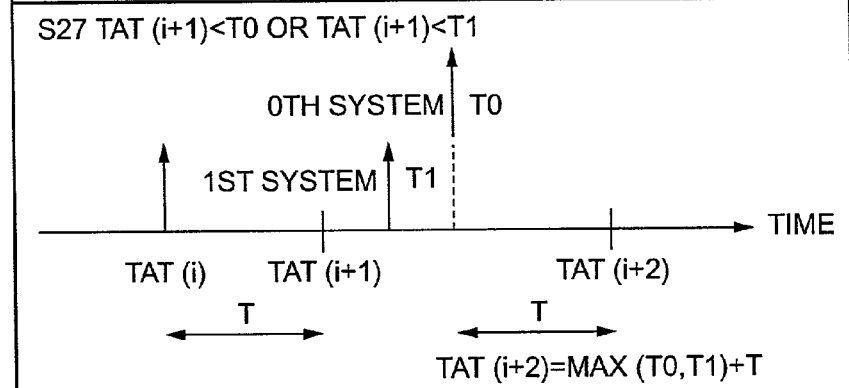
Figure 47C:
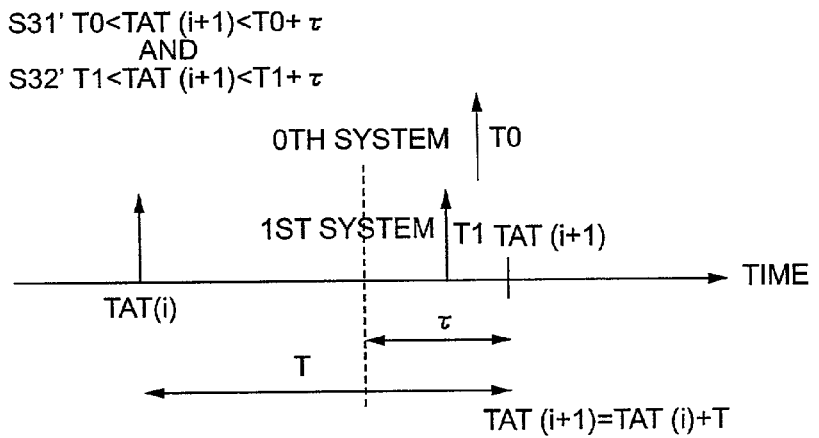
Figure 47D:
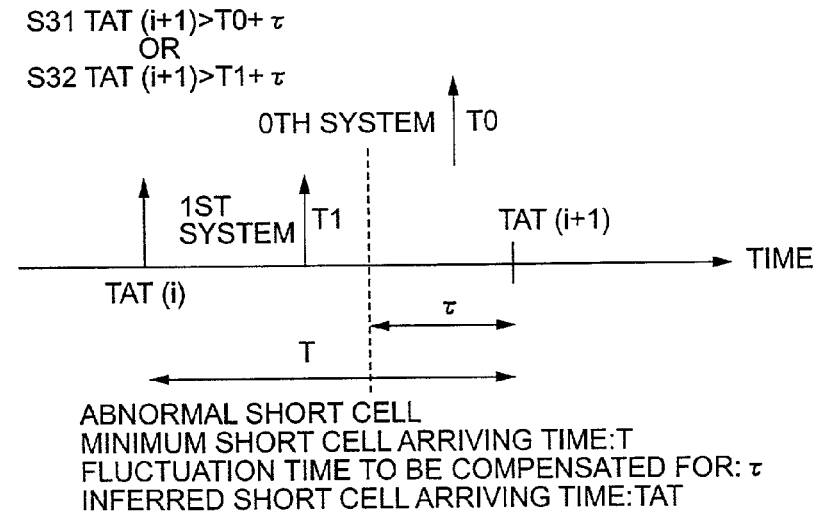

FIG. 44 shows another example of the third embodiment of the present invention. FIG. 45 is a flowchart of the algorithm of the example. FIG. 46 is a diagram for explaining acceptable fluctuation of the short cell. FIG. 47 is a diagram for explaining the acceptable fluctuation of the short cell in detail. In this example, the fluctuation is prevented by using a timing cell. In the following description, the ATM switch which has two switches $40_0$ and $40_1$ will be described as an example.

As shown in FIG. 45, in step 21, the timing cell is sent, and the inferred arriving time (TA) of each short cell is obtained on the basis of the arriving time of the timing cell. The timing cells are transferred to each output port of the switches $40_0$ and $40_1$ simultaneously. The times when the timing cells arrive at the cell splitting part 20 are represented as T0 and T1. The routes through which the timing cells pass must be the same and the timing cells must arrive at the same time since the timing cells have the same routing bits. If T0 and T1 are not equal, the timing cell is transferred again. If T0 and T1 are the same, the inferred arriving time of the short cell is defined as TAT=T0=T1 (initial value). A minimum interval (T) of the short cell arriving time can be determined by the speed of the ATM line.

Next, arriving times T0, T1 of the short cells which are output from the switches $40_0$ and $40_1$ and arrive at the cell assembling part 30 are monitored in step 22 and step 23. If T0 and T1 are the same as the inferred arriving time of the short cell TAT in step 24, the source bits of the short cells are compared in step 25. If the source bits are the same, the short cells are sent in step 26.

If TAT<T0 or TAT<T1 in step 27, that is, if both or either of the short cells arrive later than the inferred arriving time, the source bits are compared in step 28. Then, if the source bits are the same, the arriving time of the short cell is newly determined as TAT=max(T0,T1)+T in step 29. That is, TAT is determined such that it conforms to the arriving time of the later short cell.

If the arriving time of the short cell is earlier than the inferred time by exceeding the acceptable fluctuation time τ in step 31 or in step 32, the short cell is determined as an abnormal short cell in step 33. If the arriving time of the short cells is earlier than the inferred time within the acceptable fluctuation time τ and if the routing bits of the short cells are the same in step 34, TAT(t=i+1)=TAT(t=i)+T (t and i represent time) in step 35.

After being determined as normal short cells in step 30 and step 36, the arrival of the short cells are monitored again in step 22 and step 23. Then, the above-mentioned process is repeated.

Accordingly, the fluctuation of the arriving time of the sort cells are absorbed, then the short cells are assembled and output from the ATM switch without jitter. In addition, reliability of the absolute time of the ATM switch can be improved by sending the timing cell periodically and providing the initial value of the inferred arriving time of the short cell periodically.

FIG. 46 shows a mechanism for accepting the short cell fluctuation. In the mechanism, τ represents the fluctuation time which can be compensated for and the short cells which arrive within TAT±τ are candidates to be assembled.

FIGS. 47A–47D represents the relation between the minimum arriving time T of the short cell, the fluctuation time τ to be compensated for and the inferred arriving time TAT of the short cell in steps 24, 27, 31, 32.

As mentioned above, according to the third embodiments of the present invention, the effects of jitter in each switch can be avoided without increasing delay.

Next, a fourth embodiment, which is another hierarchical cell-resequencing network, will be described.

Figure 48:
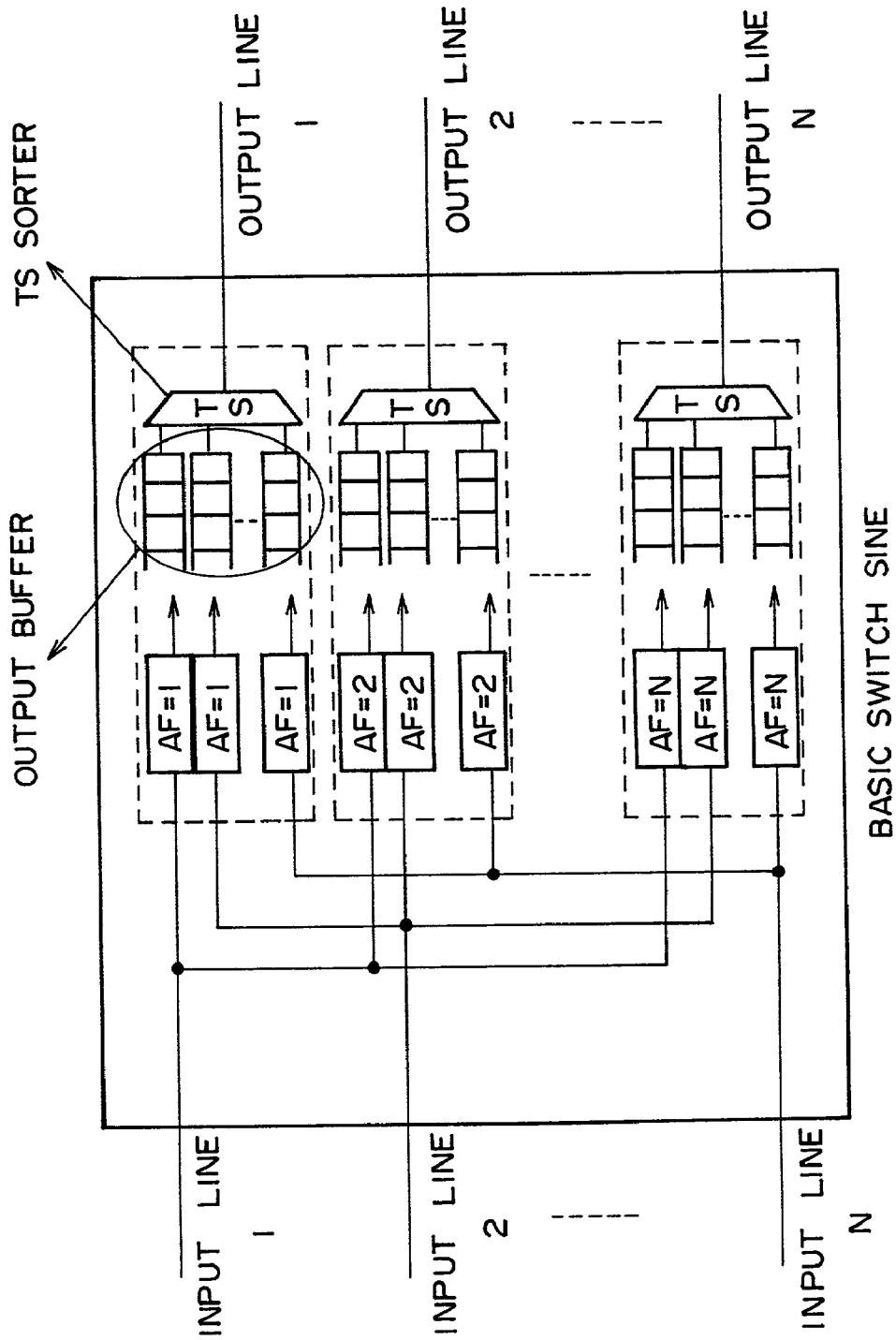
FIG. 48 is a block diagram of the basic switch according to a fourth embodiment of the present invention.

As shown in FIG. 48, a basic switch of the fourth embodiment is based on an output buffer type switch. The basic switch includes output buffer parts each of which output buffer parts logically has output buffers corresponding to input ports. The output buffers can be realized as a shared buffer. An address filter AF is provided in front of the output buffer, the address filter AF storing a cell to the buffer only if the designation of the cell is the same as the corresponding output port of the AF. In addition, a time sorter TS is provided after the output buffer. The time sorter TS extracts time stamp information from head cells in the output buffers and carries out cell resequencing according to a cell-resequencing algorithm which will be described later.

Figure 49:
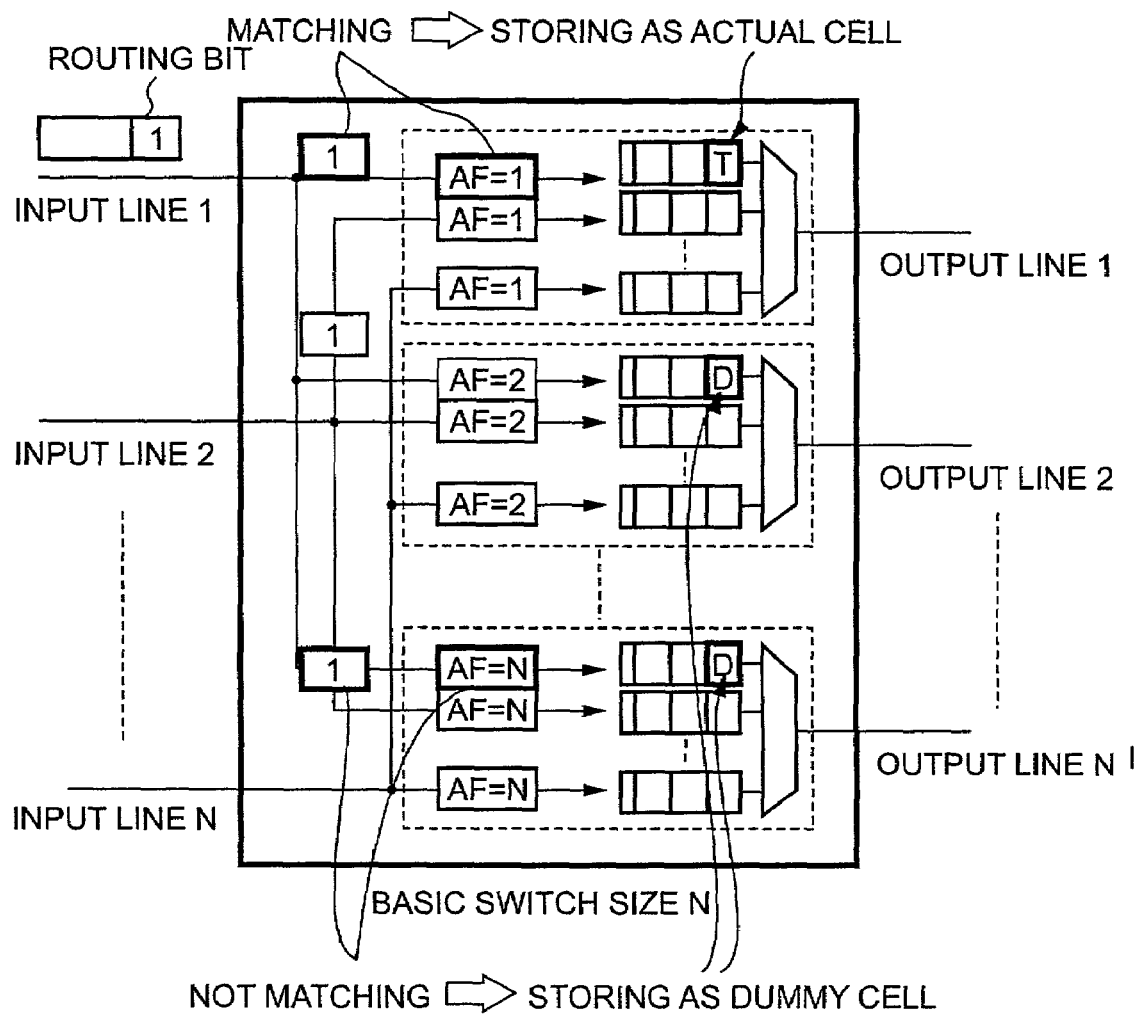
FIG. 49 is a diagram for explaining the operation of the basic switch according to the fourth embodiment of the present invention.
Figure 50:
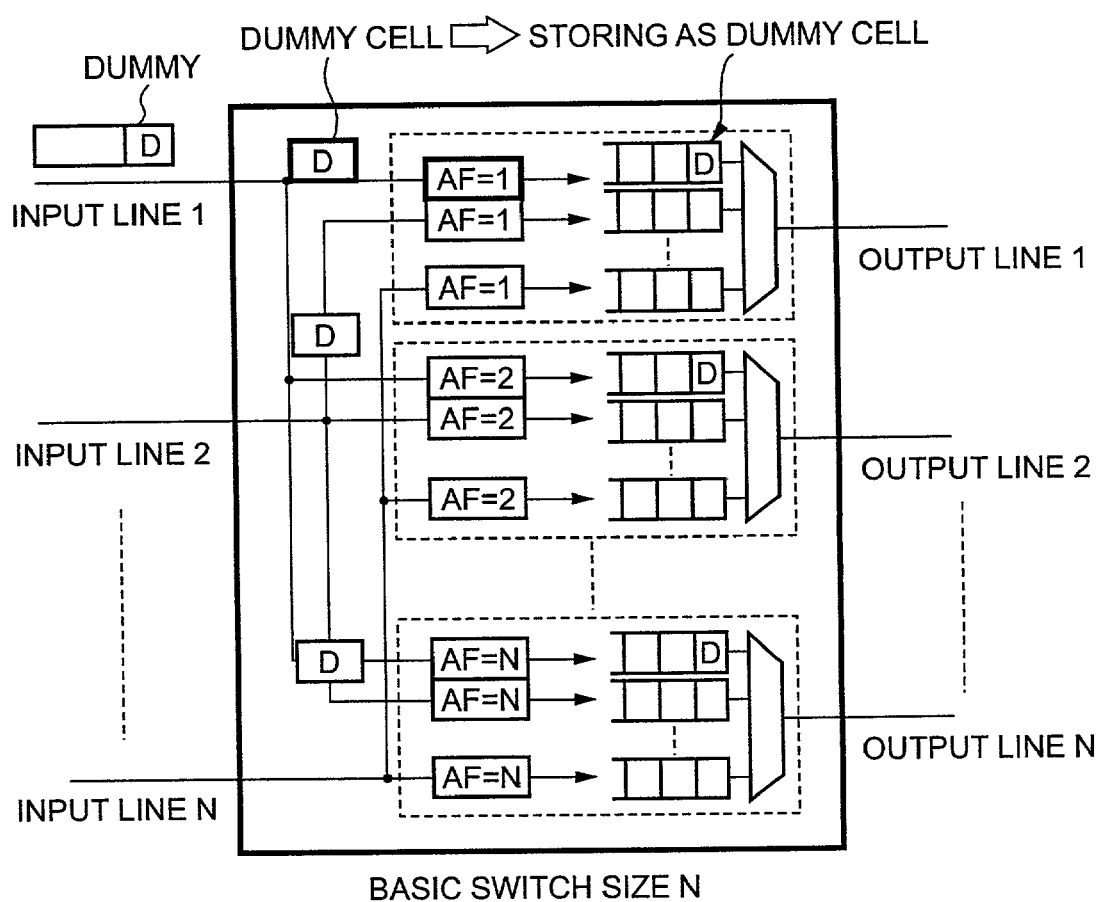
FIG. 50 is a diagram for explaining the operation of the basic switch according to the fourth embodiment of the present invention.
Figure 51:
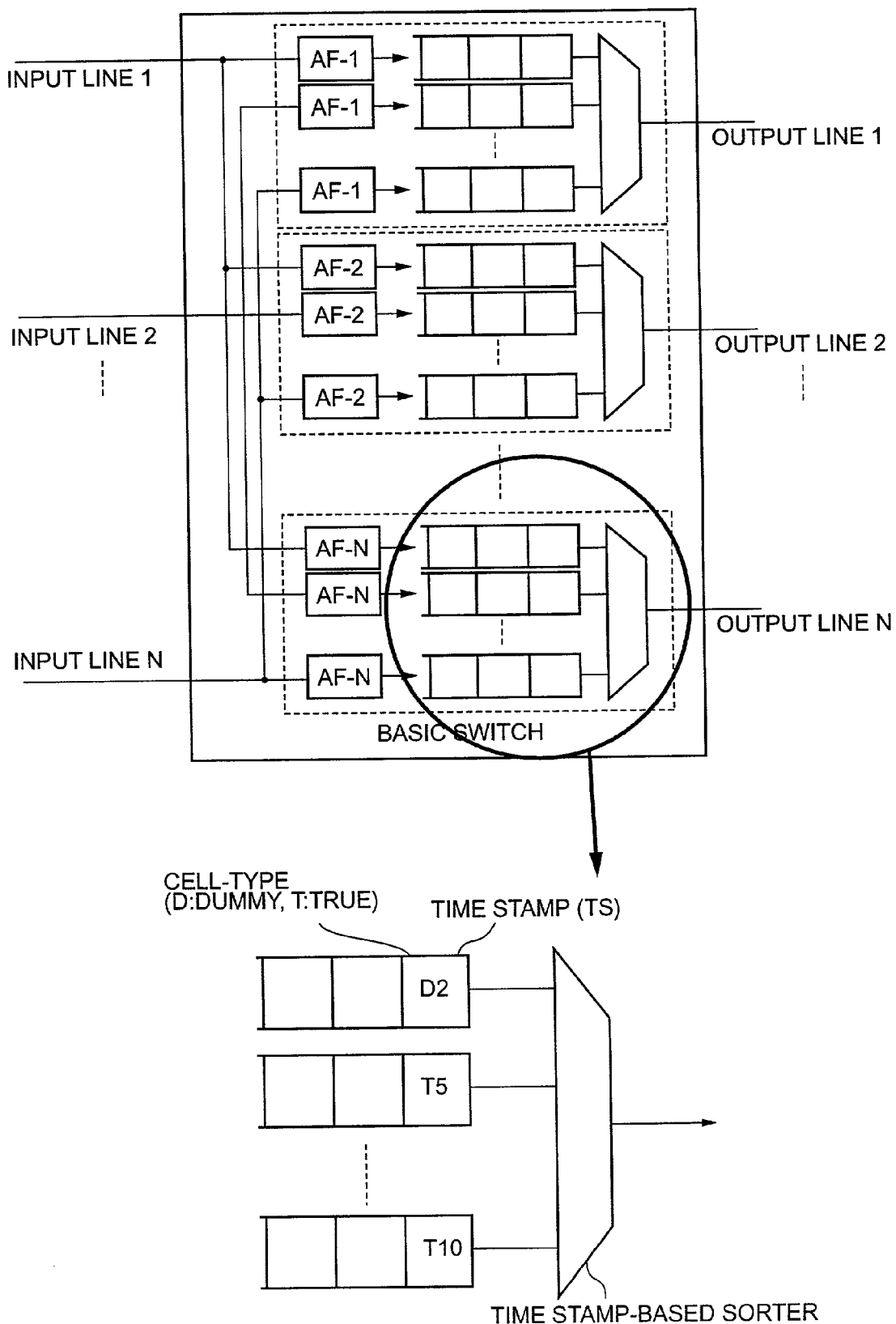
FIG. 51 shows an output buffer part.

FIGS. 49–51 are diagrams for explaining the operation of the basic switch of the fourth embodiment.

As shown in FIG. 49, when an actual cell (which is a cell having user information, not a dummy cell) arrives at the basic switch, the actual cell is multicasted to all output ports. Each of the multicasted cells is captured in the address filter. Then, if the destination of the cell matches with the output port, the cell is stored in the output buffer. If it does not match, only time stamp information of the cell is extracted and a dummy cell having the time information is stored in the output buffer. According to the operation, service time of all input ports can be conveyed from the actual cell.

As shown in FIG. 50, when a dummy cell arrives at an input port of the basic switch, the dummy cell is multicasted to all output ports. Each of the multicasted cells is captured in the address filter. The address filter stores the dummy cell with time stamp information to the buffer. According to the operation, service time of all input ports can be conveyed from the dummy cell by the above operation.

After the cell is stored in the output buffer, the time stamp sorter carries out switching of the cell to the output port while ensuring the cell sequence. At this time, the time stamp and the cell type (an actual cell or a dummy cell) of the head cell in the output buffer are extracted and sent to the time stamp sorter.

Figure 52:
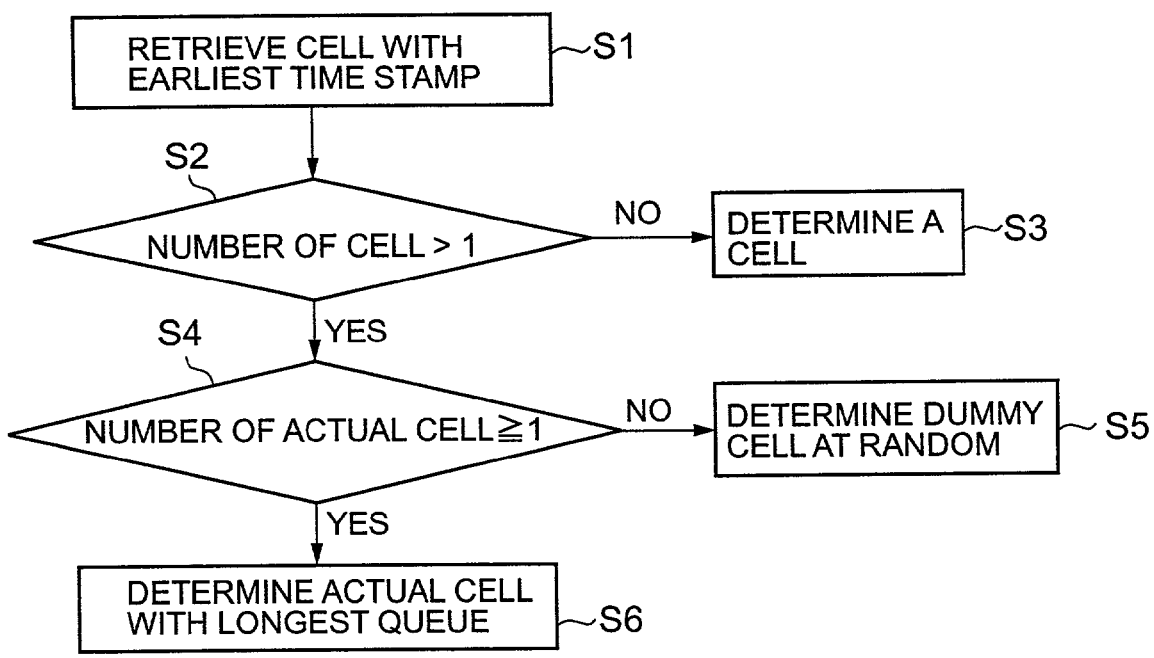
FIG. 52 is a flowchart showing a cell selection method.

FIG. 52 is a flowchart showing the operation of the cell selection for ensuring the cell sequence. The time stamp sorter retrieves a cell with the earliest time stamp after the information of the time stamp and the cell type are sent in step 1. Next, the number of the cell with the earliest time stamp is checked as to whether it is larger than one or not in step 2. If the number is one, the retrieved cell is switched to the output port as a service object cell in step 3. If the number is larger than 1, the number of actual cells is checked in step 4. If there is no actual cell, a dummy cell is selected randomly in step 5. If there are a plurality of actual cells, a cell which is stored in an output buffer having the longest queue length is determined in step 6. According to the above-mentioned algorithm which is carried out independently in each output port, 100% cell resequencing is realized in the basic switch.

So far, configurations for ensuring the cell sequence in the basic switch have been described. The cell distribution in the switch is necessary for realizing a non-blocking switch as described before. In the following, a method of the cell distribution which has a superior performance will be described as a fifth embodiment.

Figure 53:
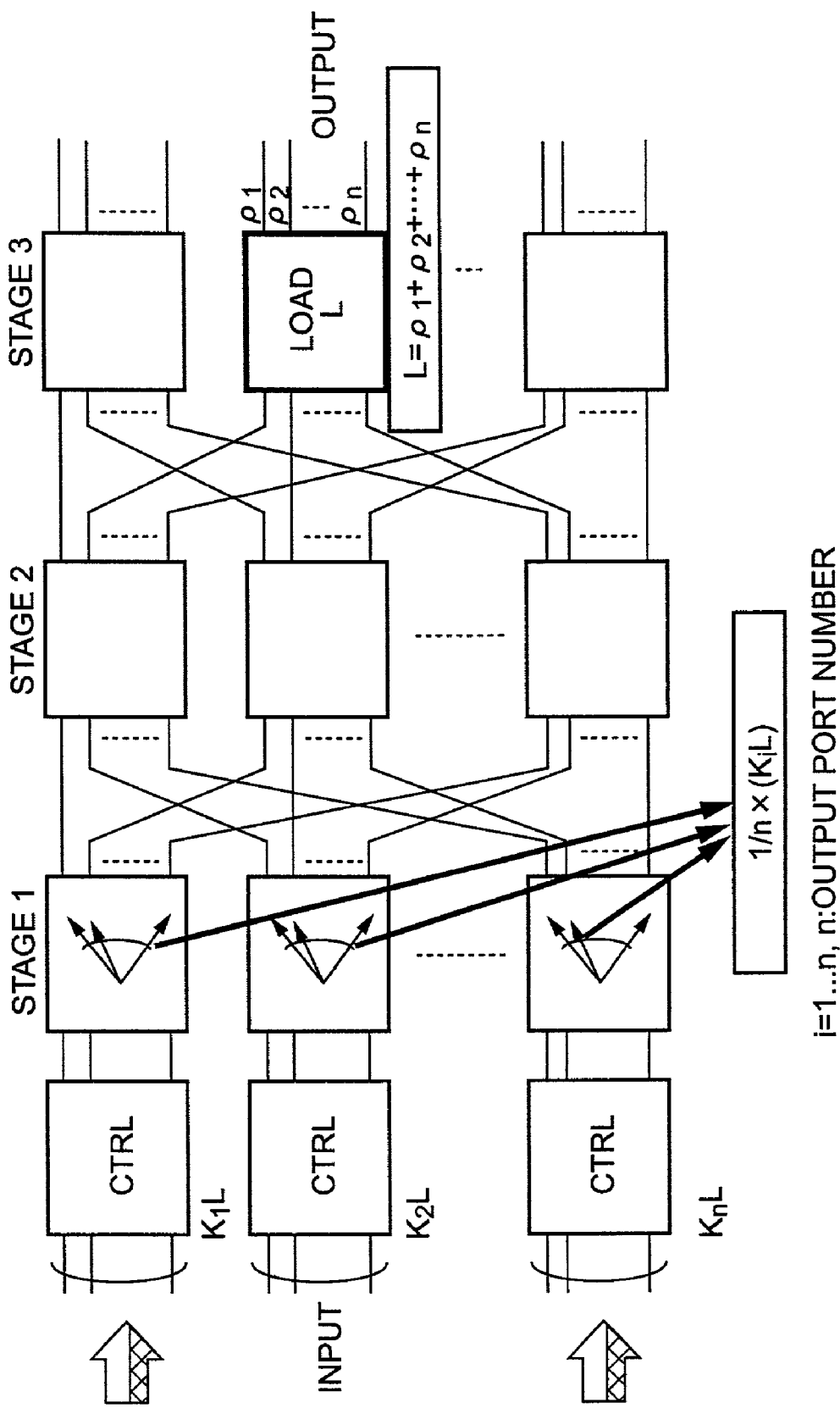
FIGS. 53–55 are diagrams showing cell distribution in a switch.

FIG. 53 is a block diagram for explaining a concept of the cell distribution. As shown in the figure, a configuration which has n n×n basic switches forming a multi stage switch is taken as an example.

In order to carry out the cell distribution to avoid blocking in the switch, a scheduling algorithm in consideration of destinations of all n×n input cells is necessary. However, such a scheduling algorithm may have problem of scalability for a large-scale switch. Therefore, the fifth embodiment of the present invention proposes to provide a cell distribution algorithm in each of the n input switches dispersively. Accordingly, since the cell distribution can be carried out in an n×n basic switch, the scalability can be obtained and a large scale switch can be realized.

In the following, the operation of the distribution algorithm will be described. As shown in FIG. 53, input traffic of load L is concentrated on a basic switch of the third stage. The traffic arrives from basic switches of the first stage, and the ratio of the traffic from each first stage is $k_1:k_2: \ldots :k_n$, in which $k_1+k_2+ \ldots +kn=1$. At this time, the distribution algorithm in each basic switch of the first stage selects a route among n routes for each cell such that traffic which arrives at basic switches in the second stage is distributed to 1/n, considering the destination of each cell. The number of the basic switches of the second stage is n and cells may transit n different basic switches of the second stage to arrive at the same output basic switch.

Figure 54:
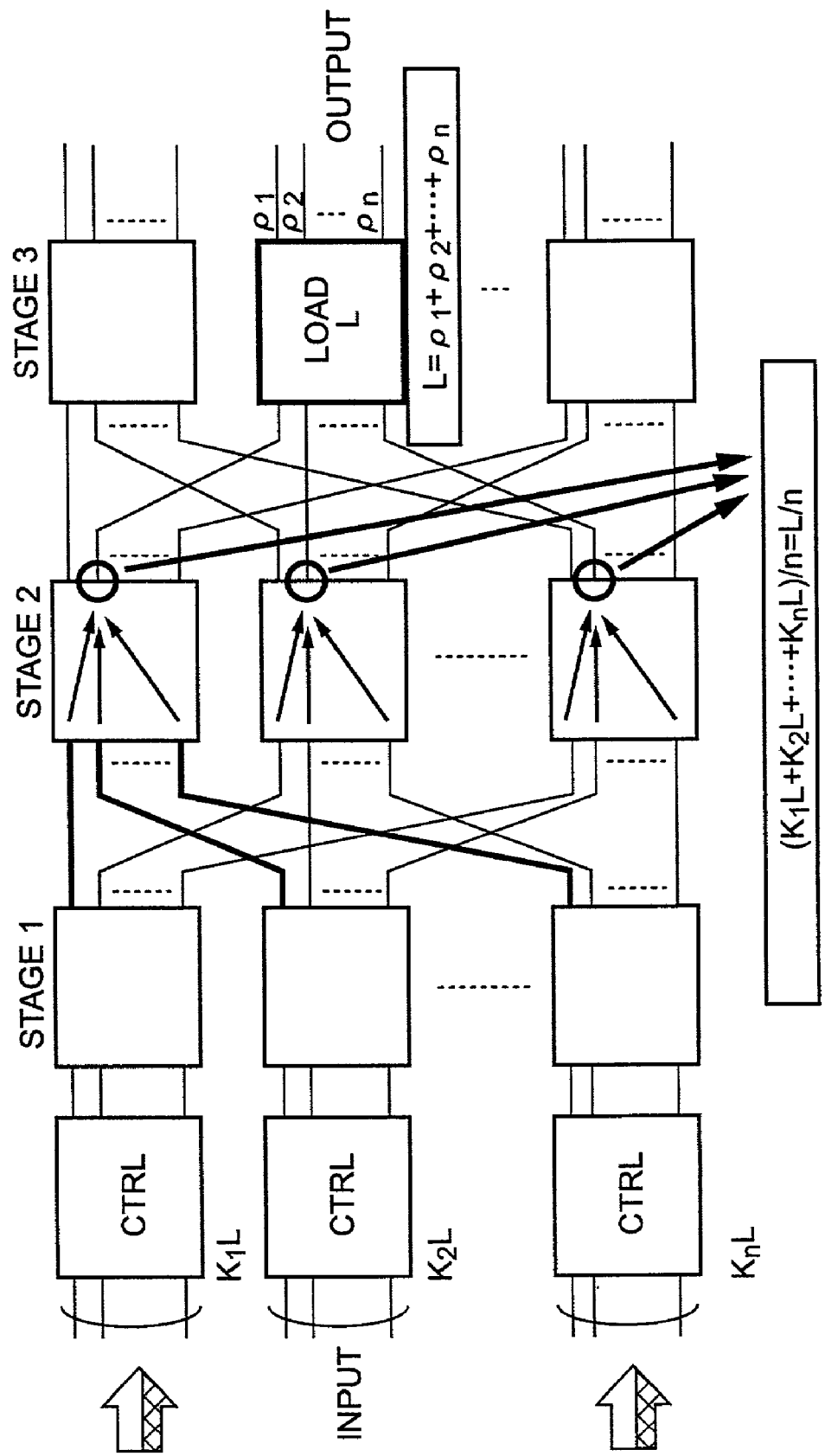

As shown in FIG. 54, according to the route selection, the sum of the load of a basic switch of the second stage is as follows:

$$(k_1L+k_2L+ \ldots +k_nL)/n=L/n(\because k_1+k_2+ \ldots +k_n=1).$$

Therefore, if traffic to the same destination can be distributed as 1/n in the input basic switch, the output load of the basic switch of the second stage can be equalized to L/n.

Figure 55:
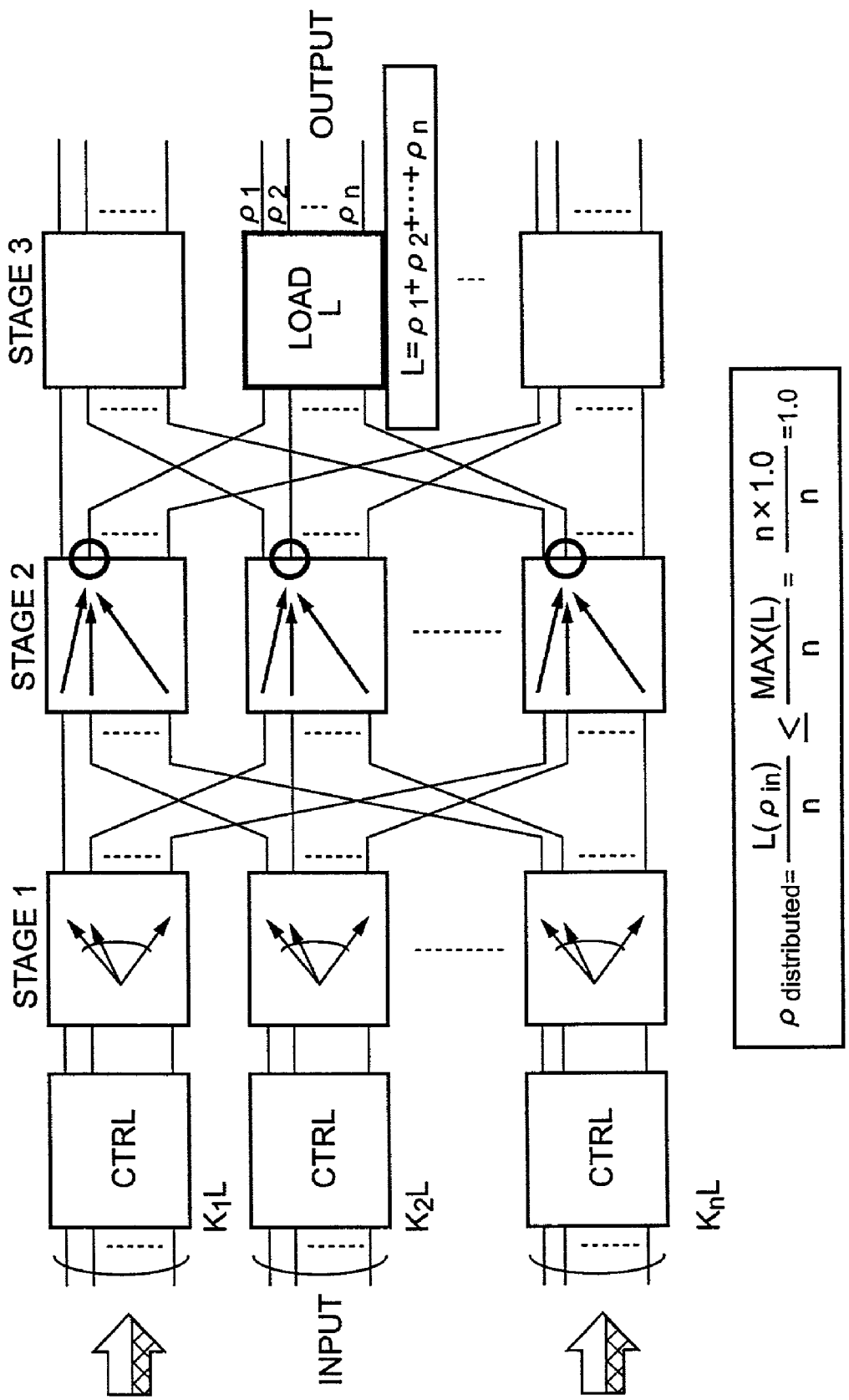

As shown in FIG. 55, the maximum L is n×1.0. Therefore, the maximum load distributed to each link is smaller than or equal to 1.0. Thus, load concentration to any output link in the switch can be prevented so as to realize a non-blocking switch.

Figure 56:
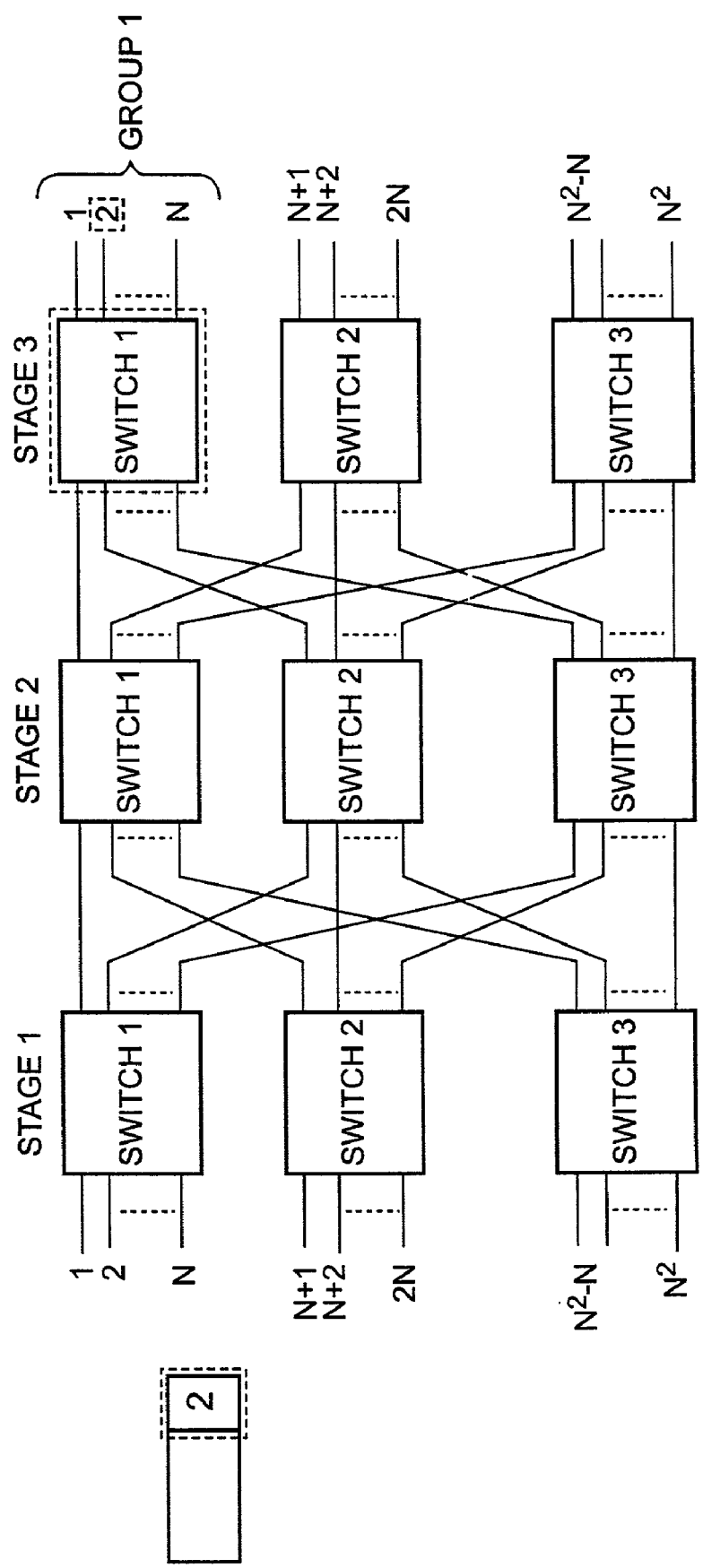
FIG. 56 is a diagram for explaining cell distribution according to a fifth embodiment of the present invention.
Figure 59:
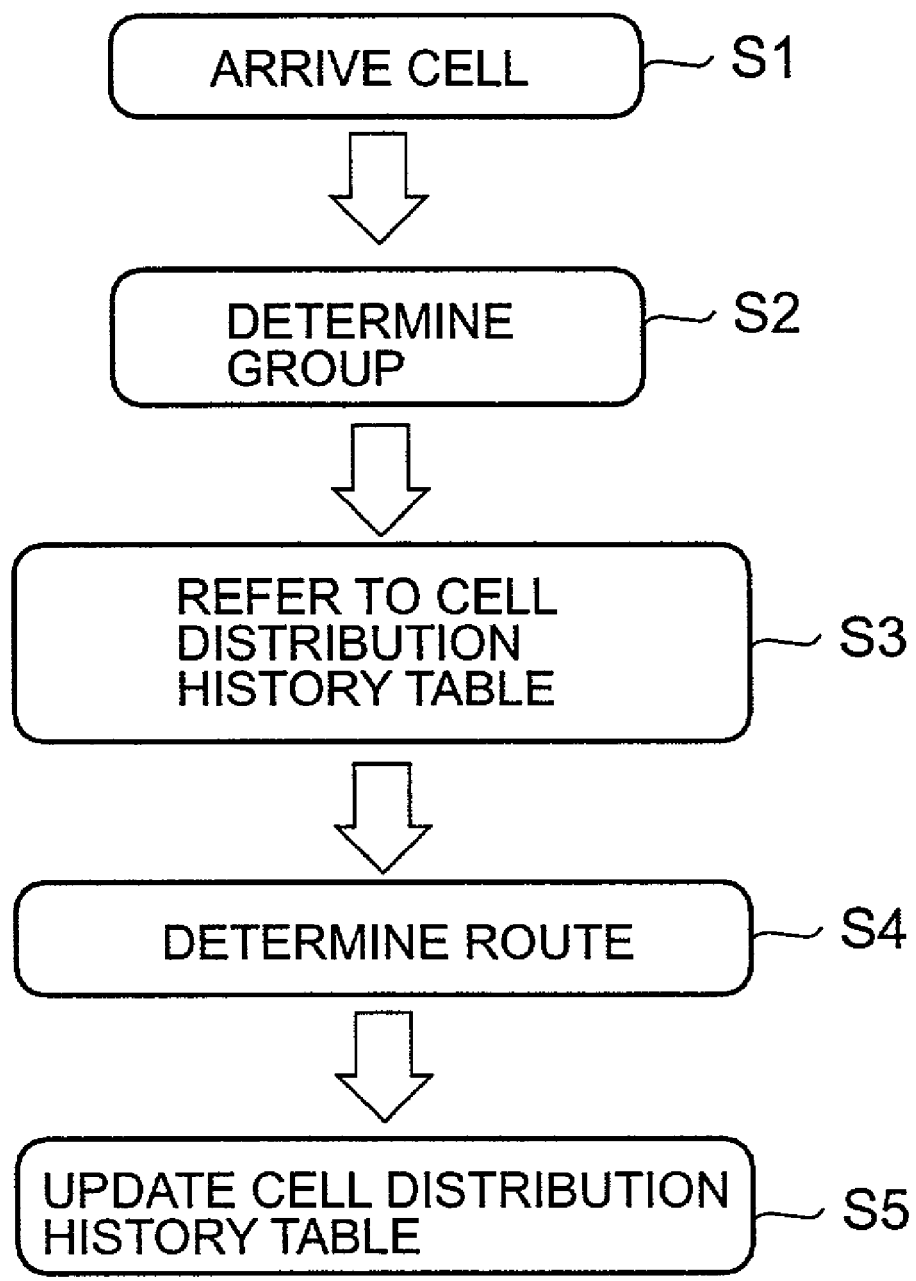
FIG. 59 is a flowchart showing the operation of the cell distribution according to the fifth embodiment of the present invention.

FIG. 56 is a diagram for explaining the distribution method of the present invention. FIG. 59 shows a flowchart showing the method. The following description is based on the flowchart.

Figure 57:
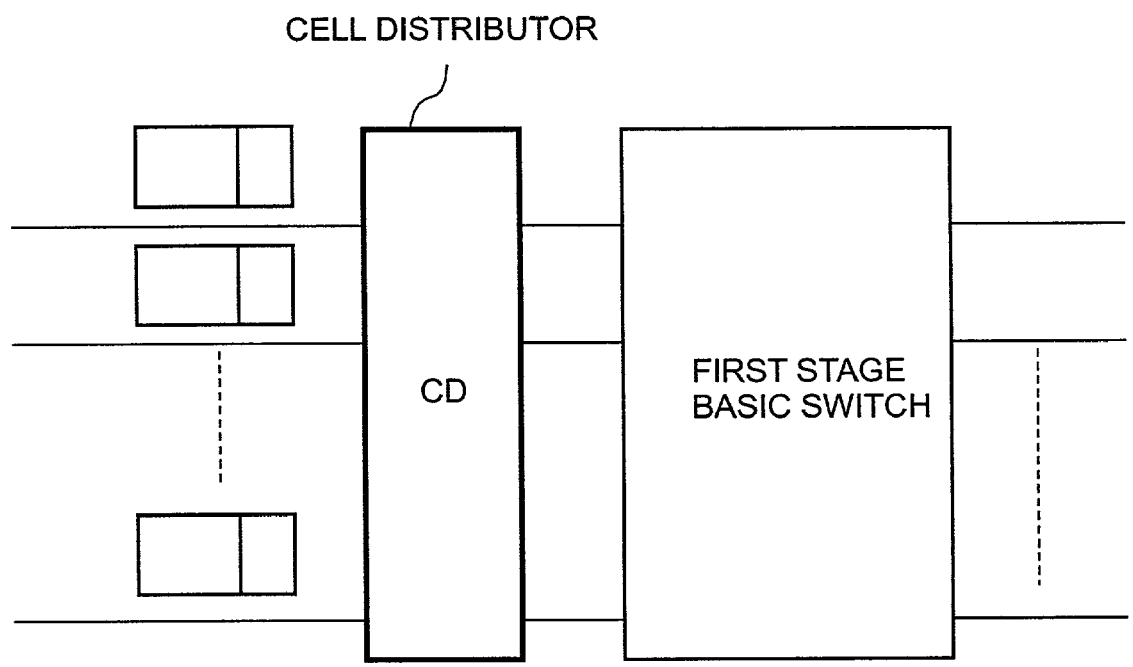
FIG. 57 is a diagram showing a cell distribution part according to the fifth embodiment of the present invention.

As shown in FIG. 57, an algorithm of the method is carried out in a cell distribution part provided in front of the basic switch of the first stage.

As shown in FIG. 56, when a cell arrives at the ATM switch in step 1, the cell distribution part determines a destination group of the switch in step 2. Here, the destination group represents an output basic switch of the third stage. Therefore, there are the same number of groups as that of the basic switches of the third stage. For example, there are N groups in a three-stage ATM switch using N N×N basic switches in a stage. For example, cells for output ports 1–N are grouped into group 1, cells for output ports N+1–2N are grouped into group 2, . . . , cells for output ports $N^2-N-N^2$ are grouped into group N. FIG. 56 shows a cell for the output port 2 which is grouped into group 1.

Figure 58:
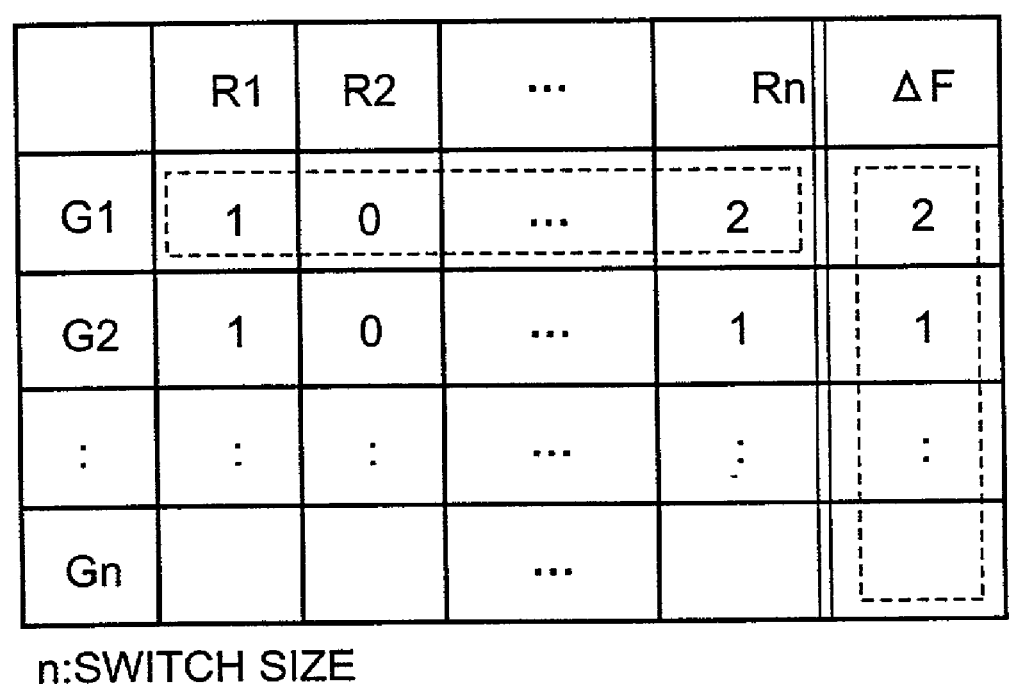

After the destination group is determined, a route for the cell to be transferred is determined. To determine the route, a cell distribution history table is referred to according to the distribution method of the present invention in step 3. Each cell distribution part has the cell distribution history table. FIG. 58 shows the cell distribution history table.

The cell distribution history table provides route information by the group. In the example of the table shown in FIG. 58, each of the values in a group represents the number of cells to be sent through a corresponding route in a period of time. In addition, the table provides ΔF which represents difference between the maximum value and the minimum value in R1–Rn. If the value ΔF is large, it represents that the cell traffic is not equalized between routes. Therefore, the cell transfer route is determined such that the value ΔF becomes minimum in each group in step 4.

In the following, the method for determining the cell transfer route will be described concretely. As mentioned above, the group is determined for arriving cells. Next, routes for cells to be transferred are determined starting from the cell which is grouped in a group having the largest ΔF.

For example, in FIG. 58, since ΔF=2 in the group 1 (G1) is the largest value, the route of the cell included in G1 is determined first. Then, a route which has the minimum value among R1–Rn is determined to be the cell transfer route. For example, in FIG. 58, since R2 is 0, which is minimum, the route 2 is selected. By repeating the operation, the routes are determined. In the process, if there are a plurality of group destinations, all destinations of different groups are determined first. Then, a cell is transferred by using a route with a minimum value among routes which have not been selected.

According to the operation, all input cells are transferred to the output port of the basic switch of the first stage in a cell time, preventing simultaneous arrival to an output port. In addition, if there are a plurality of routes which have the minimum value, a route is selected with equal probability among other cells.

In the process, a value in the history table is updated by one each time when a route is selected in step 5. The values in the history table are managed by using a sliding window so that the table is updated while being reset with a window width corresponding to the delay time in the switch. For example, if the window width is 100 and the step width is 20, the table is updated from a history 0–100, to, a history 20–120.

The above-mentioned operation can be summarized as follows.

When a cell arrives at the switch, the cell distribution part determines a destination group from the destination of the cell. Next, the route is determined with reference to the cell distribution history table, and, then, the cell distribution history table is updated. By repeating the operation, the ATM switch can be configured as a non-blocking switch.

Figure 60B:
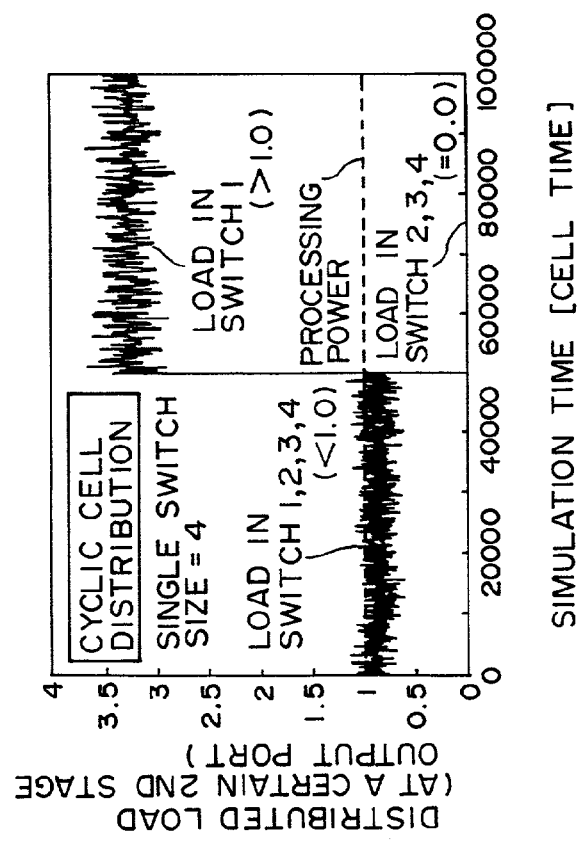
FIGS. 60A and 60B show a result of a simulation of the cell distribution according to the fifth embodiment of the present invention.
Figure 60A:
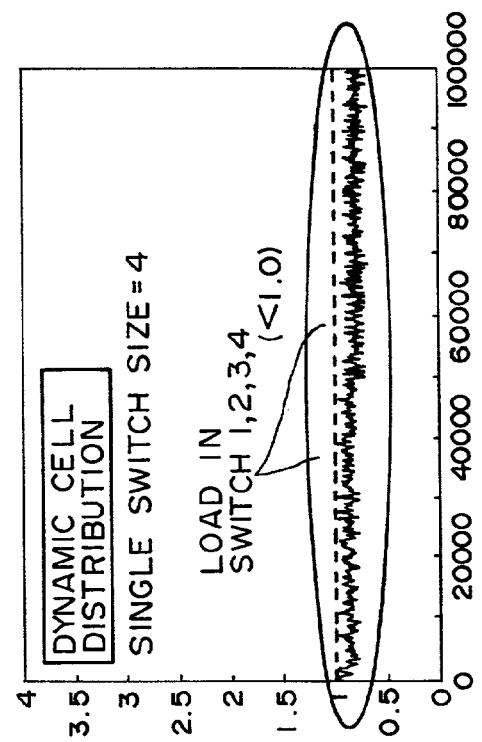

This method is superior than the method of cyclic distribution which was mentioned before. FIGS. 60A and 60B show the superiority. FIG. 60B is the result of a simulation of the fifth embodiment which carries out the dynamic cell distribution. The horizontal axis shows the simulation time and the vertical axis shows load which is distributed to output ports of each basic switch in a second stage. The cyclic cell transfer method which assigns each route periodically is compared with the dynamic cell transfer method of the present invention. In the simulation, a traffic volume which has random destination distribution is input until T=50000 cell time, and a traffic volume which has constant destination distribution is input after T=50000 cell time. As shown in FIG. 60A, according to the method of cyclic cell transfer, if there is a strong correlation between the destination distribution of the input traffic and the period of route distribution, distributed destinations are not smoothed, thereby load concentration occurs in a certain output port and blocking occurs. According to the dynamic cell distribution method, a non-blocking switch can be realized since the distributed destinations are not dependent on the traffic pattern of the arriving cells.

By combining the cell distribution method and the hierarchical cell-resequencing network, a non-block multi stage cell switch which has a good switching performance can be realized.

Figure 61:
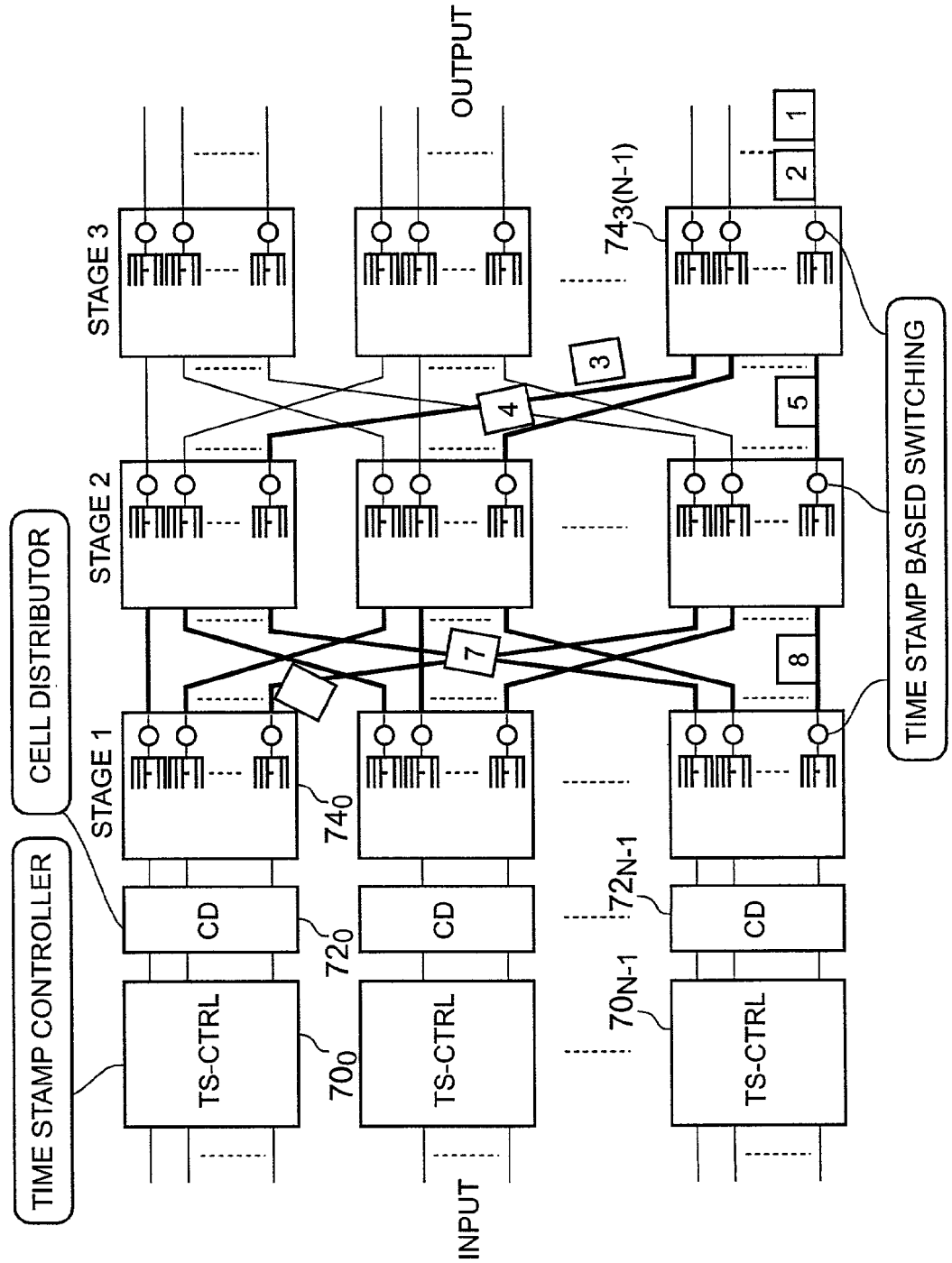
FIG. 61 is an example of an ATM switch including the cell distribution part according to the present invention.

FIG. 61 shows an example of a cell switch which includes basic switches with the cell-resequencing network of the fourth embodiment (a general type cell-resequencing network) and the above-mentioned cell distribution parts.

Specifically, the cell switch includes time stamp controllers $70_0$–$70_{N-1}$, cell distribution parts $72_0$–$72_{N-1}$ and basic switches $74_0$–$74_{3(N-1)}$ which have the cell-resequencing network of the fourth embodiment.

The time stamp controllers $70_0$–$70_{N-1}$ add an arriving time to a cell, and generate a dummy cell when there is no cell arriving. The cell distribution parts $72_0$–$74_{N-1}$ determine the cell transfer route of each cell according to the distribution algorithm described as the fifth embodiment. The basic switches $74_0$–$74_{3(N-1)}$ ensure the cell sequence of input cells at each output port. The operation of the switch is as follows.

When a cell arrives at the cell switch, the time stamp controller stores the arriving time in the overhead of the cell. If there is no arriving cell, the time stamp controller generates a dummy cell which stores the current cell time in the overhead. The time stamp controllers $70_0$–$70_{N-1}$ are synchronized in order to store the cell arriving time and update the time stamp information every one cell time.

In this example, the cell switch has three stages, each basic switch is the output buffer type and the output buffer part includes output buffers for every input port. As mentioned before, the output buffer is connected to the time stamp sorter (TS) which selects an output cell by comparing time stamp information of the head cells of the output buffers. The operation of the basic switch was described in the fourth embodiment.

Figure 62:
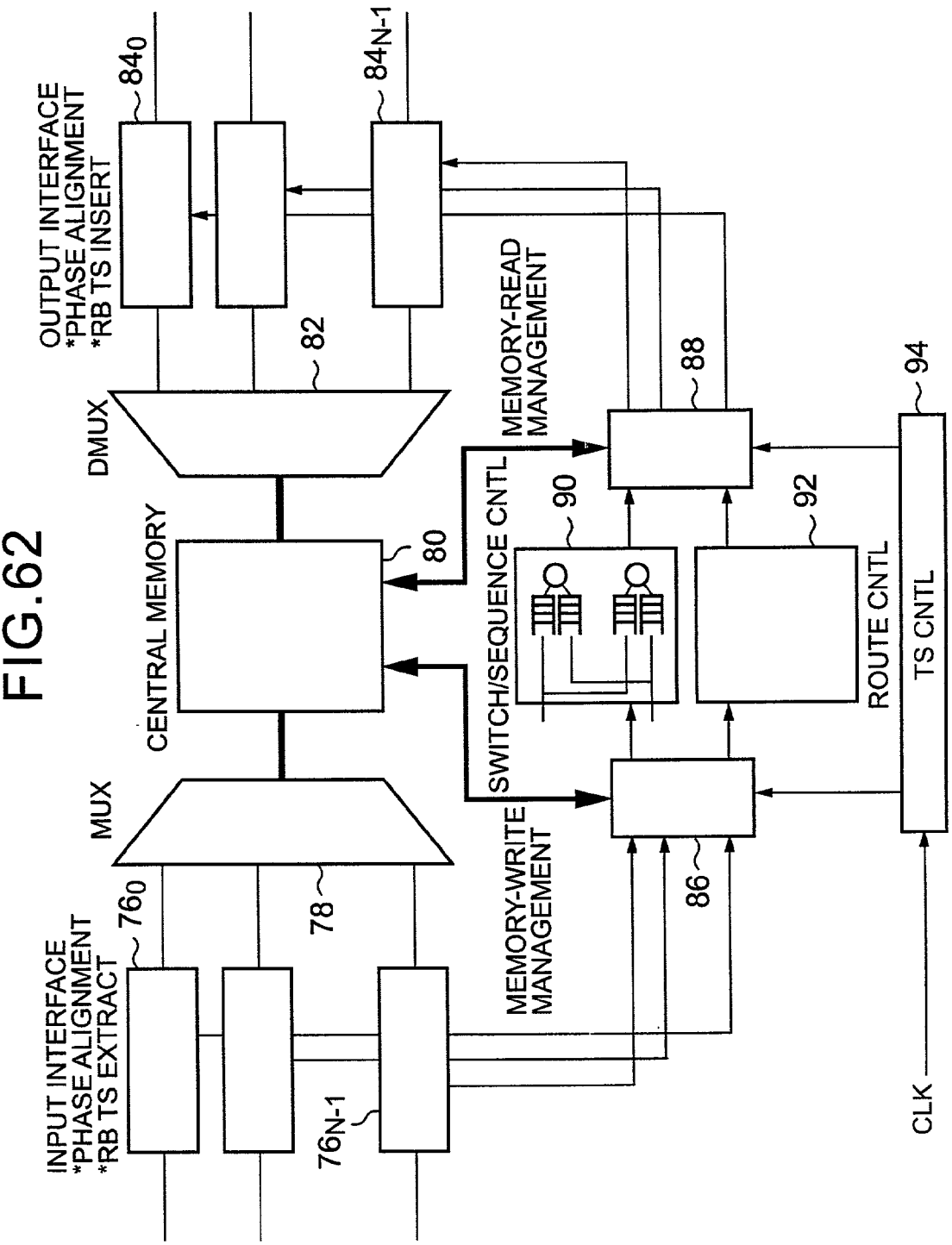
FIG. 62 is an example of a hardware configuration of the basic switch according to the present invention.

FIG. 62 is an example of the hardware configuration of the basic switch. As shown in the figure, the basic switch includes input interfaces $76_0$–$76_{N-1}$, a MUX 78, a central memory, a DMUX 82, output interfaces $84_0$–$84_{N-1}$, a memory-write management part 86, a memory-read management part 88, a switch/sequence controller 90, a route controller 92, and a time stamp controller 94.

The input interfaces $76_0$–$76_{N-1}$ carry out phase adjustment of an input cell and extract a routing bit and a time stamp. The MUX 78 multiplexes cells which are written in the central memory 80 and are read out from the central memory 80. The read/write control is carried out by the memory-read management part 88 and the memory-write management part 86. The read out data is demultiplexed in the DMUX 82 and output through the output interface in which phase adjustment is carried out, and the routing bit and the time stamp are inserted.

The switch/sequence controller 90 carries out the hierarchical cell resequencing based on the time stamp information. The route controller 92 distributes cells according the above-mentioned cell distribution algorithm. In addition, the time stamp controller 94, if the basic switch is provided in the first stage, adds the time stamp to each cell, and generates a dummy cell with a time stamp when there is no cell to be transferred.

Figure 63:
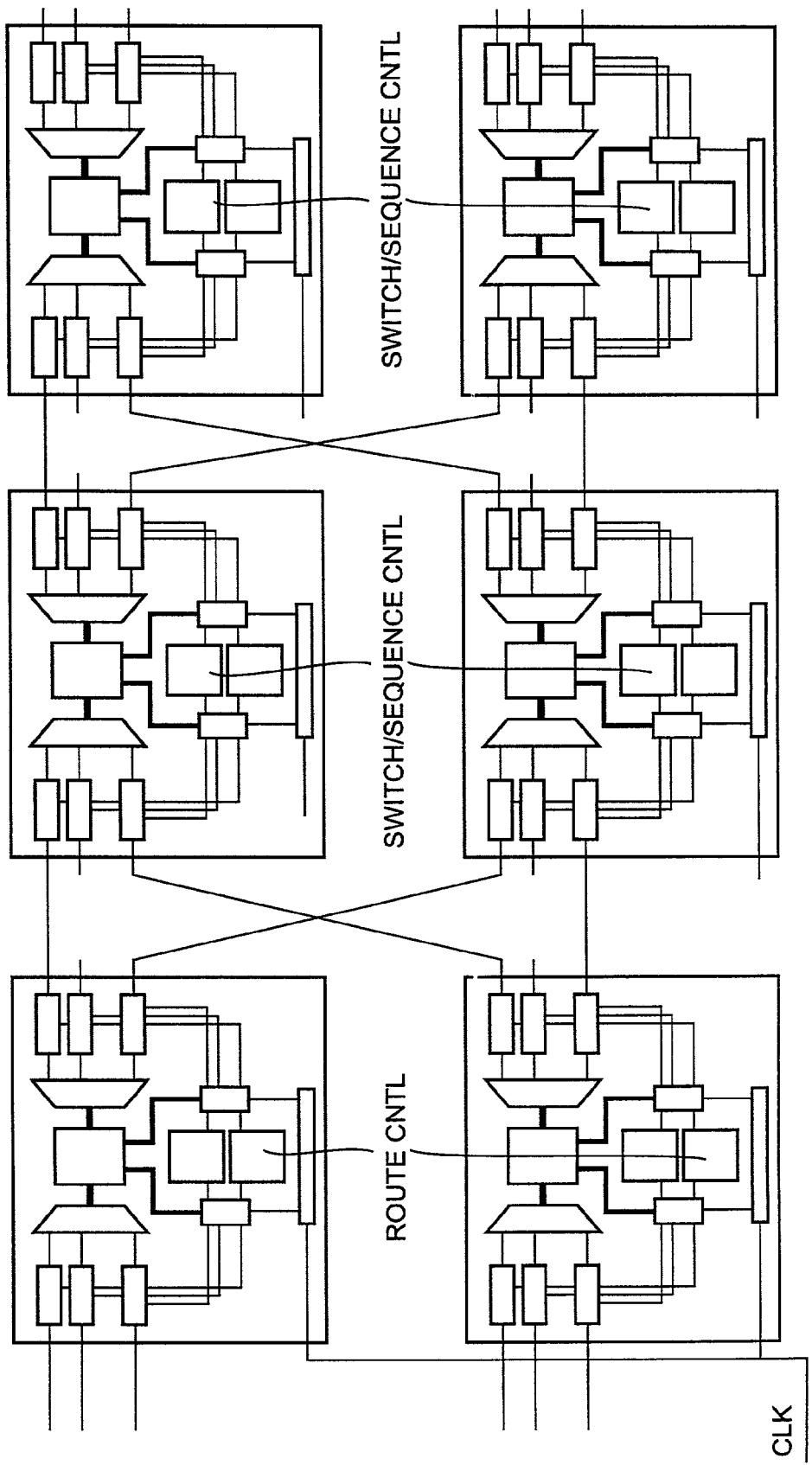
FIG. 63 is a diagram showing a multi stage switch which is configured by the basic switch shown in FIG. 62.

FIG. 63 is a diagram showing a multi stage switch which is configured by the basic switch shown in FIG. 62. Each basic switch can select a route control mode or a switch/sequence control mode by mode switching. In the example, the basic switches of the first stage select the route control mode and the basic switches of the second and third stages select the switch/sequence control mode. In addition, a reference clock is supplied to each basic switch of the first stage so as to add the time stamp synchronously.

Figure 64:
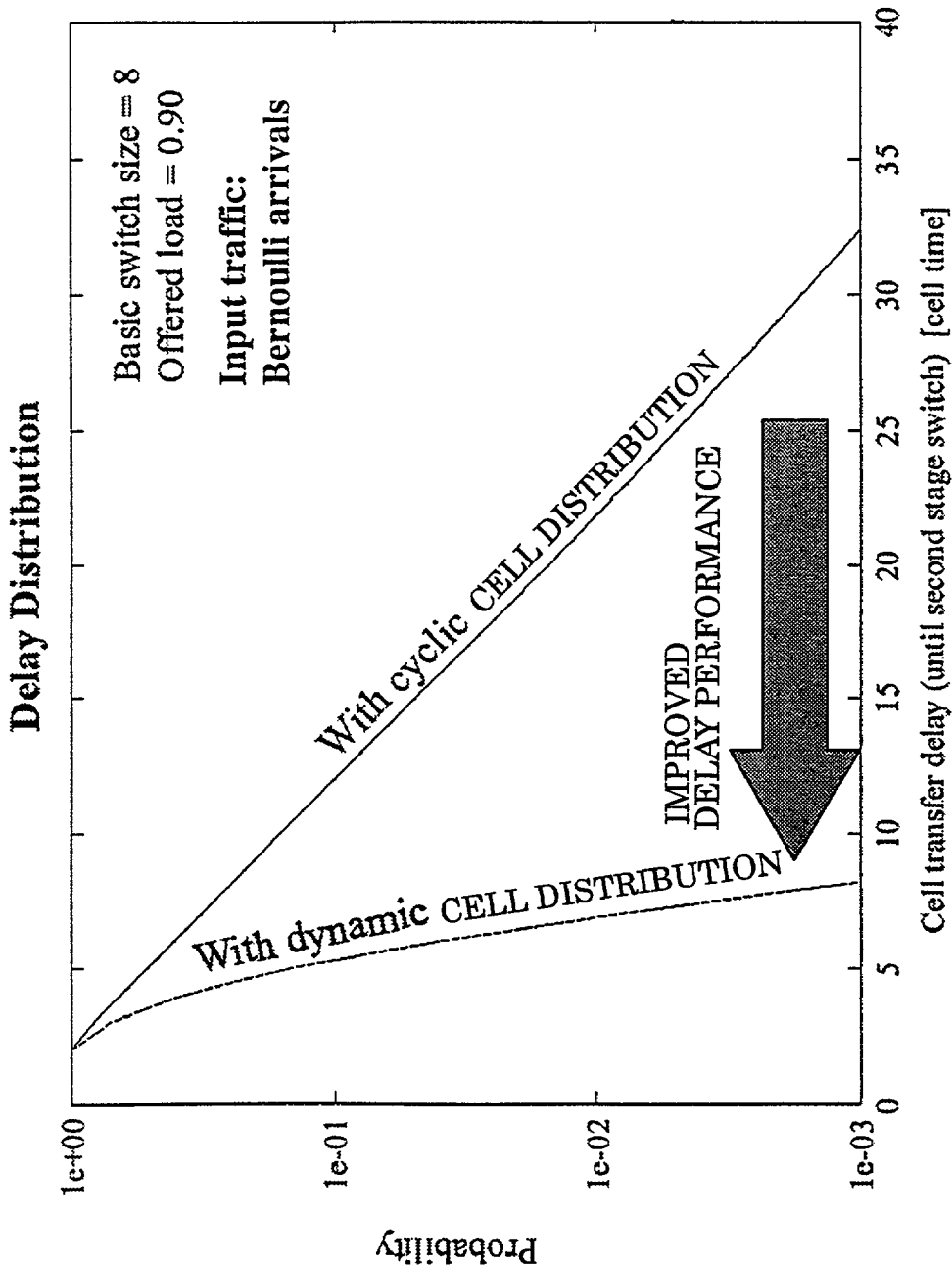
FIG. 64 shows a result of a simulation of the cell transfer delay performance in an ATM switch having the general-type cell-resequencing network.

FIG. 64 shows a result of a simulation of the cell transfer delay performance in the cell switch having the general type cell-resequencing network. The horizontal axis shows the cell transfer delay time and the vertical axis shows the probability. As is recognized from the simulation, the cell switch with the dynamic cell distribution algorithm and the time stamp distribution algorithm has a superior delay performance.

Figure 65:
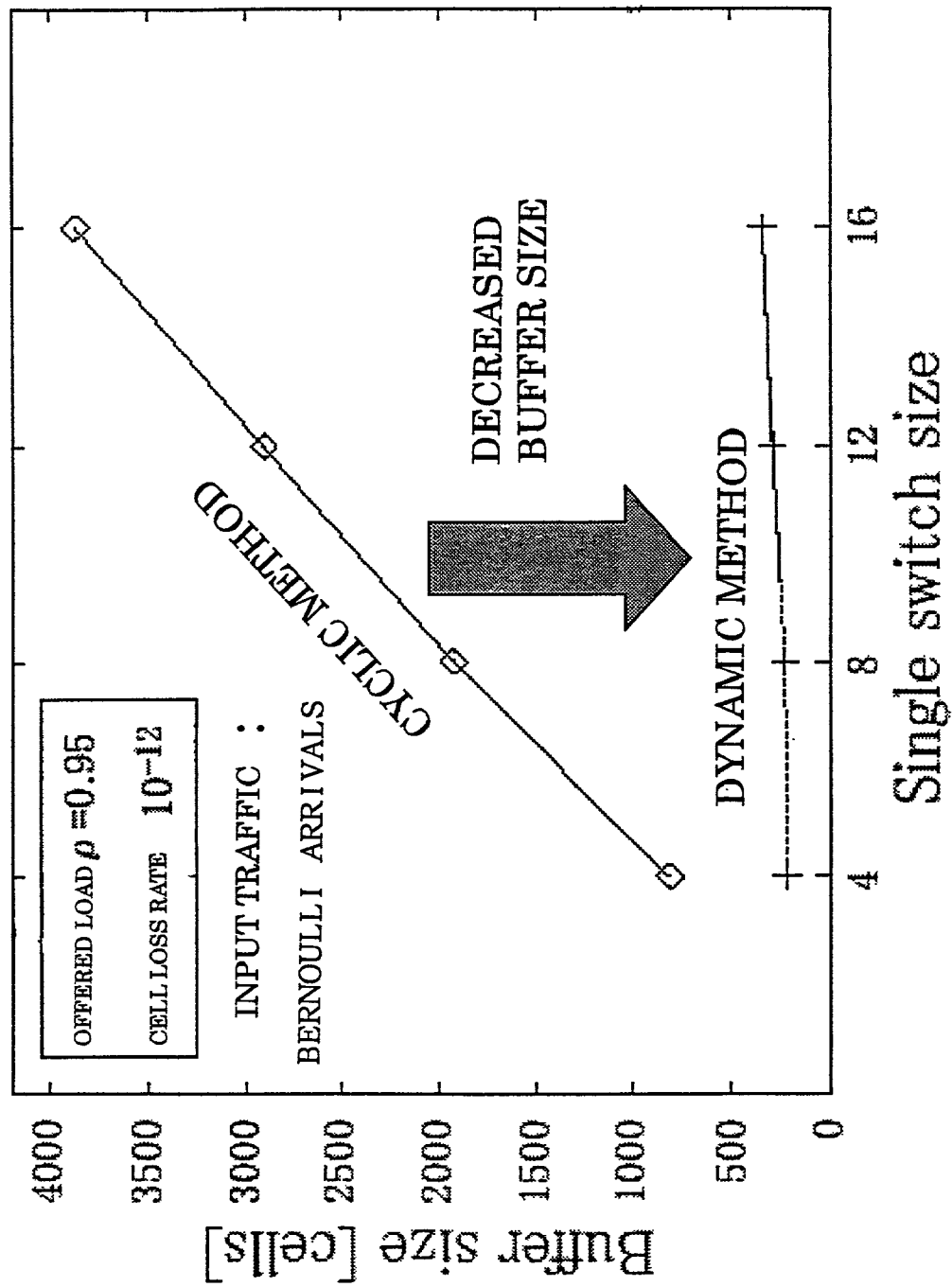
FIG. 65 shows a result of a simulation of a buffer size in the ATM switch.

FIG. 65 shows a result of a simulation of a buffer size which is required for the proposed general type cell-resequencing switch. The horizontal axis shows the basic switch size and the vertical axis shows the buffer size for a basic switch. In the simulation, a traffic load of 0.95 on average is applied to the switch and the buffer size for satisfying a cell loss rate 10E–12 is simulated. According to the simulation, it is recognized that the buffer size can be largely reduced.

FIG. 66 shows an average cell transfer delay performance of the proposed switch. The horizontal axis shows the offered load and the vertical axis shows the average cell transfer delay. As shown in FIG. 66, the proposed switch can achieve a switching performance the same as the performance of an ideal output buffer type switch although the proposed switch includes the cell-resequencing function.

Figure 67A:
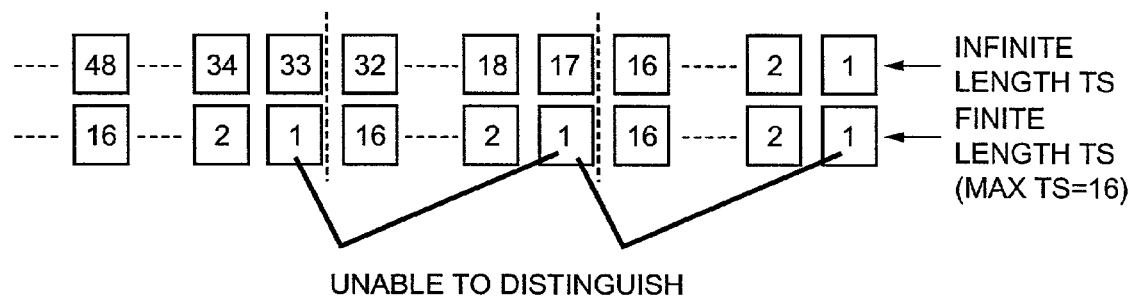
FIGS. 67A and 67B are diagrams for explaining a problem of an finite-length time stamp.
Figure 67B:
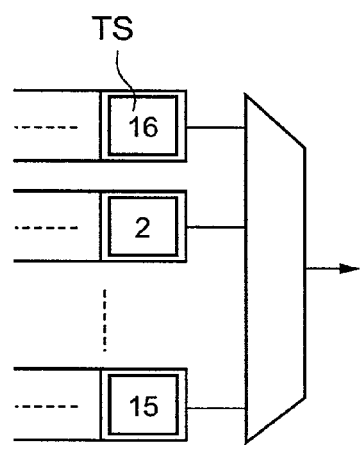

The above-mentioned various types of the hierarchical cell-resequencing network compare the cell sequence based on the time stamp information added to a cell. In the case, since it is impossible to provide a time stamp of an infinite period length due to the cost of the switch, it is necessary to realize the cell-resequencing network using a time stamp of a finite length. However, when using the finite-length time stamp, since it can not be determined whether time stamps are in the same period or not if any time stamps of another period are included, the comparison of the time stamp may result in a wrong cell sequence. FIGS. 67A and 67B shows the problem. In this example, only the uppermost buffer is a time stamp of an old period, and all the remaining time stamps are of a new period. Since the difference of the period can not be recognized by the time stamp sorter, the cell with the time stamp 2 is selected earlier than the cell with 16. Accordingly, the switch can not operate correctly.

For solving the problem, as shown in FIGS. 68A and 68B, a hierarchical time stamp mechanism is introduced in order to identify the boundary of the period of the time stamp information. This method will be described in the following as a sixth embodiment.

In the sixth embodiment, a time stamp flag is introduced for identifying the period of a cell. The period of the time stamp is distinguished by the time stamp flag. The time stamp sorter manages the flag information in every output buffers. Accordingly, the cell resequencing can be carried out correctly even if the boundary of the period is included in a buffer length.

Figure 69:
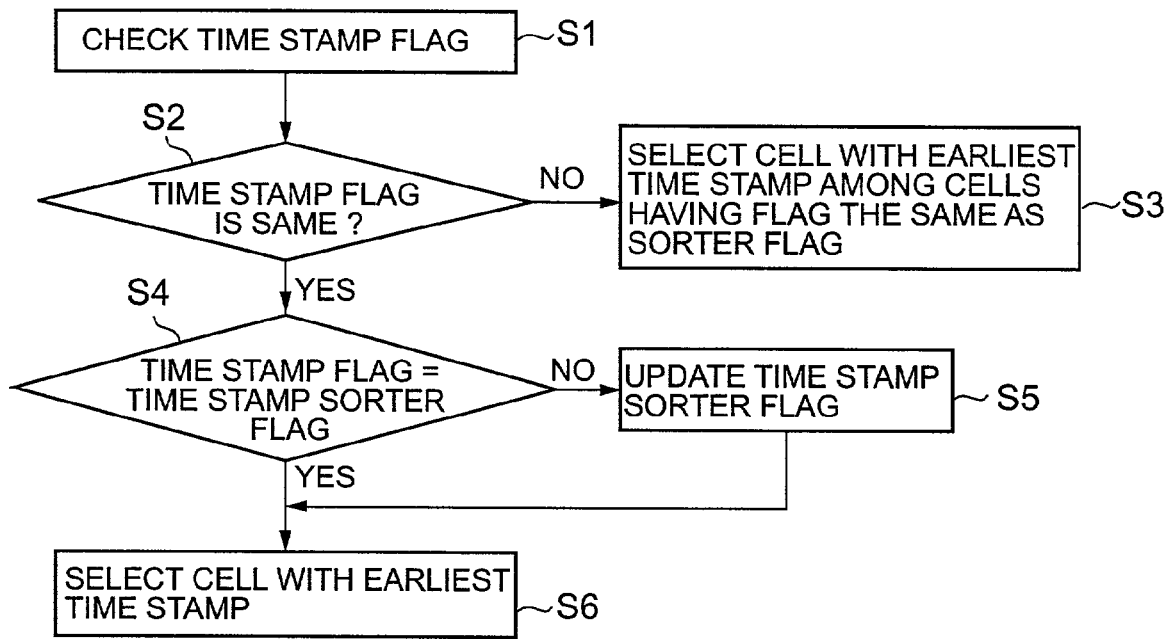
FIG. 69 is a flowchart showing a cell selection method according to the sixth embodiment of the present invention.

Next, the operation for ensuring the cell sequence by using the time stamp flag will be described with reference to a flowchart in FIG. 69.

The time stamp sorter checks the time stamp flag of the head cells of the output buffers in step 1. At this time, the time stamp sorter retains time stamp flag information as a time stamp sorter flag. For example, if the time stamp sorter flag is 1, cells with the time stamp flag 1 in the output buffer part are compared, and if the time stamp sorter flag is 0, cells with the time stamp flag 0 in the output buffer part are compared.

Figure 70:
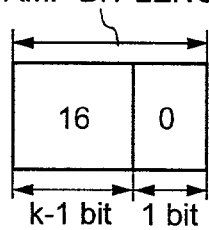
FIG. 70 shows an example of a time stamp according to the sixth embodiment of the present invention.

Next, in the flowchart, it is determined whether all the time stamp flags are the same or not in step 2. When there is a cell whose time stamp is not the same as other time stamp, it represents that a cell which should be processed in the next period and a cell which should be processed in this period are mixed. Therefore, a cell with the earliest time stamp is selected among cells which have the same time stamp flag as the time stamp sorter flag in step 3. If all the time stamp flags are the same in step 2, the time stamp flag of the cells and the time stamp sorter flag are compared in step 4. If they do not match, since it represents that all cells of the service object are switched and cells of the next period have arrived at all buffers, the time stamp sorter flag is updated so as to process cells of the next period in step 5. At the same time, a cell with the earliest time stamp information is switched in step 6. If the time stamp flag and the time stamp sorter flag match in step 4, since it represents that all buffers have service object cells, a cell with the earliest time stamp is switched in step 6. FIG. 70 shows an example of the time stamp.

However, there may be cases where the time stamp comparison is carried out incorrectly even if the above-mentioned hierarchical finite time stamp is used. The cases are as follows.

Figure 71:
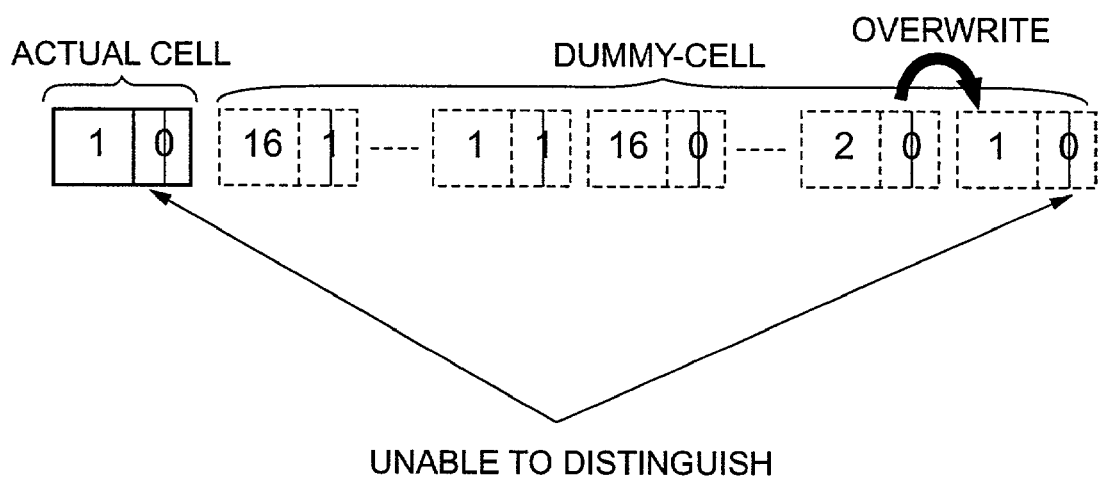
FIG. 71 is a diagram showing a problem of the finite-length time stamp when a load is low.

One of the cases occurs when the load is low. When the load is low so that actual cells rarely arrive at an output port, a dummy cell is generated continuously. If the continuous dummy cells exceed the finite period, the dummy cells are overwritten such that the boundary of the time stamp period disappears as shown in FIG. 71, and thus the time stamp sorter can not recognize the boundary of the time stamp correctly.

Figure 72:
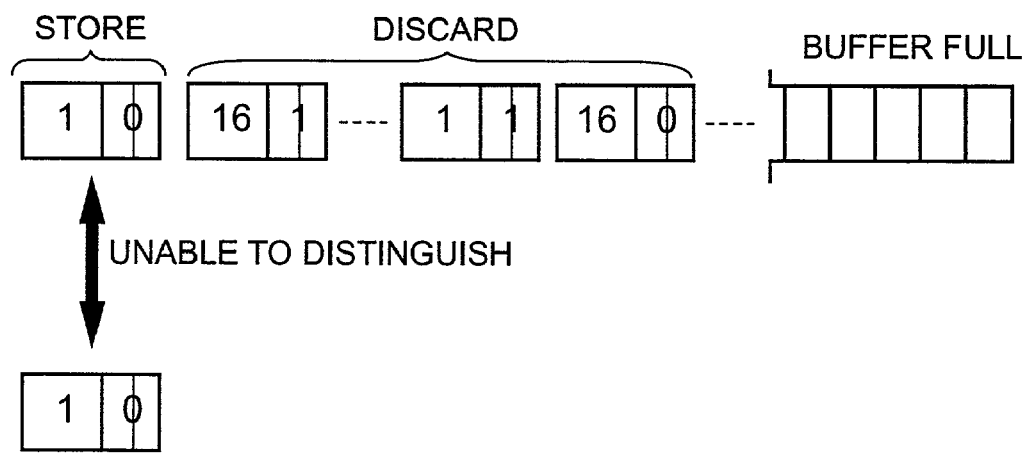
FIG. 72 is a diagram showing a problem of the finite-length time stamp when a load is high.

Another case occurs when a high-load state continues in an output port. If such a high-load state continues and the output buffer continues to overflow so that cells of the same period are discarded for a period longer than the finite buffer period, the time stamp sorter can not identify the boundary of the time stamp period correctly as shown in FIG. 72.

Figure 73:
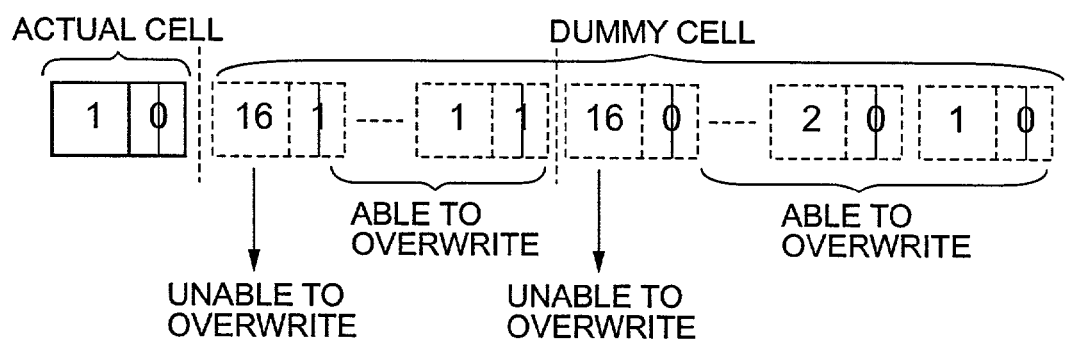
FIGS. 73 and 74 are diagrams for explaining an overwriting control of a dummy cell.
Figure 74:
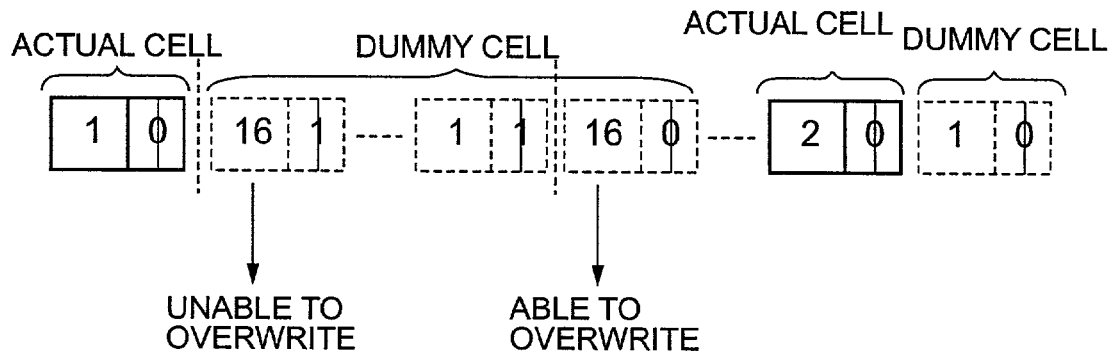

Thus, for solving the above-mentioned problem, methods shown in FIGS. 73 and 74 are introduced. According to the methods, when overwriting cells, at least a cell of the same period remains. For example, as shown in FIG. 73, in the case of the continuous dummy cells, the tail end dummy cell in the finite time stamp period is left by prohibiting overwriting the dummy cell. In addition, as shown in FIG. 74, when at least an actual cell of the same period is stored in the buffer, overwriting of the tail-end dummy cell is allowed as usual since the actual cell is not overwritten.

Figure 75:
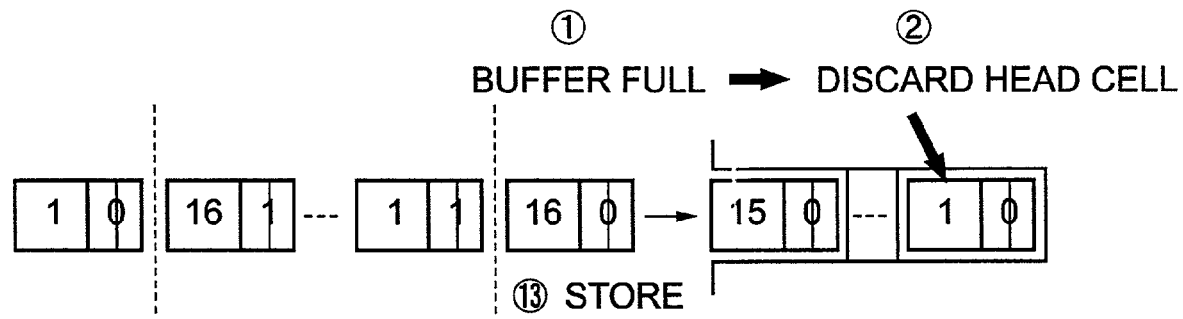
FIGS. 75 and 76 are diagrams for explaining a cell discarding control when a buffer overflows.

For solving the boundary disappearance problem by buffer overflow, as shown in FIG. 75, a head cell is discarded when the buffer is full so as to store a cell. Thus, the boundary of a period can be stored.

Figure 76:
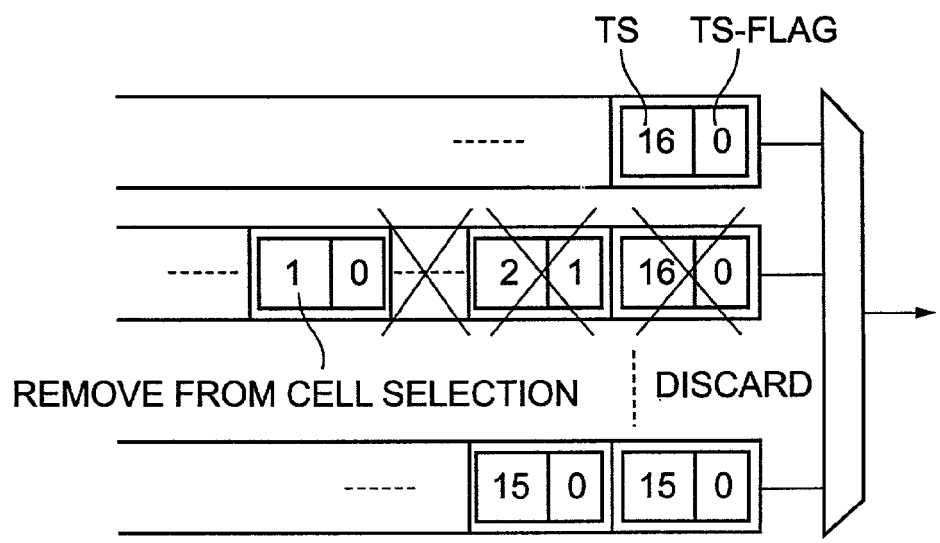

However, if a cell with the same flag information as that of the time stamp sorter is continuously discarded, the boundary information disappears. Therefore, as shown in FIG. 76, the time stamp sorter prohibits selecting a cell from a buffer in which buffer a period ends by discarding cells. According to the above-mentioned operation, a non-blocking switch which has a superior switching performance can be realized.

Figure 77:
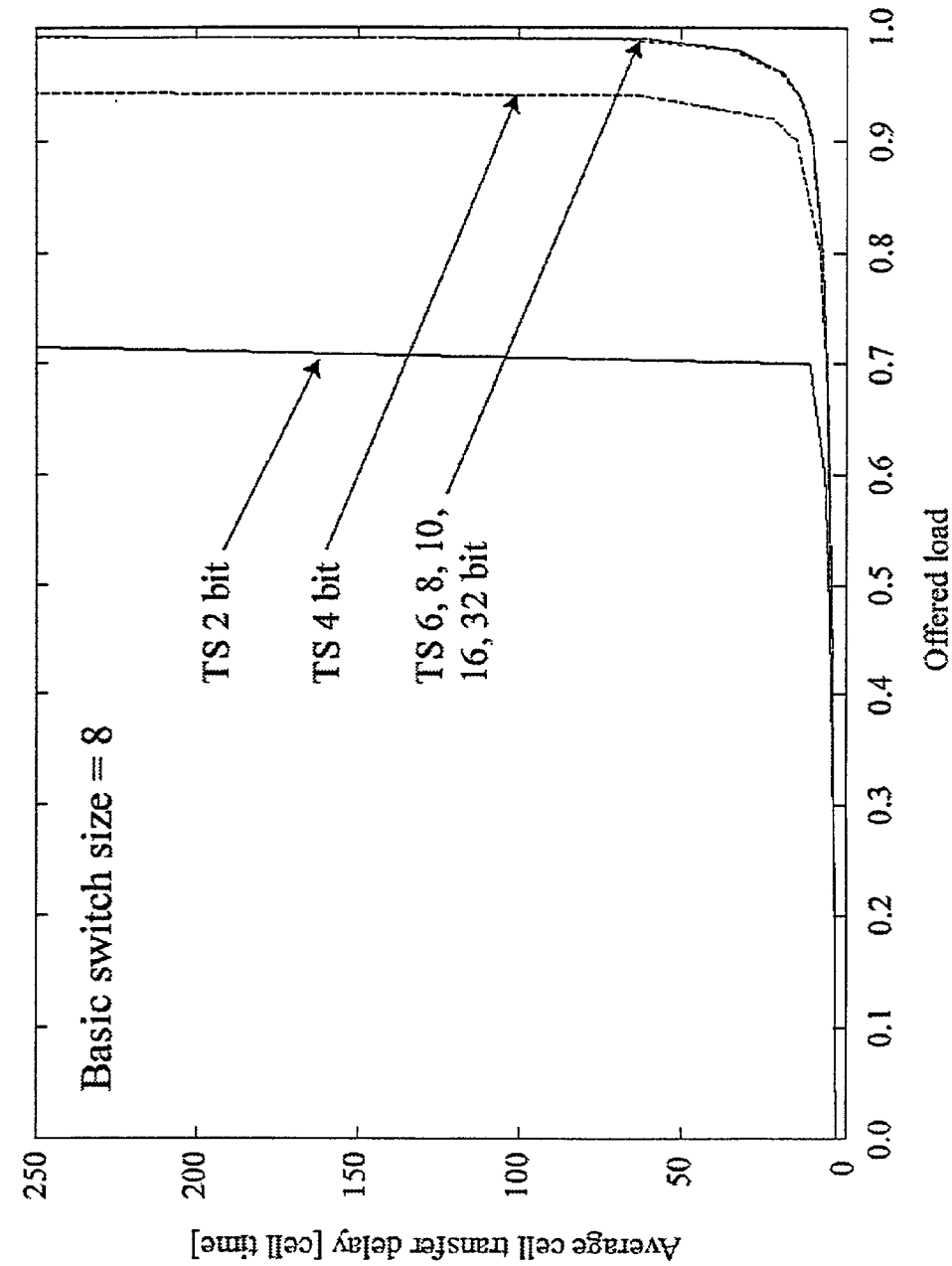
FIG. 77 shows an average cell transfer delay performance of a multi stage switch with the general-type cell-resequencing network.

FIG. 77 shows an average cell transfer delay performance of a multi stage switch with the general type cell-resequencing network which includes all of the above-mentioned algorithm. According to the algorithm, the same switching performance as that of an ideal output buffer type switch can be realized by a 6-bit time stamp ($2^6(=64)$ cells) or more.

Figure 78:
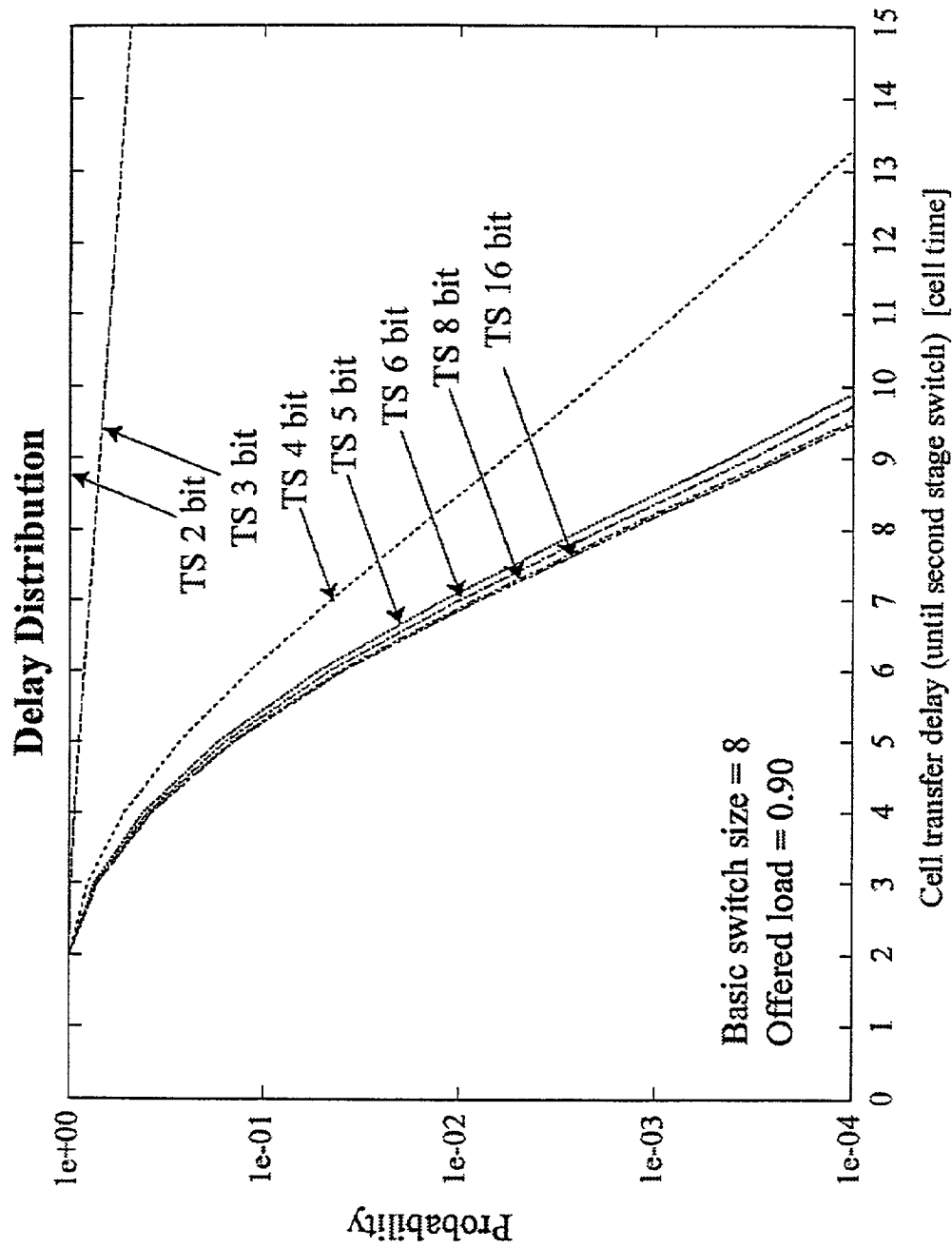
FIG. 78 shows a result of a simulation of a delay distribution.

FIG. 78 shows a result of a simulation of the delay distribution. Also, in this case, an ideal cell transfer delay performance can be realized by the 6 or more bit time stamp.

Figure 79:
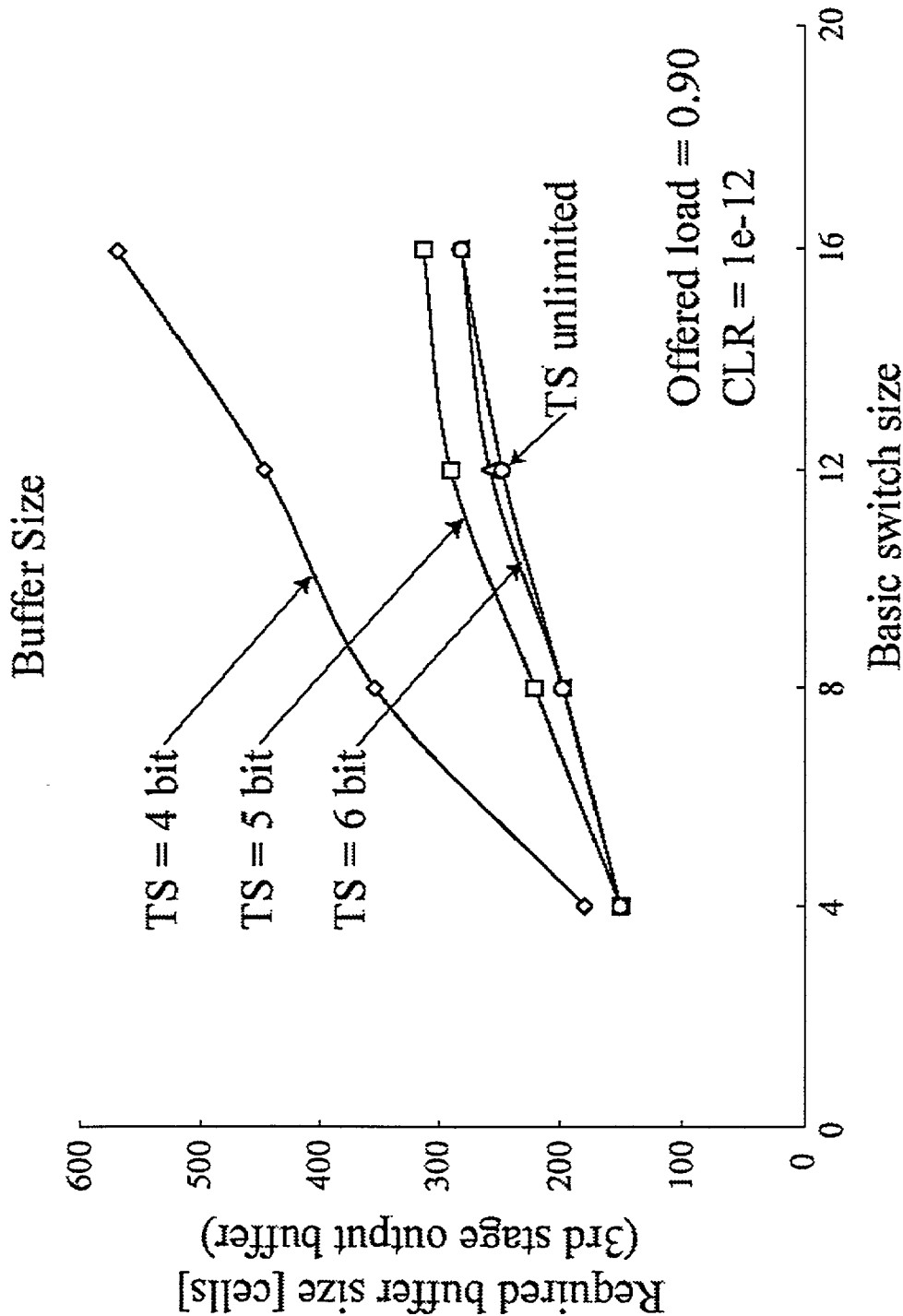
FIG. 79 shows a result of a simulation of a required buffer size.

FIG. 79 is a result of a simulation of the required buffer size. As with the above simulation results, an ideal required buffer (minimum size) can be realized by a 6 or more bit time stamp.

Figure 80:
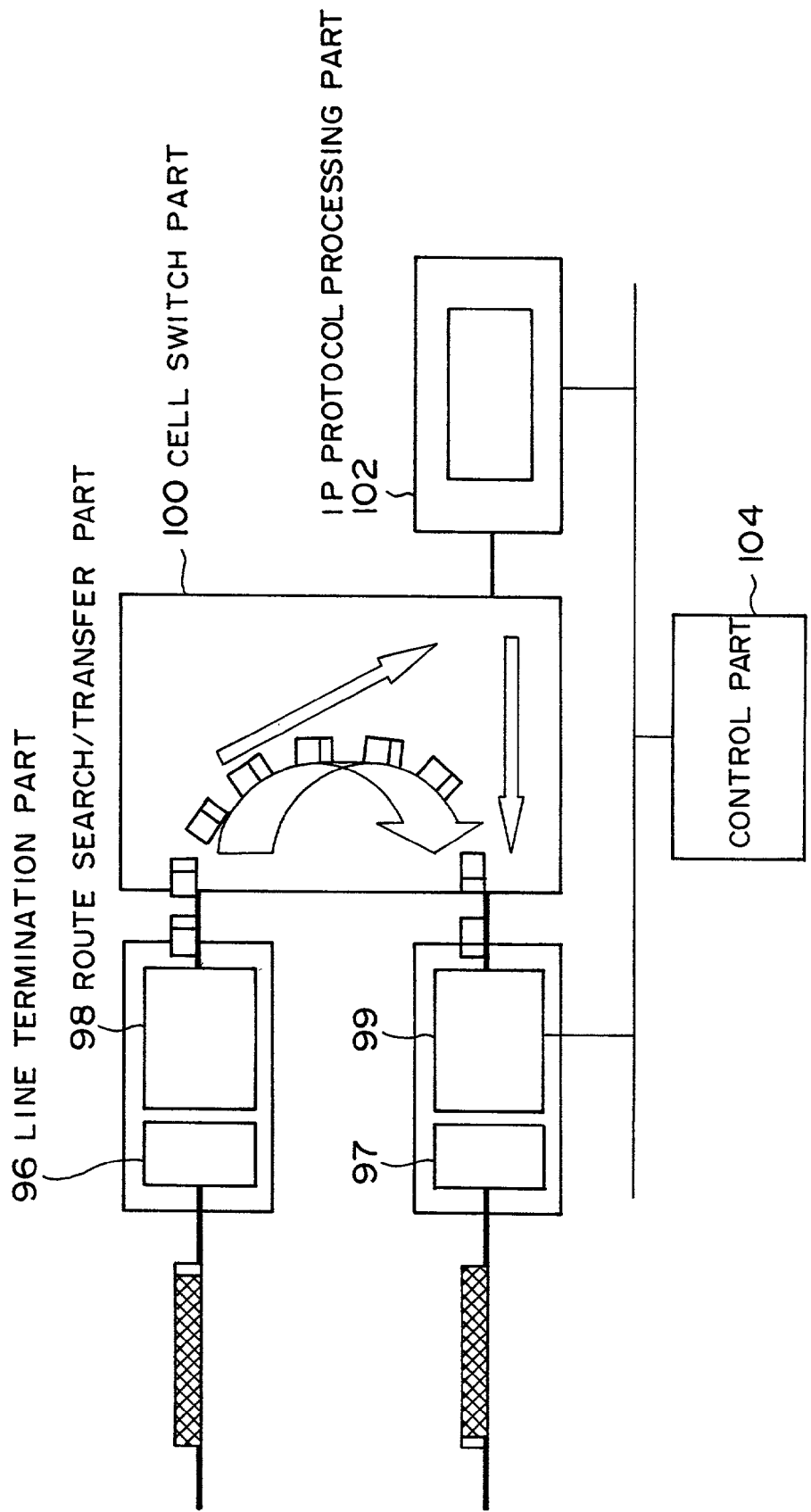
FIG. 80 is a block diagram of a router which includes a switch according to the present invention.

The above-mentioned switches are applicable to devices other than an ATM exchange. FIG. 80 is a block diagram of a router which includes the switch of the present invention. As shown in FIG. 80, the router includes line termination parts 96, 97, route search/transfer parts 98, 99, a cell switch part 100, an IP protocol processing part 102 and a control part 104. The operation of the router is as follows.

When packets are input from a network, a route search is carried out according to the IP address of the packets. Then, the packets are distributed as fixed-length cells in the cell switch part 100. After that, hardware routing is carried out and the cells are sent to the output port. Then, the cells are assembled into the packets and sent to the network. An IP protocol packet is transferred to the IP protocol processing part 102, and, then, the IP protocol processing part 102 carries out processes such as generating a routing table. The IP protocol processing part 102 notifies the route search/transfer part of the result with an internal bus.

The present invention is not limited to the specifically disclosed embodiments, and variations and modifications may be made without departing from the scope of the invention.

What is claimed is:

1. An ATM switch comprising:
at least one basic switch, said basic switch including means for referring to time information written in a header of an input cell and for switching cells to an output port in an ascending order of said time information, said means including:
plural cross-points, wherein at each of the cross-points an input line and an output line are crossed, and wherein the plural cross-points are layered, each cross-point including:
an address filter for extracting a cell arriving from the input line;
a first buffer which stores the extracted cell;
a second buffer which stores a cell arriving from another cross-point; and
means for comparing time information of a head cell in said first buffer with time information of a head cell in said second buffer and for sending a head cell with earlier time information to the another cross-point or said output port;
wherein said address filter captures a cell having an address of said address filter as an active cell which includes user data, and generates, for a cell that does not have said address of said address filter, a dummy cell, which does not include user data, with time information of the cell, and stores said active cell or said dummy cell in said first buffer,
if types of head cells in said first buffer and said second buffer are the same and also time information of said head cells are the same, a k-th cross point selects a head cell from said first buffer and said second buffer with a probability of a ratio of 1 to k–1 so as to send a selected head cell to the another cross-point or said output port, wherein k is a natural number, and
if said types of head cells are different but time information are the same, said address filter selects said active cell so as to send said active cell to other cross-point or said output port.

2. The ATM switch as claimed in claim 1,
wherein input lines connected to the cross-points are classified into a plurality of groups,
said first buffer storing cells arriving from said input lines of one of said groups;
time information of a cell with the earliest time information among cells in said first buffer being compared with time information of said head cell in said second buffer, and
a cell with earlier time information being sent to a cross-point or said output port.

3. The ATM switch as claimed in claim 1, further comprising adding means which adds arriving time information to an arriving cell as said time information.

4. The ATM switch as claimed in claim 3, wherein said adding means generates a dummy cell and adds time information to said dummy cell if there is no input cell.

5. The ATM switch as claimed in claim 4, wherein said basic switch transfers said dummy cells or said arriving cells with said time information to output ports other than the destination of said arriving cell.

6. The ATM switch as claimed in claim 5, wherein said basic switch allows said dummy cell to be overwritten by an arriving cell.

7. The ATM switch as claimed in claim 3,
wherein said time information is a value repeating periodically;
said adding means adding a flag for identifying said period to said cell, and
said basic switch identifying said period by referring to said flag.

8. The ATM switch as claimed in claim 1, wherein said basic switch includes a delay time counter, adds said delay time, and uses said added delay time as said time information.

9. An ATM switch comprising:
a first stage;
a second stage; and
a third stage, wherein each of the stages includes at least one basic switch, wherein said first stage, said second stage and said third stage are connected, said basic switch including means for referring to time information written in a header of an input cell and for switching cells to an output port in an ascending order of said time information, said means including:
plural cross-points, wherein at each of the cross-points an input line and an output line are crossed, and wherein the plural cross-points are layered, each cross-point including:
an address filter for extracting a cell arriving from the input line;
a first buffer which stores the extracted cell;
a second buffer which stores a cell arriving from another cross-point; and
means for comparing time information of a head cell in said first buffer with time information of a head cell in said second buffer and for sending a head cell with earlier time information to the another cross-point or said output port;
wherein said address filter captures a cell having an address of said address filter as an active cell which includes user data, and generates, for a cell that does not have said address of said address filter, a dummy cell, which does not include user data, with time information of the cell, and stores said active cell or said dummy cell in said first buffer,
if types of head cells in said first buffer and said second buffer are the same and also time information of said head cells are the same, a k-th cross point selects a head cell from said first buffer and said second buffer with a probability of a ratio of 1 to k−1 so as to send a selected head cell to the another cross-point or said output port, wherein k is a natural number, and
if said types of head cells are different but time information are the same, said address filter selects said active cell so as to send said effective cell to other cross-point or said output port.

10. A large-sized ATM switch comprising:
interconnected ATM switches each of which ATM switches includes at least one basic switch, said basic switch including means for referring to time information written in a header of an input cell and for switching cells to an output port in an ascending order of said time information, said means including:
plural cross-points, wherein at each of the cross-points an input line and an output line are crossed, and wherein the plural cross-points are layered, each cross-point including:
an address filter for extracting a cell arriving from the input line;
a first buffer which stores the extracted cell;
a second buffer which stores a cell arriving from another cross-point; and
means for comparing time information of a head cell in said first buffer with time information of a head cell in said second buffer and for sending a head cell with earlier time information to the another cross-point or said output port;
wherein said address filter captures a cell having an address of said address filter as an active cell which includes user data, and generates, for a cell that does not have said address of said address filter, a dummy cell, which does not include user data, with time information of the cell, and stores said active cell or said dummy cell in said first buffer,
if types of head cells in said first buffer and said second buffer are the same and also time information of said head cells are the same, a k-th cross point selects a head cell from said first buffer and said second buffer with a probability of a ratio of 1 to k−1 so as to send a selected head cell to the another cross-point or said output port, wherein k is a natural number, and
if said types of head cells are different but time information are the same, said address filter selects said active cell so as to send said active cell to other cross-point or said output port.

11. A cell switch comprising:
at least one basic switch, said basic switch including means for referring to time information written in a header of an input cell and for switching cells to an output port in an ascending order of said time information, said means including:
plural cross-points, wherein at each of the cross-points an input line and an output line are crossed, and wherein the plural cross-points are layered, each cross-point including:
an address filter for extracting a cell arriving from the input line;
a first buffer which stores the extracted cell;
a second buffer which stores a cell arriving from another cross-point; and
means for comparing time information of a head cell in said first buffer with time information of a head cell in said second buffer and for sending a head cell with earlier time information to the another cross-point or said output port;
wherein said address filter captures a cell having an address of said address filter as an active cell which includes user data, and generates, for a cell that does not have said address of said address filter, a dummy cell, which does not include user data, with time information of the cell, and stores said active cell or said dummy cell in said first buffer, if types of head cells in said first buffer and said second buffer are the same and also time information of said head cells are the same, a k-th cross point selects a head cell from said first buffer and said second buffer with a probability of a ratio of 1 to k−1 so as to send a selected head cell to the another cross-point or said output port, wherein k is a natural number, and if said types of head cells are different but time information are the same, said address filter selects said active cell so as to send said active cell to other cross-point or said output port.

12. A large-sized cell switch comprising:

interconnected cell switches, wherein each of the cell switches includes at least one basic switch, said basic switch including means for referring to time information written in a header of an input cell and for switching cells to an output port in an ascending order of said time information, said means including:

plural cross-points, wherein at each of the cross-points an input line and an output line are crossed, and wherein the plural cross-points are layered, each cross-point including:
    an address filter for extracting a cell arriving from the input line;
    a first buffer which stores the extracted cell;
    a second buffer which stores a cell arriving from another cross-point; and
    means for comparing time information of a head cell in said first buffer with time information of a head cell in said second buffer and for sending a head cell with earlier time information to the another cross-point or said output port;

wherein said address filter captures a cell having an address of said address filter as an active cell which includes user data, and generates, for a cell that does not have said address of said address filter, a dummy cell, which does not include user data, with time information of the cell, and stores said active cell or said dummy cell in said first buffer, if types of head cells in said first buffer and said second buffer are the same and also time information of said head cells are the same, a k-th cross point selects a head cell from said first buffer and said second buffer with a probability of a ratio of 1 to k−1 so as to send a selected head cell to the another cross-point or said output port, wherein k is a natural number, and if said types of head cells are different but time information are the same, said address filter selects said active cell so as to send said active cell to other cross-point or said output port.

13. A basic switch which inputs a cell and outputs said cell to an output port on the basis of header information of said cell, said basic switch comprising:

means for referring to time information written in a header of an input cell and for switching cells to an output port in an ascending order of said time information, said, means including:

plural cross-points, wherein at each of the cross-points an input line and an output line are crossed, and wherein the plural cross-points are layered, each cross-point including:
    an address filter for extracting a cell arriving from the input line;
    a first buffer which stores the extracted cell;
    a second buffer which stores a cell arriving from another cross-point; and
    means for comparing time information of a head cell in said first buffer with time information of a head cell in said second buffer and for sending a head cell with earlier time information to the another cross-point or said output port;

wherein said address filter captures a cell having an address of said address filter as an active cell which includes user data, and generates, for a cell that does not have said address of said address filter, a dummy cell, which does not include user data, with time information of the cell, and stores said active cell or said dummy cell in said first buffer, if types of head cells in said first buffer and said second buffer are the same and also time information of said head cells are the same, a k-th cross point selects a head cell from said first buffer and said second buffer with a probability of a ratio of 1 to k−1 so as to send a selected head cell to the another cross-point or said output port, wherein k is a natural number, and if said types of head cells are different but time information are the same, said address filter selects said active cell so as to send said active cell to other cross-point or said output port.

* * * * *

UNITED STATES PATENT AND TRADEMARK OFFICE
CERTIFICATE OF CORRECTION

PATENT NO. : 7,136,391 B1 Page 1 of 1
APPLICATION NO. : 09/376904
DATED : November 14, 2006
INVENTOR(S) : Seisho Yasukawa et al.

It is certified that error appears in the above-identified patent and that said Letters Patent is hereby corrected as shown below:

On Title Page

Item (56) References Cited

U.S. PATENT DOCUMENTS, change "5,486,457" to --5,485,457--

Column 4, line 23, remove the bold from the no. 3, in 160G/3--

Column 5, line 53, change "treates" to --treated--

Column 31, line 66, change "effective" to --active--

Signed and Sealed this

First Day of May, 2007

JON W. DUDAS
*Director of the United States Patent and Trademark Office*